US006654133B2

(12) United States Patent
Inoue et al.

(10) Patent No.: US 6,654,133 B2

(45) Date of Patent: Nov. 25, 2003

(54) RECORDING APPARATUS

(75) Inventors: Hiroyuki Inoue, Yokohama (JP); Koh Hasegawa, Yokohama (JP); Shinya Asano, Tokyo (JP); Takashi Nojima, Tokyo (JP); Akira Kida, Kawasaki (JP); Takeshi Iwasaki, Yokohama (JP); Noriko Kawasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,784

(22) Filed: Apr. 9, 1999

(65) Prior Publication Data

US 2003/0197881 A1 Oct. 23, 2003

(30) Foreign Application Priority Data

Apr. 15, 1998 (JP) .......................................... 10-105240

(51) Int. Cl.[7] ............................ G06F 3/12; G06K 15/02

(52) U.S. Cl. ..................... 358/1.12; 358/498; 271/9.04; 271/9.08; 271/9.09; 271/12; 271/271; 347/153; 399/367

(58) Field of Search ............................... 358/498, 1.12; 271/9.04, 9.08, 9.09, 12, 271; 347/153; 399/367

(56) References Cited

U.S. PATENT DOCUMENTS

| | | | | | |
|---|---|---|---|---|---|
| 5,238,235 | A | * | 8/1993 | Nitta et al. | 271/127 |
| 5,332,209 | A | * | 7/1994 | Romansky et al. | |
| 5,348,283 | A | | 9/1994 | Yanagi et al. | 271/127 |
| 5,358,230 | A | | 10/1994 | Ikemori et al. | 271/114 |
| 5,370,380 | A | | 12/1994 | Suzuki et al. | 271/21 |
| 5,423,526 | A | | 6/1995 | Hasegawa | 271/10 |
| 5,480,247 | A | * | 1/1996 | Saikawa et al. | 271/119 |
| 5,485,991 | A | | 1/1996 | Hirano et al. | 271/121 |
| 5,531,431 | A | * | 7/1996 | Saito et al. | 271/10.09 |
| 5,547,062 | A | * | 8/1996 | Mays et al. | |
| 5,648,808 | A | | 7/1997 | Yanagi et al. | 347/104 |
| 5,672,019 | A | | 9/1997 | Hiramatsu et al. | 400/624 |

FOREIGN PATENT DOCUMENTS

| | | |
|---|---|---|
| EP | 0 492 638 | 7/1992 |
| EP | 0 656 263 | 6/1995 |
| JP | 6-183582 | 7/1994 |

OTHER PUBLICATIONS

European Search Report.

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

The present invention relates to a recording apparatus which has a positioning means for manual sheet feeding for aligning a sheet feeding position, and a positioning means for auto sheet feeding provided on an auto sheet feeder for aligning the sheet feeding position, and a sheet fed from the auto sheet feeder does not abut against the positioning means for manual sheet feeding, when the auto sheet feeder is attached to the recording apparatus main body.

12 Claims, 36 Drawing Sheets

[SHEET FEED FLOW OF MAIN BODY]

[MAIN FLOW OF ASF]

[SHEET FEEDING FLOW C2 OF ASF]

[ INITIALIZING FLOW C3 OF ASF ]

[KIND OF DEVICE JUDGING FLOW C1 OF MAIN BODY]

[SHEET FEEDING FLOW OF MAIN BODY]

[SHEET FEEDING FLOW C2 OF ASF]

FIG. 38

| | KIND OF SHEET | DRIVING SPEED IN CORRECTING REGISTRATION | NUMBER $P_5$ OF PULSE IN CORRECTING REGISTRATION |
|---|---|---|---|
| $T_1$ | PLAIN PAPER | MEDIUM SPEED | SMALL |
| $T_2$ | POSTCARD | MEDIUM SPEED | LARGE ($P_5=Pmax-Pc$) |
| $T_3$ | ENVELOPE | LOW SPEED | MEDIUM |
| $T_4$ | GLOSSY PAPER | LOW SPEED | SMALL |
| $T_5$ | NOT SPECIFIED | MEDIUM SPEED | LARGE ($P_5=Pmax-Pc$) |

RECORDING APPARATUS

BACKGROUND OF THE INVENTION

1. Field of the Invention

The present invention relates to a sheet feeding device that feeds a recording medium and to a recording apparatus comprising the sheet feeding device, and, in particular, to the sheet feeding of the recording medium.

2. Related Background Art

As with most other devices, there is significant market demand for miniaturized, lightweight recording apparatuses and reflecting this, miniaturization and decreased weight in recording apparatuses are advanced.

In the pursuit of such miniaturization, as shown in Japanese Patent Application Laid-Open No. 6-183582 and others, devices have been invented in which the auto sheet feeder (hereinafter referred to as "ASF"), which is the sheet feeding device for feeding multiple sheets of the recording medium one by one (one sheet at a time) into the image forming portion of the printer is separated from the printer (recording apparatus main body) for recording images and stands alone as an ASF externally attachable to the printer.

ASF which can be used by attaching not only to a miniature printer but also to the outside of a printer with multiple sheet feeding apertures or to a printer with manual sheet feeding only also currently exist.

Also, in such printers the standard width of the sheets (sheet standard) must be uniform when the sheets are manually fed by the printer as a single unit or when the sheets are automatically fed by the ASF attached to the printer.

When the sheets are fed manually, the user feeds sheets by hand while the side edge portion of the sheet is maintained along the sheet standard. To the contrary, when the sheets are fed automatically with ASF, it is extremely difficult to maintained the side edge portion of the sheet along the sheet standard for the manual sheet feeding within measurement tolerance. Therefore, extremely precise parts and adjustments are necessary to accomplish aligned feeding in conventional ASF, and high cost and great complexity are unavoidable.

As a result, sheet feeding apertures have conventionally been separated into manual and ASF and sheet positioning performed according to each sheet standard. However, though it is possible to separate a manual sheet feeding aperture and an ASF sheet feeding aperture in relatively large devices, there is not enough space for separate sheet feeding apertures in super-miniature printers such as portable mobile printers, and the common sheet feeding aperture must be used.

However, when the common sheet feeding aperture is used and the common sheet guide is shared, if sheets are fed from the ASF, the side edge portion of the sheets interfere with the sheet standard by measurement tolerance and skew feeding, and inconveniences such as skew feeding and damage to the sheet edge portion or sheet jams arise.

SUMMARY OF THE INVENTION

An object of the present invention is to solve such inconveniences and to provide an ASF that can feed sheets into a recording apparatus without causing damage or jams and an image formation device comprising it.

The present invention provides a recording apparatus having a recording apparatus main body comprising a sheet feeding aperture which can record an image on a sheet manually fed from the sheet feeding aperture and an auto sheet feeder detachably attached to the recording apparatus main body that can automatically supply sheets to the recording apparatus main body through the sheet feeding aperture, which has a positioning means for manual sheet feeding for aligning the sheet feeding position by restricting the sides of the sheets fed manually from the sheet feeding aperture and an automatic sheet feeding positioning means for aligning the sheet feeding position by restricting sides of the sheets supplied automatically into the recording apparatus main body with the auto sheet feeder attached, and is constructed such that the sheets supplied by the auto sheet feeder do not abut against the positioning means for manual sheet feeding when the auto sheet feeder is attached to the recording apparatus main body.

The present invention is also constructed such that when the auto sheet feeder is attached to the recording apparatus main body, the positioning means for manual sheet feeding can be retracted so that the sheets supplied from the ASF do not abut against the positioning means for manual sheet feeding. In the present invention, the positioning means for manual sheet feeding can also be retracted to the side of the pass through which the sheets supplied from the ASF path.

As the positioning means for manual sheet feeding of the present invention a sheet feeding tray for supporting the sheets manually fed from the sheet feeding aperture is attached and a tray receiver is provided on the auto sheet feeder main body for receiving the sheet feeding tray such that the sheet feeding tray can be retracted below the pass when the auto sheet feeder is attached to the main body of the recording apparatus.

BRIEF DESCRIPTION OF THE DRAWINGS

FIG. 38 is a chart showing the contents of the driving tables for the sheet feeding motor.

DETAILED DESCRIPTION OF THE PREFERRED EMBODIMENT

Next, an embodiment of the present invention is explained in detail using the drawings.

Figure 1:
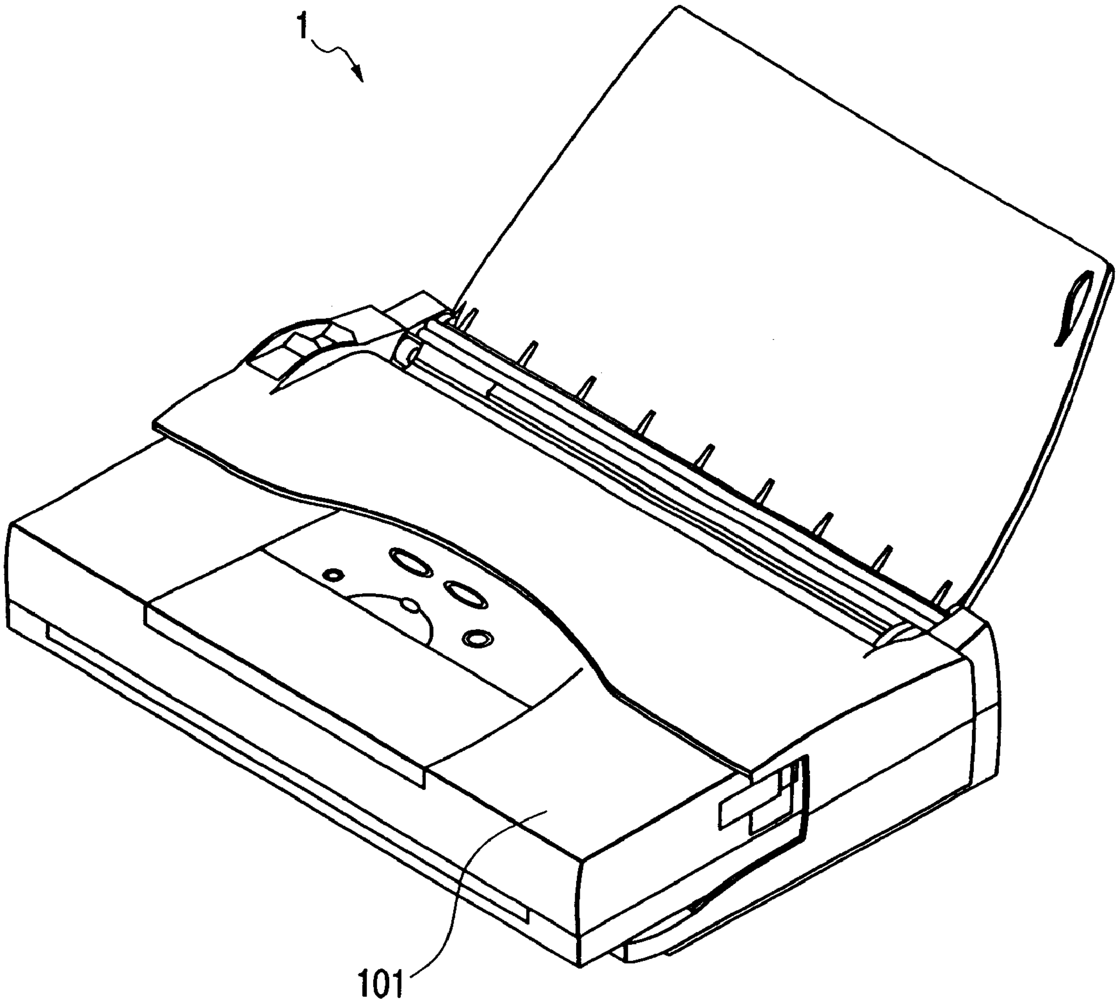
FIG. 1 is a perspective view of the first embodiment of the present invention with the ASF attached to the printer.
Figure 2:
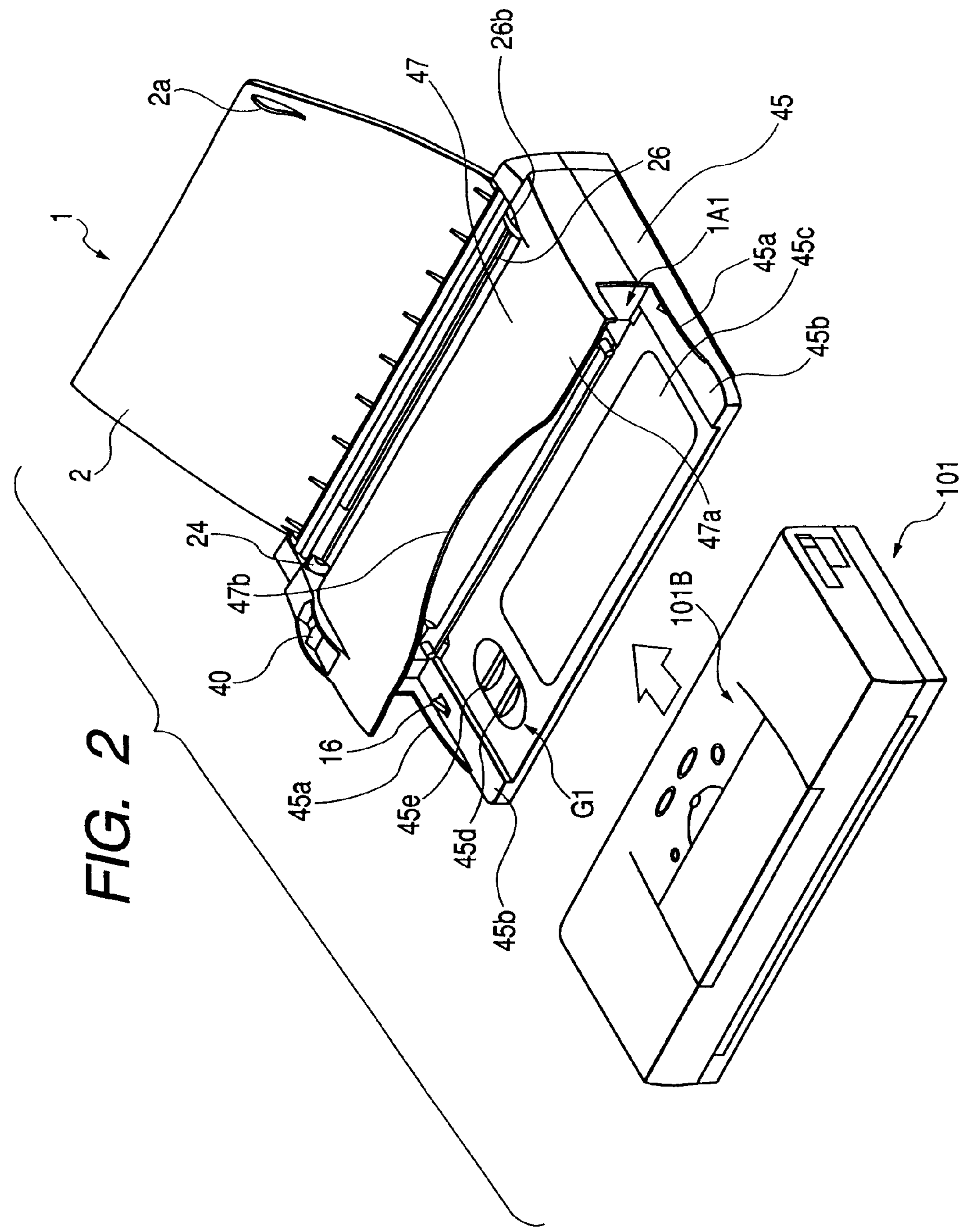
FIG. 2 is a drawing showing the ASF being attached to the printer.
Figure 3:
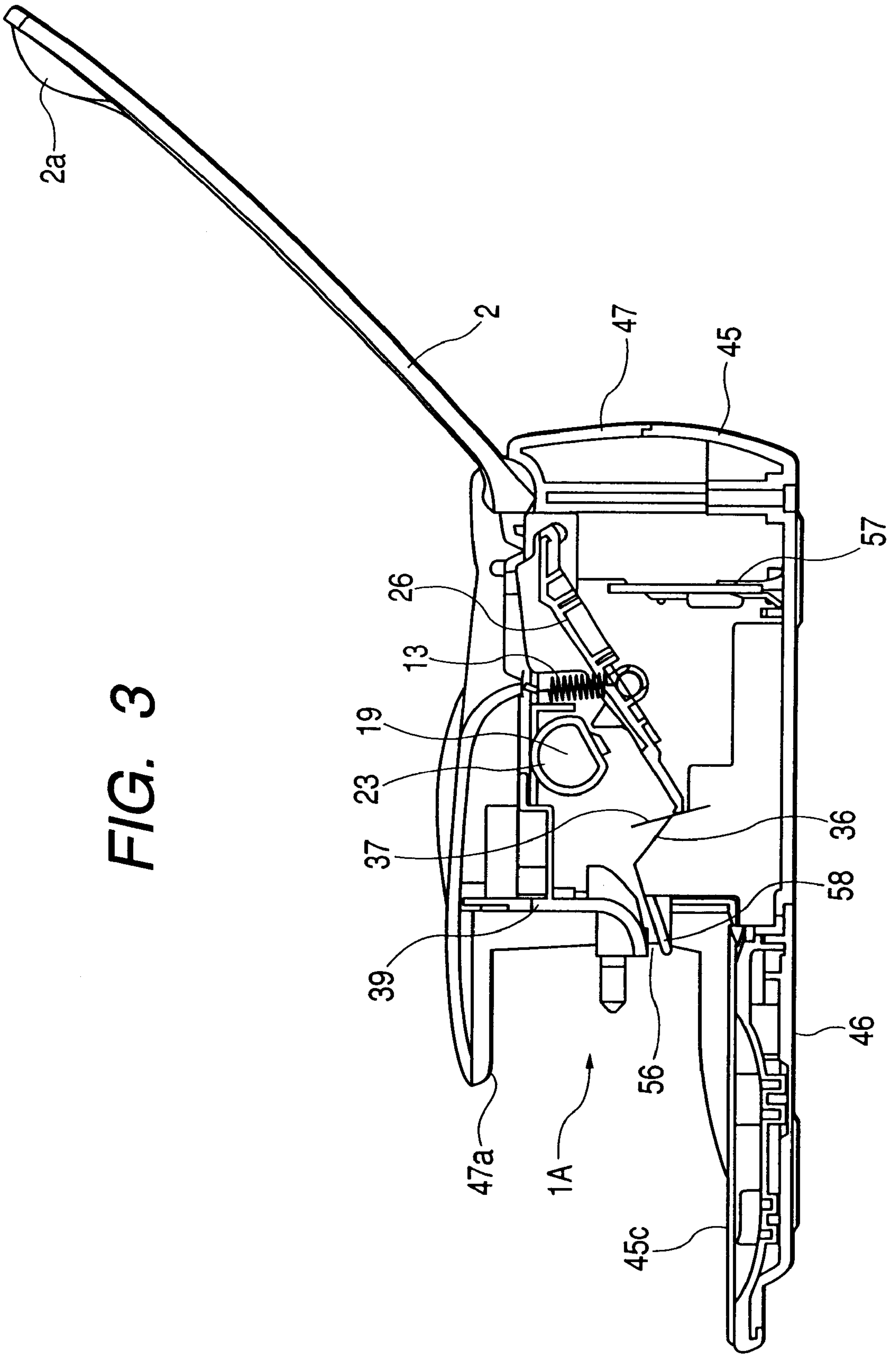
FIG. 3 is a sectional view of the ASF.
Figure 4:
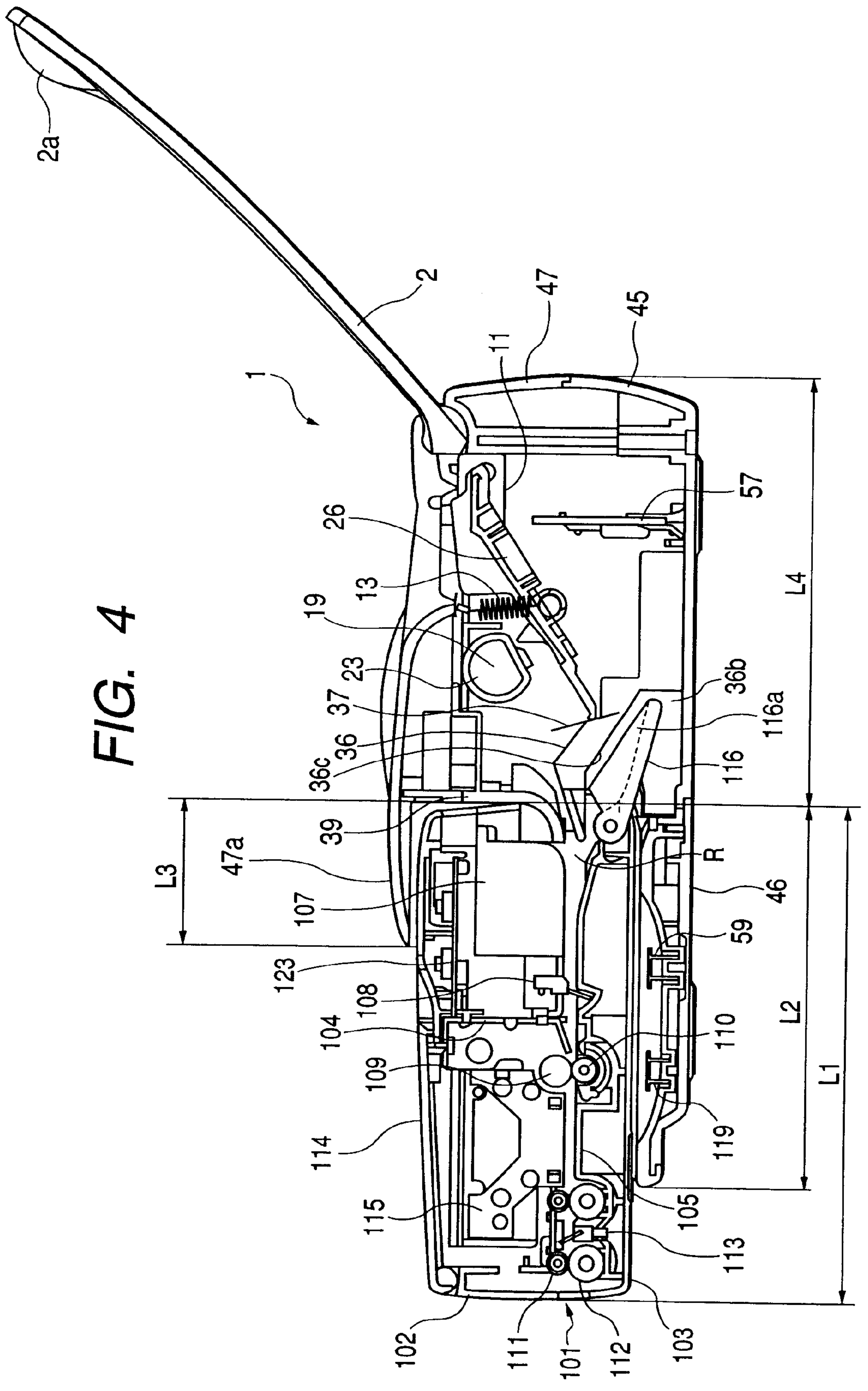
FIG. 4 is a sectional view of the ASF attached to the printer.

FIG. 1 is a perspective view showing the condition when the printer (main body of the recording apparatus) is attached to the ASF (auto sheet feeder) in the first embodiment of the present invention, FIG. 2 is a drawing showing the appearance of the printer being attached to the ASF, FIG. 3 is a sectional view of the ASF and FIG. 4 is a sectional view of the ASF in the condition when the printer is attached to the ASF.

In FIGS. 1 through 4, the ASF 1 is constructed such that it is detachably attachable to the printer 101. An image formation device is formed of the ASF 1 and the printer 101.

Here, the printer 101 is a so-called mobile printer, which is miniature and portable, comprising a battery. In this embodiment, an ASF is not housed inside the printer 101 and sheet feeding can only be done by manual sheet feeding on a single unit of the printer 101. Such a construction is the most suitable form for a mobile printer while miniaturization, simplification, and lower cost of the single unit of the printer 101 can be realized. Of course, the present invention can be applied even if a miniature ASF is housed within the printer 101.

This type of miniature, portable printer 101 is particularly used in such situations as when outdoors, within a vehicle, or at another office, when a salesman visits a customer. In such situations the number of recording sheets needed is comparatively small and a manual feeding only printer or a printer with a simple, low-capacity, interior-housed ASF is sufficient. To the contrary, it may be necessary to print a comparatively large volume of varied recording sheets when using the printer 101 in one's own office.

The ASF 1 separated from the printer 101 is extremely well suited to meet these needs. The ASF 1 has a so-called desktop type, from usually placed on top of a desk in an office, and by attaching the printer 101 to the ASF 1, the printer 101 can have the properties of a desktop printer. With the construction described later, the ASF 1 can automatically feed various kinds of recording media such as regular paper, postcards, envelopes, plastic film, or cloth.

The present embodiment provides an extremely high value-added printer that can be used as a high-performance desktop printer by attaching a super-miniature, single unit mobile printer to the ASF of the present invention. The ASF 1 even functions as a receiving place for the printer 101 when the printer is not used as a single unit and can have the role of a so-called docking station where an auto feeding function is added when it receives the printer.

The ASF 1 of the present invention independently stable as a single unit ASF when the printer 101 is not attached and the printer 101 can also be separated from the ASF 1 while sheets are stacked in it. By this arrangement, the user can put the device in operation standby as a desk top printer only by attaching the separated printer 101 to the independent ASF 1.

Namely, the ASF and the printer function as an extremely user-friendly docking station.

If using the printer 101 as both a mobile printer and a desktop printer as above, it is important that the operations of attaching and detaching the printer 101 from the ASF 1 can be performed extremely simply. This is because it is extremely inconvenient for a user who separates the printer 101 from the ASF 1 and carries the printer around, then returns and attaches it to the ASF 1 almost every day, if attachment and detachment procedures are difficult or take much time.

In the present embodiment, as shown in FIG. 3, an attachment aperture 1A (hereinafter referred to as "aperture") is provided at the front of the ASF 1 for attaching the printer 101. The sheet pass-through route in the printer

101 is a so-called horizontal path that is almost horizontal and is constructed such that a sheet path described later is formed by moving the sheet supply side of the printer 101 almost horizontally facing the ASF 1 and pushing it into the aperture 1A of the ASF 1.

In other words, in the present embodiment, the printer 101 having the horizontal path is pushed into the ASF 1 in an almost horizontal direction and attached. Then, when the printer 101 is pushed almost horizontally, the printer 101 is automatically secured to the ASF 1 (securing method for both of the printer and the ASF when the printer 101 is attached to the ASF 1 will be described in detail later). When separating the printer 101 from the ASF 1, the printer 101 is released from the ASF 1 merely by pressing the push lever 40 provided at the top of the ASF 1 and pushing the printer 101 to the front of the ASF 1.

By constructing the device in this way, the user can attach and detach the printer 101 from the ASF 1 with extreme ease and can use the printer either as a mobile or a desktop printer.

In order to make attachment and detachment operations simple and easy to perform, the present embodiment comprises a bottom surface of the aperture 1A formed in front of the ASF base 45 which form the main body of the ASF with the ASF case 47, and a table 45*c* which is a recording apparatus supporting portion, for supporting the printer 101 so as to be able to move in the attachment direction when attaching the printer 101.

When attaching the printer 101 to the ASF 1, the printer 101 is first placed on the table 45*c*. Then the user grasps the upper and lower surfaces of the printer 101 at the middle of the side closest to hand (discharge side) with one hand, and places the printer 101 while the inner side (sheet feeding side) thereof is attached lightly on top of the table 45*c* (the printer 101 may be held in both hands on both side portion).

Next, when the printer 101 placed on top of the table 45*c* is pushed by hand toward the inside which is the direction of attachment indicated by an arrow in FIG. 2, both side surfaces of the printer 101 will be introduced into positioning bosses to be described later while guided by the printer side guide portions 45*a* provided on both side end portions of the table 45*c*, and fit into positioning holes of the printer 101 to be described later, and positioned.

No further positioning is necessary other than pushing the printer 101 in the approximate center of the table 45*c*. In this way, when the printer 101 is attached to the ASF 1, the printer 101 may be placed on the table portion 45*c* and then pushed along the table portion 45*c*. Thus operability is extremely good and it is extremely easy to attach.

Printer sliding portion 45*b*, over which the bottom of the printer slides when the printer 101 is pushed as shown in FIG. 2, are provided on both side portions of table portion 45*c* in a direction perpendicular to the printer attachment direction. Also, a level difference portion G1 is formed between the printer sliding portion 45*b*.

Protruding object such as rubber feet, not shown in the Figures, are provided on the bottom surface of the printer 101 and make it harder to move the printer 101 by external force, for example when using the printer as a single unit while place it on a desk. However, when attaching the printer 101 to the ASF 1, if these rubber feet contact the table portion 45*c*, the user must use greater force to push the printer 101, and it becomes extremely difficult to operate.

Therefore the level difference portion G1 described above was formed in between the printer sliding portion 45*b* so that the rubber feet would not contact the table portion 45*c*. This level difference portion G1 is formed with a deeper level difference than the height of the rubber feet such that the rubber feet will not contact the table portion 45*c*.

By forming such a level difference portion G1, the rubber feet will not contact the table portion 45*c*, thereby the user can push the printer 101 by hand without needing much force, and it becomes easier to operate and attach.

An eave portion 47*a* which constitutes one portion of the aperture 1A and is formed almost parallel to the table portion 45*c* is formed on the upper case 47 of ASF. This eave portion 47*a* forms a pocket portion with the table portion 45*c* in which the printer 101 is fit.

The shape of the pocket formed in this way shows the user the direction to push the printer 101 into the ASF 1 in almost parallel and makes it impossible for the user to push the printer into the ASF 1 in any other direction.

This direction same as for the both connectors used to electrically connect the printer 101 to the ASF 1, which will be described later. The connection of the connectors is performed during the operation of pushing the printer 101 into the ASF 1 and securing it. With this arrangement, operability is improved because it is not necessary to perform another operation to connect the connectors. Damage to the connectors due to abnormal interposition of the connectors caused by pushing the printer 101 into the ASF 1 in the different direction when the printer 101 is attached to the ASF 1 is also prevented.

After the printer 101 is attached, if the front end of the printer 101 (discharge side) receives upward force, the eave portion 47*a* abuts the printer 101 and restricts any upward movement of the printer 101. Thus, even if the printer is lifted upward with respect to the ASF 1, upward movement of the printer 101 can be prevented and damage to the attachment portion or release of attachment due to upward movement of the printer 101 is also prevented.

In this embodiment, the both side portions of the eave portion 47*a* protrude farthest and the center is a concavity 47*b*. By providing this recessed portion 47*b*, operation parts 110B provided on top of the printer 101 such as the power switch and others can not be covered.

As long as the clearance between the eave portion 47*a* and the top of the printer is between 0.5 mm to 2 mm, it will sufficiently prevent above-mentioned upward lifting. If the clearance is too large it will not have the desired effect.

As shown in FIG. 4, when the depth of the printer 101 is set as L1, the depth of the table portion 45*c* is set as L2, and the depth of the eave portion 47*a* is set as L3. In this embodiment they satisfy the following relationship.

$$L1/2 \leq L2 \leq L1 - 15\ \text{mm}$$

By selecting the depth L2 of the table portion 45*c* not less than one half (L1/2) of the depth L1 of the printer, the printer 101 can be maintained in a stable condition when the printer 101 is attached to the ASF 1. This relationship only needs to be satisfied in one portion of the table portion 45*c* not in the entire area of the table portion.

If L1/2 is greater than L2, the printer 101 will protrude greatly from the ASF 1 when attached and will be extremely unstable, such that if downward external force is applied on the protruding part, the rear portion of entire apparatus may be lifted up.

On the other hand, by selecting the depth L2 of the table portion 45*c* smaller, at least 15 mm in the present embodiment than the depth L1 of the printer 101, space for the user's fingers on the lower front side of the printer 101 when the printer 101 is attached is preserved.

In this way operability and ease of attachment is improved, as the user can attach and detach the printer 101 by grasping the upper and lower surfaces in one hand. Of course, the user may also grasp the printer in both hands. This relationship need not be satisfied over the entire width of the table portion 45*c*. For example, the table portion 45*c* may also be formed with recessed portion in either the center or on both side portions so as to satisfy this relationship.

By providing a space in the lower front side of the printer 101 a design is achieved which doesn't look vertically large to the eye. Further, if the thickness (height) of the table portion 45*c* is not less than 10 mm, the user's fingers can be inserted under the printer 101 when the ASF 1 is placed on top of a desk, which is also desirable.

In the present embodiment, the depth L1 of the printer 101 and the depth L3 of the eave portion 47*a* satisfy the following relationship:

$$L1/4 \leq L3 \leq L1/2$$

If the depth L3 of the eave portion 47*a* is not less than ¼ of the depth L1 of the printer 101, upward lifting the printer 101 is prevented and the direction in which the printer 101 should be pushed is still sufficiently restricted.

If the depth L3 of the eave portion 47*a* exceeds ½ of the depth L1 of the printer 101, the pushing amount with respect to the depth of the printer 101 during attachment will be relatively too large, and the operation will become unsatisfactory and it will interfere with operations on top of the printer as well. Further, a large eave portion 47*a* will make the entire apparatus look large to the eye and will oppress the user.

Because of this it is most preferable for the depth L3 of the eave portion 47*a* to be not more than ½ of the depth of the printer 101. With this amount of a protrusion, the protruding eave portion can be sufficiently strong and have a sufficient toughness in the apparatus.

By constructing the table portion 45*c* and the eave portion 47*a* according to these conditions, operability is extremely good and it is easy to attach, and a form that limits the pushing direction of the printer and prevents upward lifting of the printer 101 is achieved.

In the present embodiment, an aperture portion 1A1 is formed above the printer side guides 45*a* having a height not less than the clearance between the eave portion 47*a* and the top of the printer. By forming such an aperture portion 1A1, if a power cord, interface connector, or a light emitting and receiving portion for infrared radiation transmission is established on the side of the printer 101, the ASF 1 will not interfere with it. In other words, the printer 101 can be attached to the ASF 1 even with a power cord or an interface connector attached, and can also be detached in that condition.

Next the connector covers for the connector portion that electrically connect the printer 101 to the ASF 1 will be described.

In particular, when using the printer 101 for a long time period of detached from the ASF 1, the each connector presents as separate, single units and it is maintained in non-connected state. In such condition, dirt or dust might enter into the connector portion or the internal electrical circuits may be damaged by excessive static electricity transmitted through the connectors.

In order to prevent such situations, in the present embodiment, connector covers are provided on each connector for protecting them. Each connector cover is provided as a single unit and can be removed when the printer 101 is attached to the ASF 1. Because space is extremely limited in a super miniature printer such as a mobile printer, low cost, removable connector covers requiring very little space are most suitable.

Figure 5:
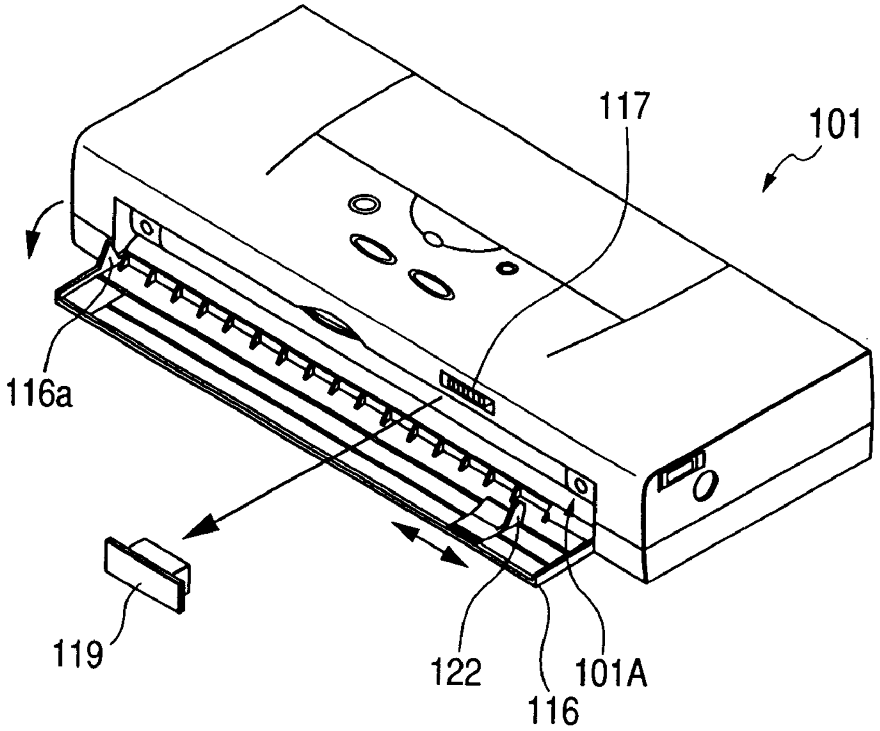
FIG. 5 is a perspective view of an embodiment of the present invention.
Figure 11:
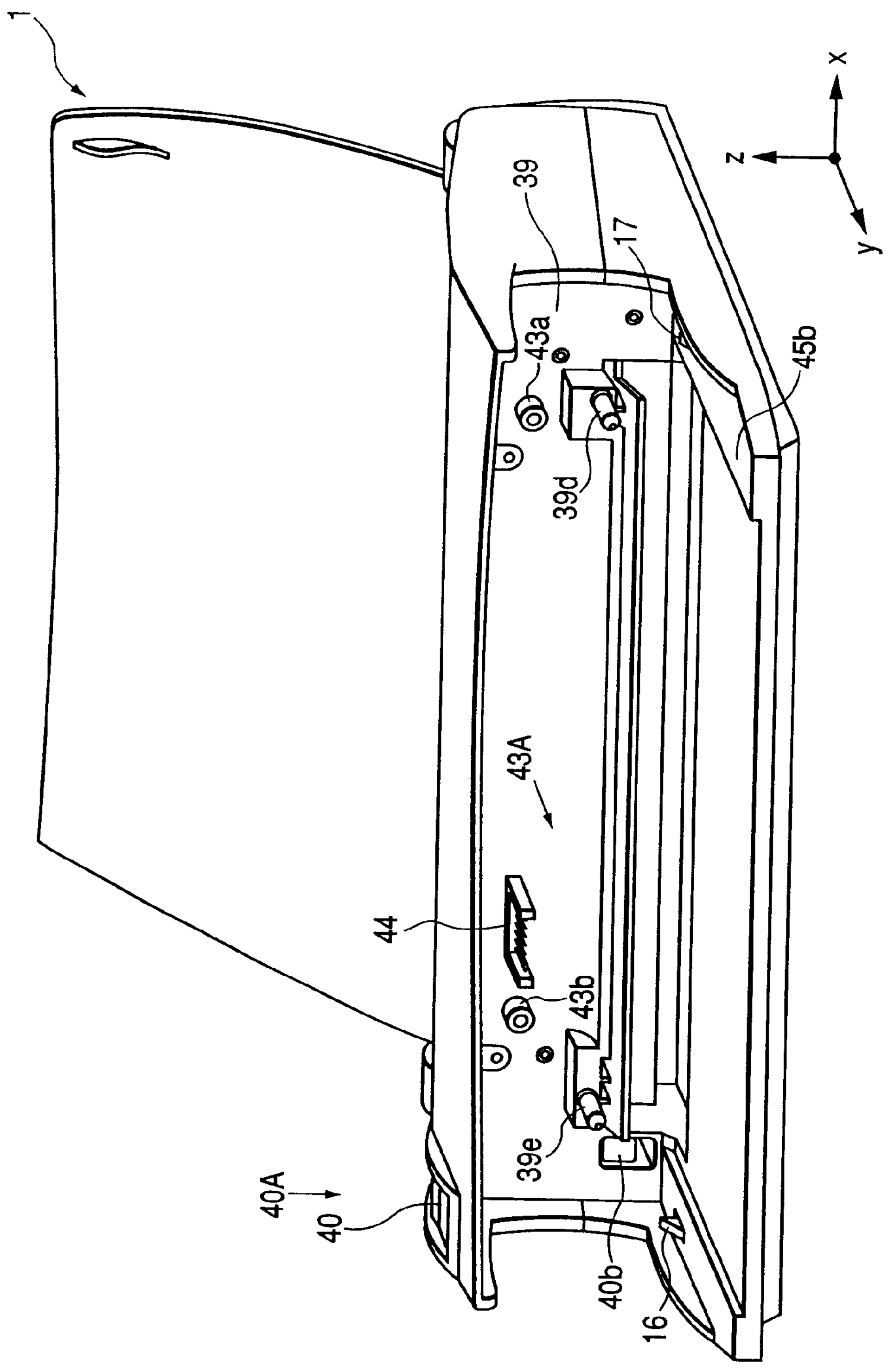
FIG. 11 is a perspective view showing the arrangement of parts relating to the printer attachment/detachment mechanism of the ASF of the present invention.

For example, there is a printer connector 117 in the upper surface of the printer 101 facing the ASF 1 when attaching as shown in FIG. 5. When the printer 101 is attached to the ASF 1, the sheet feeding tray 116 is opened and the printer connector cover 119 is removed from the printer connector 117. Similarly, on the ASF side as well an ASF connector cover 59 attached to an ASF connector 44 as shown in FIG. 11 and described later is removed.

When the connectors are connected, the removed twin connector covers 59 and 119 are received in the connector cover receiving portion 45*d* and 45*e* (see FIG. 2) in the table portion 45*c* as shown in FIG. 4. These receiving portion 45*d* and 45*e* were provided in utilizing the thickness of the table portion 45*c* with protrusions of the same dimensions as the connectors inside. The loss of the connector covers 59 and 119 while the printer 101 is attached to the ASF 1 can be prevented by putting the connector covers 59 and 119 in these connector cover receiving portion 45*d* and 45*e*.

If these connector cover receiving portion 45*d* and 45*e* were used only to hold the covers, they would function in any part of either the ASF 1 or the printer 101. However, by providing the connector cover receiving portion 45*d* and 45*e* on the table as in the present embodiment there is no possibility of losing the operation when they are put between the ASF 1 and the printer 101 and the appearance is preferable because they cannot be seen from the outside.

The user is reminded to attach the connector covers 59 and 119 to the connectors 117 and 44 after separating, the printer 101 because when the printer 101 is separated the connector covers 59 and 119 reappear and prevent the user from forgetting to attaching. The connector cover receiving portion 45*d* and 45*e* can be provided for each of the multiple connector covers. The connector covers of the present embodiment are suitable even if the printer 101 and the ASF 1 have a relationship for example of a notebook PC and a station.

Following is an outline description of the route the sheets for recording follow when fed, and how recording occurs when the printer 101 is attached to the ASF 1 (details appear in a later attachment).

FIG. 4 shows a sectional view when the printer 101 is attached to the ASF 1. In FIG. 4, a pressure plate 26 sets a designated number of sheets to be illustrated later. One end of this pressure plate 26 is rotatably supported by the ASF chassis 11 and activated in a clockwise direction by a designated pressure toward a pick-up rubber (sheet feeding rubber) 23 wrapped around a pick-up roller 19 by a pressure plate spring 13.

When the sheets are set, this pressure plate 26 is moved away from the pick-up rubber 23 by a cam, to be illustrated later, and held there. At this time a designated clearance between the pick-up rubber 23 and the pressure plate 26 is maintained and the sheets are inserted into this clearance and set.

Positioning of the front end of these sheets is effected when the front ends contact an elastic deformable separator sheet 37 made of plastic film on an inclined surface 36. The ASF sheet feeding tray 2 supports a major portion of the rear ends of the sheets. This ASF sheet feeding tray 2 is rotatably supported by the ASF upper case 47 at a designated angle when supporting sheets.

When the ASF 1 receives a sheet feeding command from the printer 101, the pick-up roller 19 begins to rotate in a clockwise direction and the cam releases its hold on the pressure plate 26 simultaneously. The pressure plate 26 presses the sheets against the pick-up rubber 23, a sheet begins to move due to the surface friction of the pick-up rubber 23, and a single sheet is separated by the separating sheet 37 and conveyed in ASF sheet route 58 formed of the inclined surface 36 and the positioning base 39 (see FIG. 3).

Afterwards, the sheet is passed from the ASF sheet discharging portion 56 (see FIG. 3) and transferred via the sheet feeding aperture 101A, a so-called manual sheet feeding aperture (illustrated later) in the single unit of the printer, to a sheet route consist of a platen 105 in the printer and the bottom of a battery 107.

Then the paper end sensor 108 senses that a sheet has been conveyed along the sheet route, thereby the printer 101 recognizes that the sheet has been conveyed from the ASF 1, and the front end of the sheet is abutted to the pressure contact portion between the LF roller 109 and the pinch roller 110. When the ASF 1 receives information of the paper end sensor 108 from the printer 101, it sends a response signal within a predetermined timing to the printer indicating that sheet feeding is completed.

At this time the sheet is pushed on between the LF roller 109 and the pinch roller 110 with a designated pressure by rigidity of the sheet and corrected registration of the front end of the sheet is performed. Then the printer, which has received a response signal from the ASF 1 indicating that sheet feeding is complete, rotates the LF roller 109 for a designated amount of time and sends the sheet toward the recorder comprising a head 115. In this way the sheet is conveyed as designated and the head 115 records on the surface of the sheet. Afterwards, the sheet is conveyed between a discharge roller 112 and a spur 111 and discharged.

The present embodiment is equipped with a sheet pass R, a recording medium pass-through route as described above when the printer 101 is attached to the ASF 1. The sheet pass R of the printer 101 is almost parallel to the attachment direction of the connectors 44 and 117.

However, if a sheet is passed from the ASF 1 to the printer 101 and a sheet jam occurs in either the ASF 1 or the printer 101 when the sheet is inside both, it will be necessary to separate the printer 101 from the ASF 1. Thus the fact that the sheet pass R is almost parallel to the attachment direction of the both makes it possible to separate both in such a situation.

If the sheet pass R was at a right angle to the attachment direction of the connectors, when the printer was detached in the attachment direction of the connectors the sheet would have to be moved across and a danger of the sheet tearing and of some shreds of the sheet remaining within the device would arise. Further more, if a thick sheet that is difficult to tear was used, it could be impossible to detach the printer 101.

However, because the sheet pass R in the present embodiment is almost parallel to the attachment direction of the connectors, when there is a sheet jam the printer 101 can be detached by moving the printer 101 in a direction such that the sheet slides out. As a result, fixing a sheet jam is extremely simple and can be done without tearing the sheets or leaving any pieces of the sheets inside the device.

Next the standard position of the sheet width direction in the sheet pass R described above is explained.

First, the standard in sheet width direction of the printer 101 is described.

Figure 6:
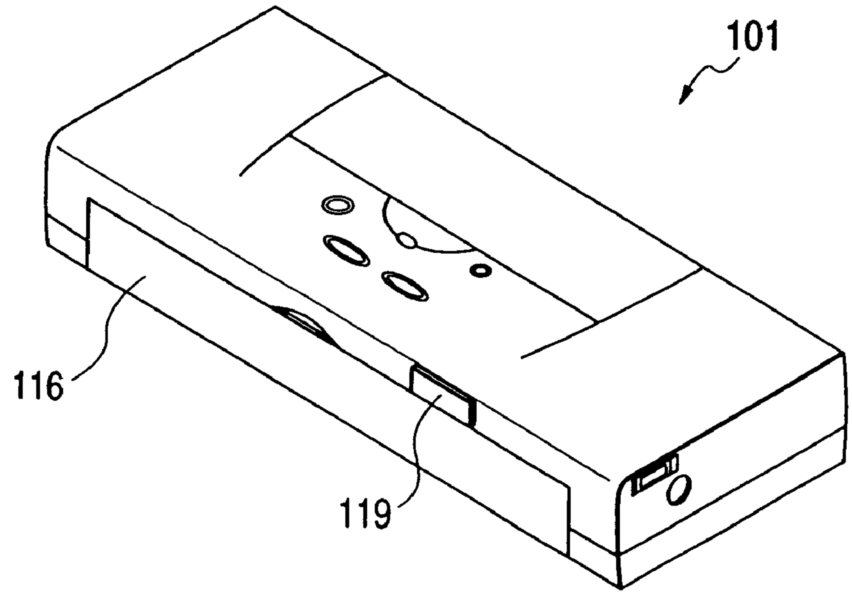
FIG. 6 is a perspective view of an embodiment of the present invention.

As shown in FIGS. 5 and 6, a rotatable sheet feeding tray 116 with one end axially supported in a designated position is provided on the printer 101. When the printer 101 is used as a single unit, this sheet feeding tray 116 stabilizes the manual sheet feeding operation.

When the sheet feeding tray 116 is open, a sheet feeding aperture 101A is opened and a standard guide 116*a*, which is the positioning means for manual sheet feeding, provided perpendicular to one end of the sheet feeding tray 116, appears. When a sheet is inserted, it is inserted along this standard guide 116*a*. In the present embodiment, the sheet width standard is this standard guide 116*a* and positioning across in the sheet width direction is performed by inserting the sheet while keeping the side portion of the sheet in contact with the guide.

A standard guide 101*a* as the main body positioning means is provided in the printer of the present embodiment at the same position with respect to the sheet width direction for positioning in sheet width direction with the standard guide 116*a*. When the sheet feeding tray 116 is open or closed held by a toggle means, not shown in the Figure, in each condition.

As this guide stabilizes the sheet in the conveying direction when the sheet is lengthwise, the standard guide 116*a* provided on the sheet feeding tray 116 stabilizes the positioning of the sheet across its width and prevents skew feeding. However, it is also possible to guide the sheet with only the standard guide 116*a* provided on the movable sheet feeding tray 116 without the standard guide inside the printer.

As mentioned before, the manual sheet feeding aperture and the sheet feeding aperture of the ASF are separate in a super-miniature mobile printer and one must feed sheets through each sheet feeding aperture because it is extremely difficult to have separate sheet guides given the problems of space.

As a result, when the printer 101 is connected to the ASF 1, the standard guide 116*a* which is the sheet standard when manually sheet feeding must also be used when sheet feeding from the ASF 1, but sheet feeding while keeping the side of the sheet auto fed from the ASF 1 along (in contact with) this standard guide 116*a* is extremely difficult. This is because for the ASF 1 to keep the side of the sheet along the standard guide 116*a* in the same way as the user does when adjusting by hand, the sheet standards of the printer 101 and the ASF 1 must be perfectly uniform.

In the present embodiment the sheet standard of the ASF 1 is an ASF sheet standard 26*b* provided on the pressure plate 26 as an auto sheet feeding positioning means. Sheets are put in a designated position by keeping the side of the sheet in contact with this standard when feeding. It is extremely difficult and would necessitate high costs and complex mechanisms to make the position of this guide uniform with the position of standard guide 116*a* because the structural tolerance between them becomes great.

However, if the sheet standards are not uniform the side of the sheet and the standard guide 116*a* will interfere with each other, and such things as skew feeding of the sheet, damage to the sheet edge portion, or sheet jams due to the front edge of the sheet colliding with the standard guide 116*a* will result.

Thus, for example if the standard guide 116*a* is provided only in a relatively upstream place on the manual sheet feeding portion of the printer 101, in other words if the standard sheet width is determined only by the standard guide 116*a* which appears when the movable sheet feeding tray 116 is open as shown in FIG. 5, and if there is no member for restricting the positioning of the sheet downstream of that, when the printer 101 is attached to the ASF 1, by setting the sheet pass R such that the sheet passes through above the base guide 116*a* only the sheet standard 26*b* of the ASF 1 will be effective for positioning the sheet and interference from the sheet standard of the printer 101 can be avoided.

Further, as shown in FIG. 5, the surface for guiding the sheet of sheet feeding tray 116 is almost horizontal when the sheet feeding tray is open on the printer as a single unit, in other words when manually sheet feeding, but as can be seen in FIG. 4 by rotating the movable sheet feeding tray 116 when the printer 101 is attached to the ASF 1 to a position even lower than its position on the printer as a single unit, the sheet pass is closer to the sheet pass of manual sheet feed.

The ASF side has a standard guide receiving portion 36*b* which is a tray receiver for receiving the sheet feeding tray 116 by rotating it into a designated position. Thus, when pushing the printer 101 into the ASF 1, the standard guide 116*a* is guided by a standard guide 36*c* that forms the standard guide receiving portion 36*b*, and the standard guide 116a is received in the base guide receiving portion 36*b*. The standard guide receiving portion 36*b* is disposed within the inclined surface 36.

In this way, the amount the sheet pass of the ASF 1 must move with regard to the sheet pass during manual feeding in order to avoid interference of the standard guide 116*a* with the sheet pass is decreased, and inconveniences due to unnatural sheet pass (back tension to the sheet, etc.) can be prevented.

In the present embodiment, the sheet feeding tray 116 on the printer side has a right edge guide 122 which is another positioning member for guiding the other edge of the sheet as shown in FIG. 6. This right edge guide 122 is provided so that it can slide in the direction of the sheet width across the sheet feeding tray 116 and guides the edge of the sheet opposite to the standard edge in accordance with the width of the sheet.

The form of the right edge guide 122 is almost the same as the form of the base guide 116*a* seen from the sheet thickness direction of the sheet pass, and it is made such that when the printer 101 is attached to the ASF 1 it is received by the standard guide receiving portion 36*b* along with the sheet feeding tray 116 and the standard guide 116*a*. The right edge guide 122 also can be moved to an optional position within a designated range on the sheet feeding tray 116, but no matter where the right edge guide 122 is within that designated range the standard guide receiving portion 36*b* is made so that it can receive the sheet feeding tray 116 comprising the standard guide 116*a* and the right edge guide 122.

When the printer 101 is attached to the ASF 1, by setting the sheet pass to a position in which it avoids the standard guide 116*a* and the right edge guide 122, the sheet standard of the printer main body is ineffective and only the sheet standard of the ASF is effective. Therefore greater complexity to the equipment and higher costs due to making both sheet bases uniform can be prevented.

Further, skew feeding the sheets and damage due to the sheet standard 116*a* of the printer main body and the right edge guide 122 interfering with the edges of the sheets fed from the ASF 1 and sheet jams due to the sheets colliding with the sheet standard 116*a* and the right edge guide 122 can be prevented.

Up until this point of the explanation the embodiment was constructed such that the sheet passes through over the standard guide 116*a*, but the present embodiment is not limited to this construction. For example, it can also be constructed such that the sheet passes by the side of the standard guide 116*a* by providing a standard guide 116*a* on the sheet feeding tray 116 that can slide across the width of the sheet, and by sliding this standard guide 116*a* across the width of the sheet through a movement means such as a cam used by linking it to the operation of attaching the printer.

On the other hand, there is also a standard guide 101*a* inside the printer in the same position with regard to the sheet width as the standard guide 116*a*, and it is difficult to set the sheet pass to avoid all of the standard guides for sheets whose positioning is stabilized by increasing the length the sheet is guided.

Figure 7:
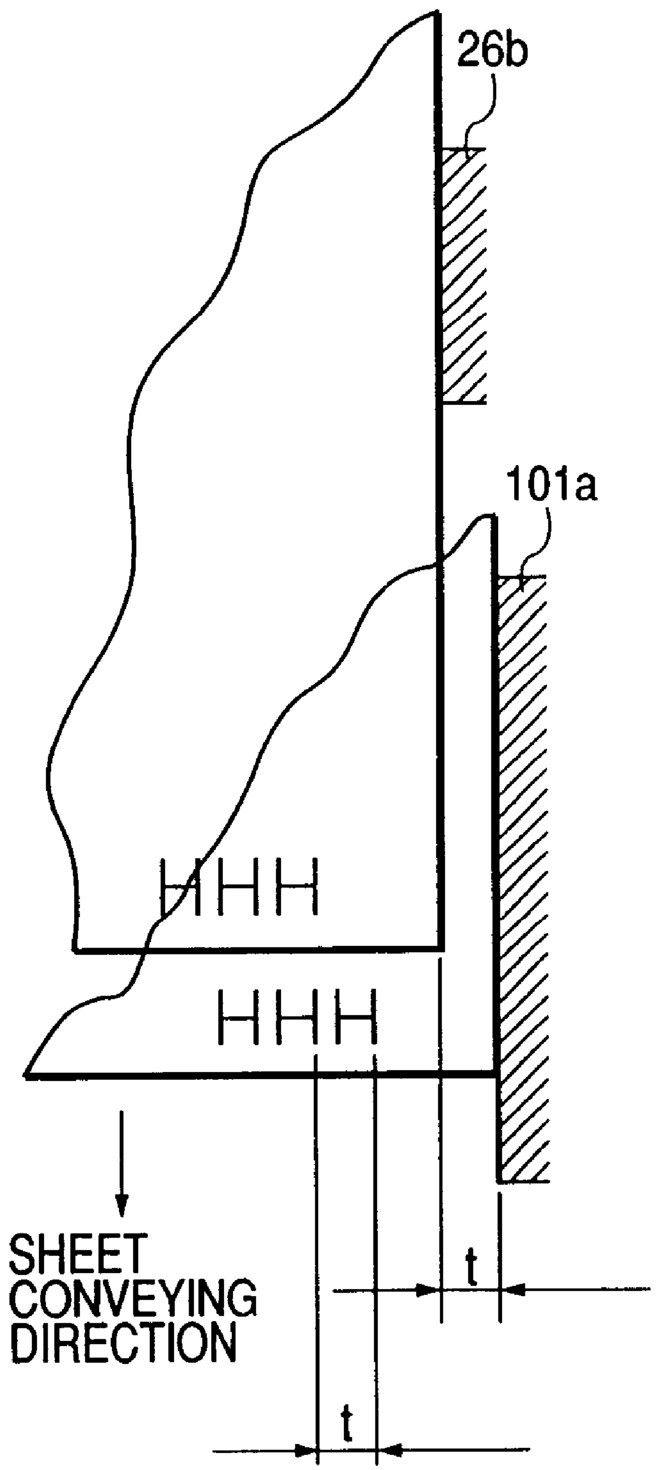
FIG. 7 is a schematic plan view of an embodiment of the present invention.

Therefore, in such a situation, the sheet standard guide 101*a* on the printer side and the sheet standard 26*b* on the ASF side should be set in positions slightly askew in advance as shown in FIG. 7. In other words, the sheet standard 26*b* on the ASF side is set in a spot askew only by the amount t toward the inner side of the sheet standard 116*a* on the printer side, or toward the recording position side which is the side at a right angle to the sheet conveying direction by the head 115, so that when sheet feeding from the ASF 1 the sheet standard 101*a* on the printer side will not interfere with the sheet.

Here, the value t by which the sheet standard is set off is greater than the tolerance of positioning of the sheet width between the printer 101 and the ASF 1, and is determined by referring to such instances as when the sheets were fed askew from the ASF. In the present embodiment, the value t by which the sheet standard is set off is about 0.6 mm.

In this situation, because the sheet standards when recording on the printer as a single unit and when recording with the printer attached to the ASF are not aligned, if one records with the head 115 in the same position on both the distance of the sheet width from the side of the sheet to the recording position will be different for both.

Therefore, in the present embodiment, the recording position for the printer as a single unit and for the printer when attached to the ASF should differ by the same amount t as the sheet standard position was set off. For example, in the present embodiment, because the printer 101 is electrically connected to the ASF 1 by connectors 44 and 117, the printer 101 electrically senses whether the ASF 1 is attached or detached and can decide to set off the recording position (the position of the head 115) according to the result of the sensor. This decision can also be made by setting up an ASF sensor switch, as well as through the electrical connection.

In this way interference from the standard guides can be eliminated by setting off the sheet standard of the single unit of the printer and the sheet standard when attached to the ASF from each other and the recording position on the sheet can be set identically. Accordingly inconveniences due to differences in recording positions between the recording of both (for example, differences in recording position on a preprint sheet) are eliminated. Even if the amount the two sheet standards are set off and the amount the two recording positions are set off are not exactly the same, different values within an allowed range may be set.

Next the ASF sheet feeding tray 2 which supports loaded sheets is explained.

Figure 8:
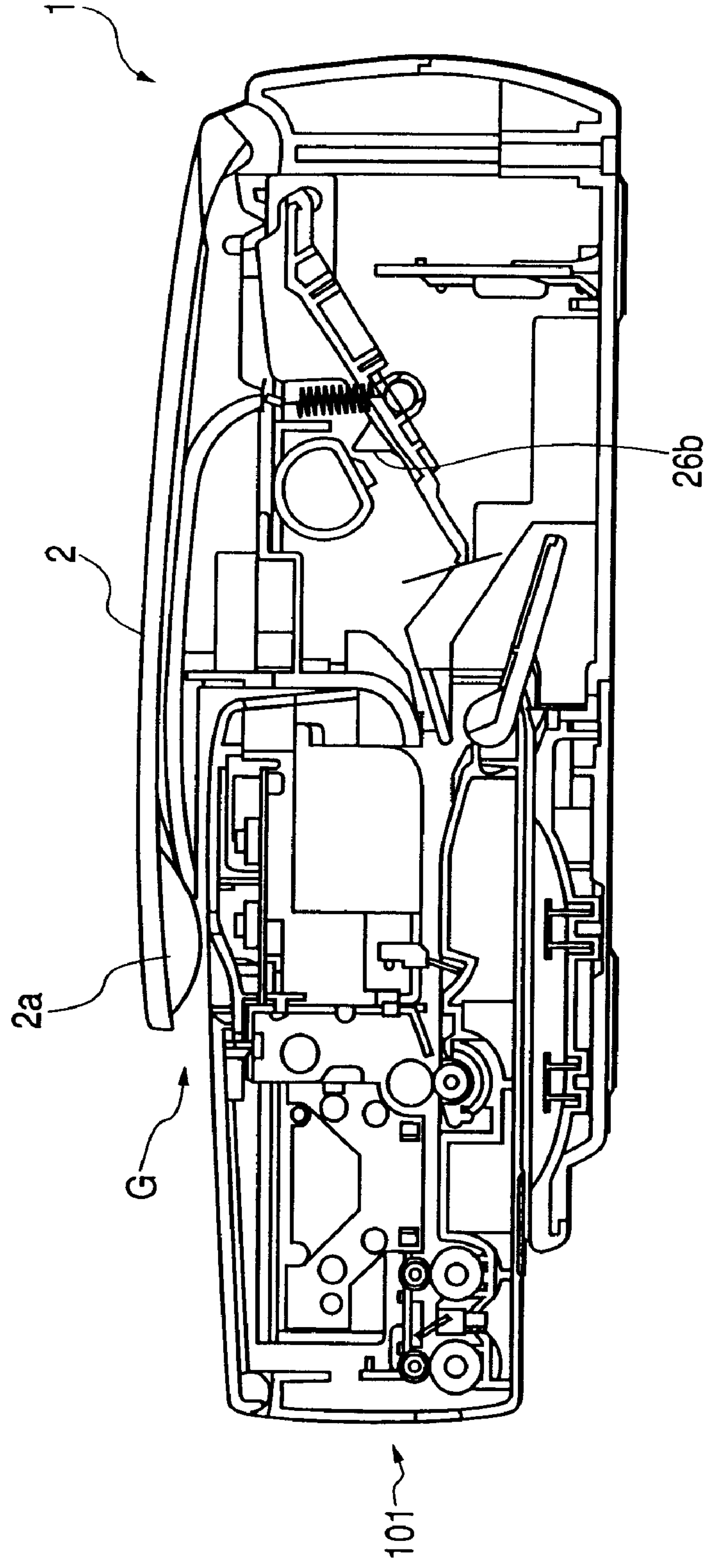
FIG. 8 is a sectional view of an embodiment of the present invention.

As shown in FIGS. 1 through 4, the ASF sheet feeding tray 2 is supported on one end by the ASF case 47, and is rotatable such that it can be folded around this supporting portion. When sheets are loaded on this ASF sheet feeding tray 2 it is opened to a designated angle. When sheets are not loaded on to it, it can be folded as shown in FIG. 8 and closed.

This is not for the purpose of allowing the ASF 1 to use a portable printer 101 as a desktop model given the present embodiment, rather it indicates that it is possible to carry the printer 101 even when attached to the ASF 1 as it is extremely compact.

In order to realize this form it is necessary for the ASF sheet feeding tray 2 when closed to close with a form fitting the outer shape of the ASF 1 as closely as possible when the printer is attached. For this purpose the ASF sheet feeding tray is made in a thin plate shape.

Figure 9:
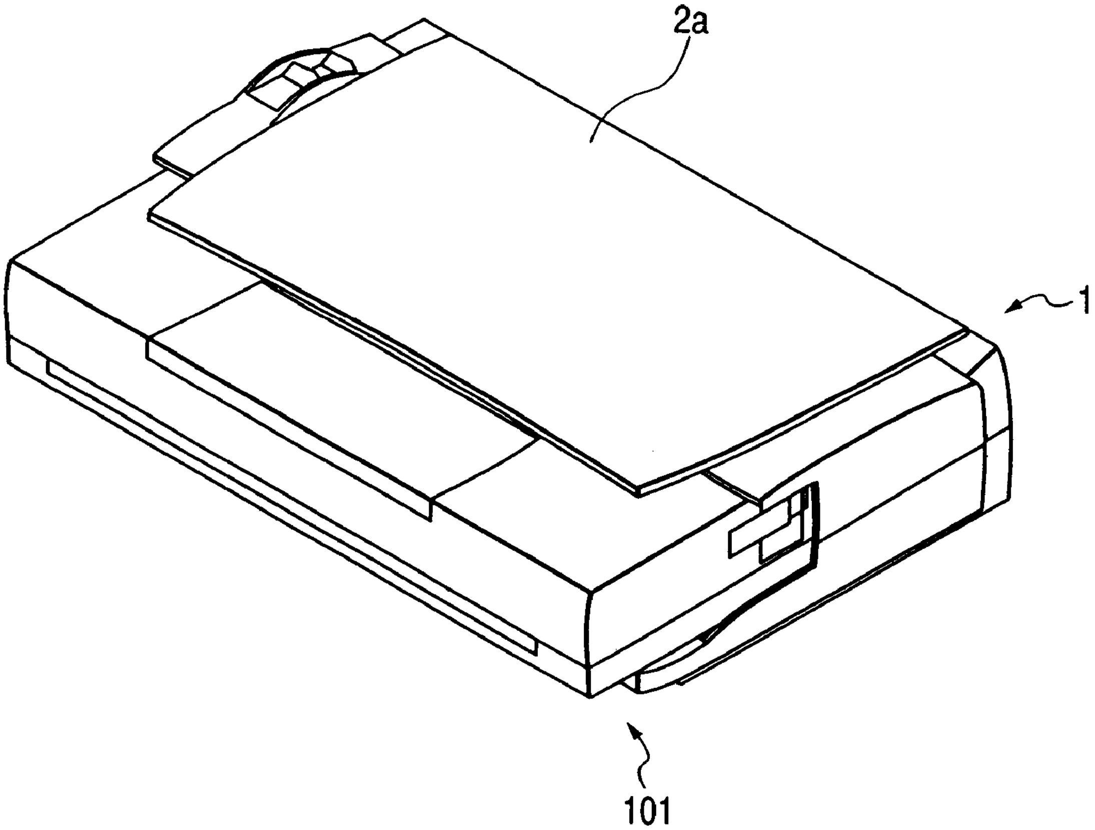
FIG. 9 is a perspective view of an embodiment of the present invention.

Further, in the present embodiment, when the sheet feeding tray 2 is closed, there is no danger that the operation parts will be touched carelessly and the printer 101 operated when carrying the ASF 1 with the printer 101 attached, because it covers the operation parts of the printer 101 as shown in FIG. 9.

Also, when the sheet feeding tray 2 is folded up, it interlocks with the ASF case 47 through an optional interlocking means such as a hook (not shown in the drawings), desirable because with it the sheet feeding tray 2 can not be carelessly opened while it is carried. This interlocking means for the sheet feeding tray 2 may be provided onto the main body of the printer or onto the ASF itself, but the best embodiment is to provide such an interlocking means onto the side guide 2*a* to be described later. If an interlocking means is used on the main body of the printer, it can perform the double function of holding the ASF 1 and the printer 101 together (or of an integral lock).

Figure 10:
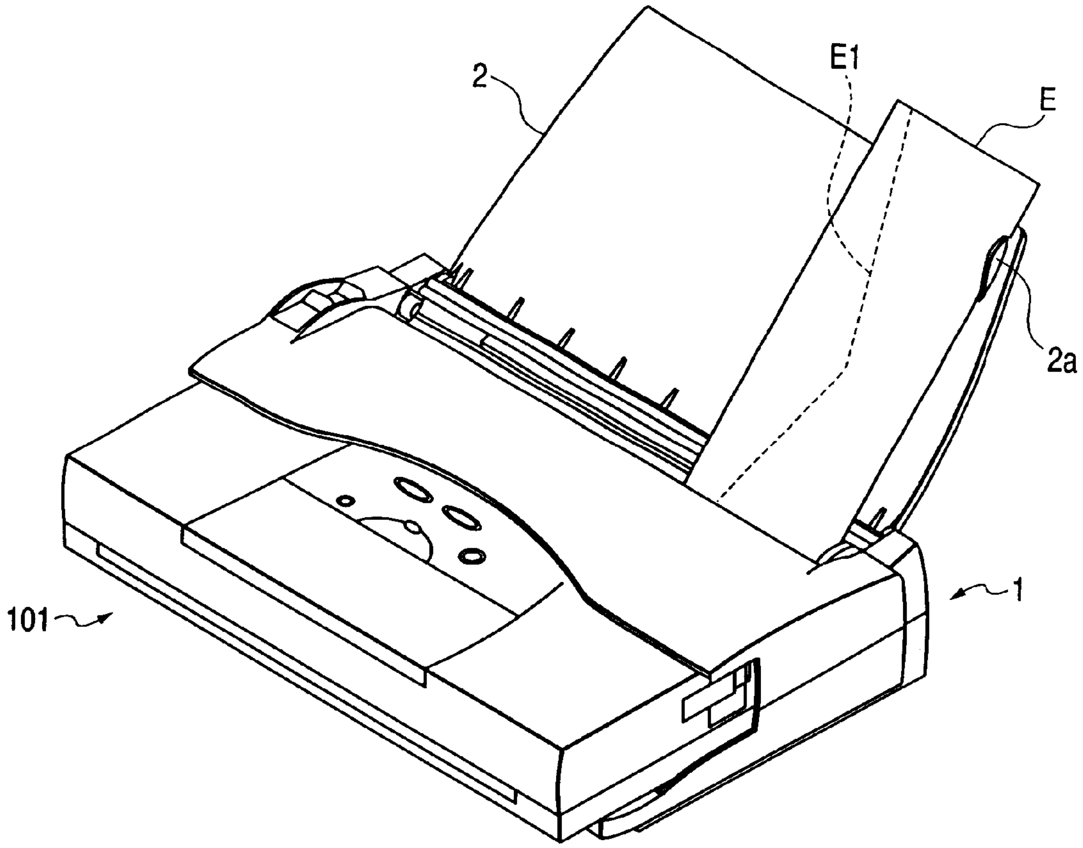
FIG. 10 is a perspective view of an embodiment of the present invention.

As shown in FIG. 10, when feeding an envelope E vertically with the ASF 1, usually the flap E1 of the envelope is on the left side and the ASF 1 in the present embodiment receives strong resistance from the tab side (left side) when feeding it due to swelling of the flap E1 from moisture. The envelope E is thus forced to rotate in a clockwise direction.

Therefore in the present embodiment, in order to prevent (restrict) rotation in a clockwise direction of the envelope E, in other words movement at a right angle to the sheet feeding direction, an ASF sheet feeding tray side guide 2*a* (hereinafter referred to as a side guide) which restricts the upstream side of the sheet feeding direction of the ASF sheet feeding tray 2 was provided on. By providing on such a side guide 2*a*, after the envelope E is set vertically in the ASF 1, when it is fed, even if there is a rotating force on the envelope E the right side of the rear end of the envelope will contact the side guide 2*a* and any clockwise rotation will be restricted.

However, there is a resistance of the flap E1 when sheet feeding an envelope vertically, particularly to the timing for conveying the envelope E. In the present embodiment, this occurs when the envelope E passes over the inclined sheet 37 and when the front of the envelope is lifted up along the incline of the incline 36 directly after that. Thus, the influence of the resistance of the flap E1 decreases when it surpasses the timing, and rotation of the envelope E does not occur even if there is no side guide 2*a*.

For this reason, a side guide 2*a* is provided on one part of the ASF sheet feeding tray 2 near the position of the rear end of the envelope E in the present embodiment, which prevents rotation of the envelope, but a side guide spanning the entire length of the envelope was not provided.

Further, in the present embodiment, when the printer 101 is attached there is a level difference G between the ASF case 47 and the top of the printer as shown in FIG. 8. When the ASF sheet feeding tray 2 is closed the side guide 2*a* fits into that level difference G as shown in the same Figure.

Thus, by providing the side guide 2*a* onto one part of the ASF sheet feeding tray 2 in this way and fitting the side guide 2*a* into the level difference G, the side guide 2*a* does not interfere with other parts when the ASF sheet feeding tray 2 is closed, the ASF sheet feeding tray 2 can be fitted into a shape that follows the external form of the ASF, and the portability is not damaged and miniaturization is possible.

Incidentally, the side guide 2*a* must have a height greater than that of sheets such as envelopes when loaded, and the G must be higher than the side guide 2*a* in order to achieve the above effect.

The present embodiment prevents rotation during conveyance of an envelope vertically, but it can also prevent (regulate) rotation for any reason not only during vertical conveyance of an envelope but during conveyance of other sheets having a length as great as an envelope. Also, the side guide 2*a* can be provided at an extremely low cost because it is formed as a single body with the ASF sheet feeding tray 2. The side guide 2*a* may also be formed such that there is no level difference G when the tray is shut, for example a concavity may be provided in advance into the printer 101 or the ASF 1 and the side guide 2*a* can be fit into this concavity.

If employing a side guide with such a construction on the sheet feeding tray 116 of the printer 101, it can restrict sheet rotation even when using the printer 101 as a single unit. Further, by forming the side guide and the sheet feeding tray 116 as a single body, the side guide will not interfere with other parts when the sheet feeding tray 116 is shut, the sheet feeding tray 116 can be fit along the external shape of the printer, and the portability will not be damaged and miniaturization is possible.

Next the printer attachment and detachment mechanism of the ASF is described.

Figure 12:
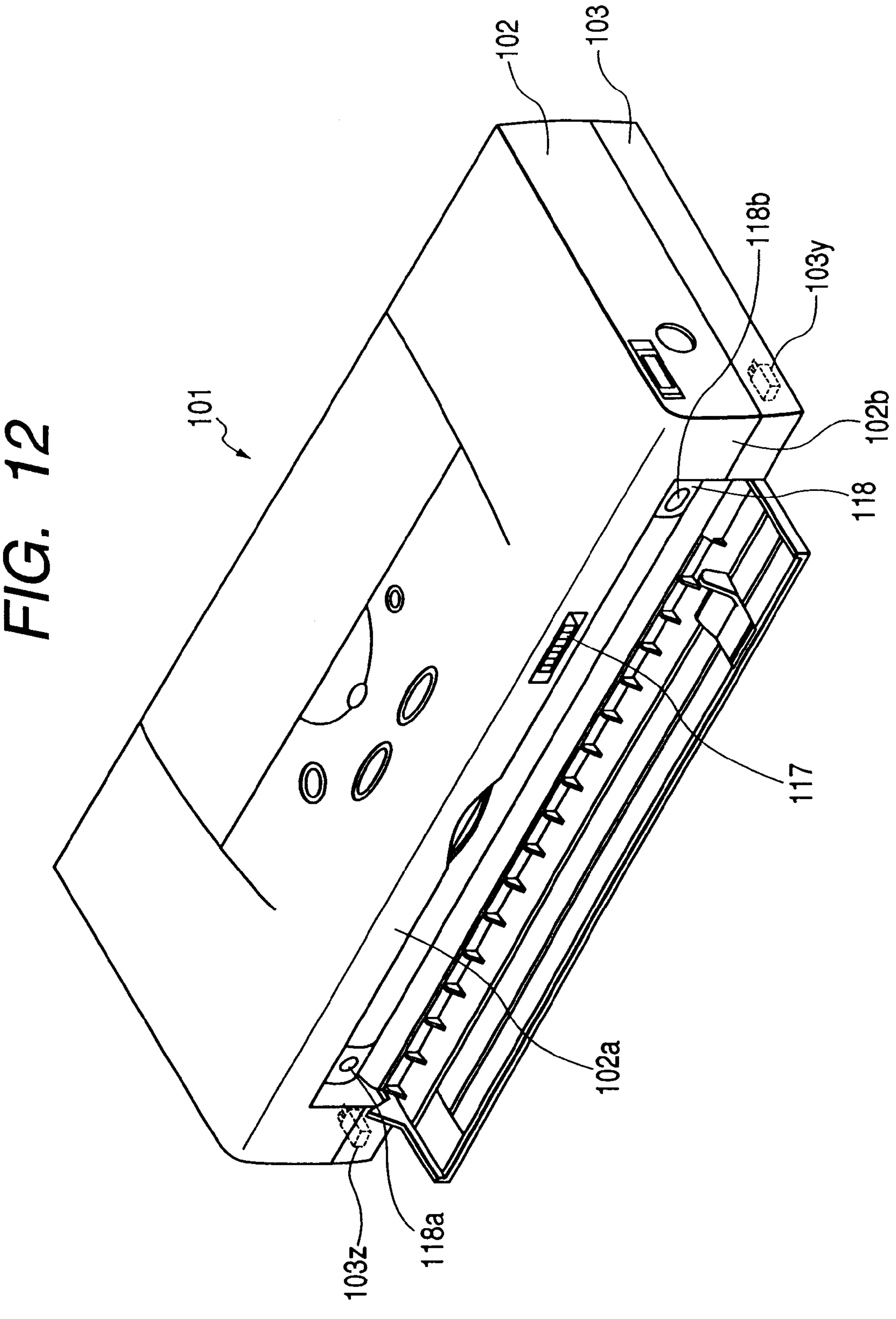
FIG. 12 is a perspective view showing the arrangement of parts relating to the printer attachment/detachment of the ASF when attached to the ASF of the present invention.

FIG. 11 is a perspective view showing the placement of parts relating to the printer attachment and detachment mechanism of the ASF 1. FIG. 12 is a drawing showing the placement of parts relating to the attachment to and detachment from the ASF 1 of the printer 101.

In FIG. 11, 39 is a positioning standard which positions the sheet pass between the ASF 1 and the printer and positions the connection of the ASF connector 44 of the ASF 1 to the printer connector 117.

Two positioning bosses 39*d* and 39*e* are provided onto the positioning standard 39. When the printer 101 is attached to the ASF 1, before the ASF connector 44 is connected to the printer connector 117, the first positioning hub 39*d* is fitted into the positioning hole 118*a* provided onto the plate holder 118 of the printer 101 shown in FIG. 12 and the second positioning hub 39*e* is fitted into the oblong positioning hole 118*b*.

Damage to the connectors through positioning slips between the connectors is prevented because the connectors are connected after positioning by fitting the two positioning bosses 39*d* and 39*e* into the positioning holes 118*a* and 118*b*. Also, positioning of the sheet pass between the printer 101 and the ASF 1 is completed at the same time because positioning of the ASF 1 and the printer in the x and the z directions is performed by fitting in the bosses 39*d* and 39*e*.

A hook (left) 16 and a hook (right) 17 are provided into the printer slider 45*b* of the ASF 1 such that they can be pressed down or pulled up to position the printer in the y direction after it is attached to the ASF 1. On the printer side, hook stabilizer holes 103*y* and 103*z* are provided into both sides of the base 103 of the printer 101 that interlock with the two hooks 16 and 17.

Thus, when the printer 101 is attached to the ASF 1, hook (left) 16 and hook (right) 17 provided on the ASF 1 interlock respectively with hook stabilizing holes 103*y* and 103*z* provided onto the printer and stabilize the printer 101 in the y direction.

The user detaches the printer 101 from the ASF 1 by pressing the push lever 40 in the direction shown by arrow 40A. In other words, when the push lever 40 is pressed, hook (left) 16 and hook (right) 17 which protrude from the printer slider 45*b* retreat in the direction of arrow 40A and are released from the hook stabilizer holes 103*y* and 103*z* of the printer 101.

Afterward, the connection of connector 44 to 117 is released by pressing the upper portion of the sheet discharge side 102*a* of the printer 101 in the direction of 43A (the y direction) by pop-ups 43*a* and 43*b* provided onto the ASF 1. These pop-ups 43*a* and 43*b* are activated in the direction of 43A (the y direction) by an elastic member not shown in the drawing and can be slid in the y direction.

As the force biasing the pop-ups 43*a* and 43*b* works with an opposing force when attaching the printer 101 to the ASF 1, if the biasing force is strong, the printer 101 can not be pushed into the ASF 1 and attachment is not possible. Therefore an appropriate biasing force is set. (For example, an biasing force that will not move the ASF 1 when the printer 101 is attached to the ASF 1.)

However, there are situations in which the extraction force needed to break the connection between the connectors is greater than the biasing force of the pop-ups 43*a* and 43*b*. In such a situation, the connection between the connectors can not only be released by the pop-ups 43*a* and 43*b*. Therefore, the present embodiment is constructed such that by pushing the push lever 40 in the direction of arrow 40A a protruding portion 40*b* of the push lever 40 protrudes in the y direction.

Thus, the connection between the connectors (44 and 117) is released by protruding the protruding portion 40*b* of the push lever 40 and pressing the lower portion (or center portion) of the sheet discharge side of the printer 101. By doing so, the user can easily pull the printer 101 from the ASF 1 in the y direction.

Next the attachment and detachment mechanisms of the ASF 1 and the printer 101 are explained further in detail.

Figure 13:
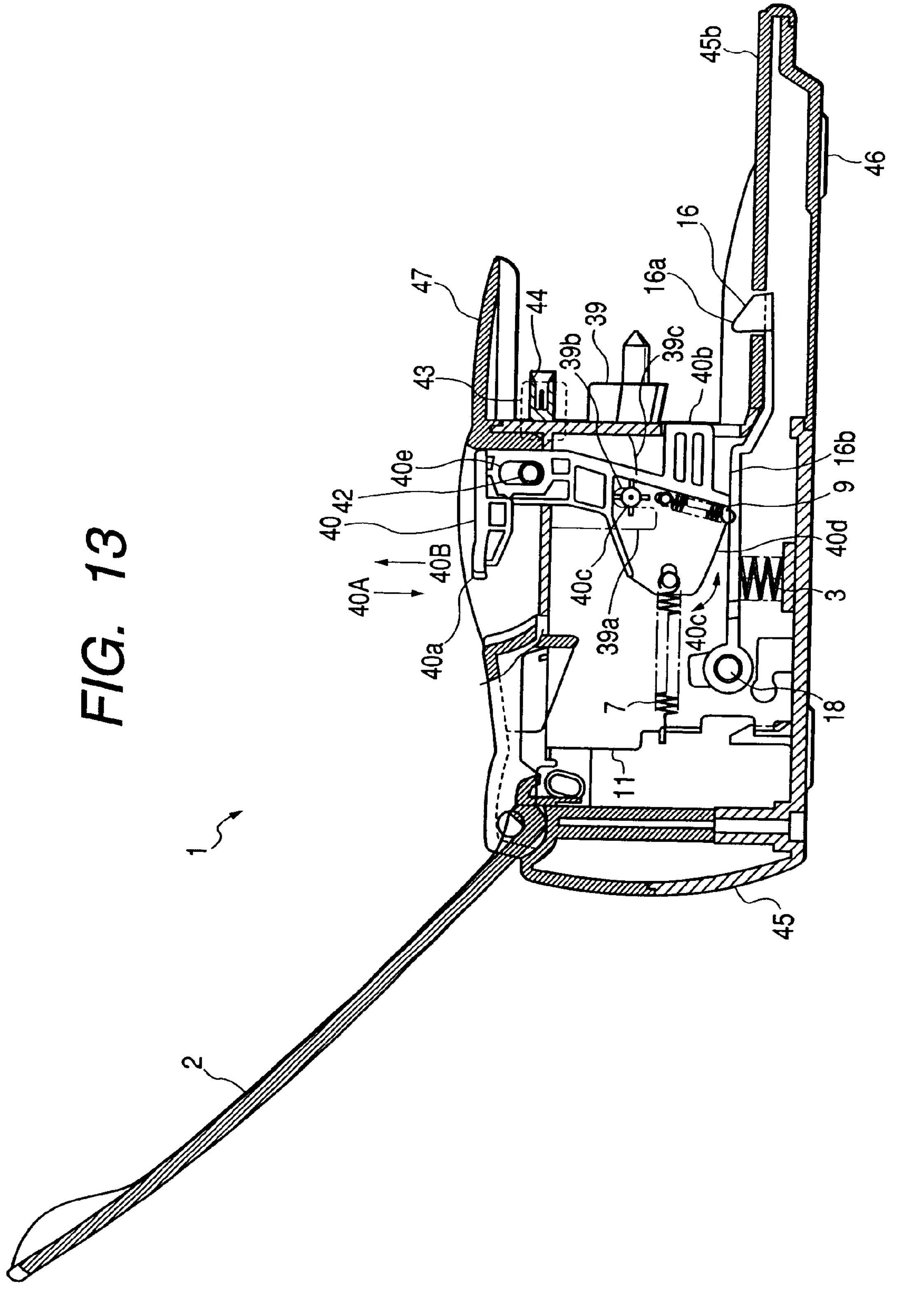
FIG. 13 is a left sectional view explaining the printer attachment/detachment mechanism for the ASF of the present invention.

FIG. 13 shows the placement of the mechanical parts relating to the printer detachment and attachment to the ASF 1. As shown in FIG. 13, the push lever 40 is attached rotatably (arrows 40A, 40B, and 40C) on a lever shaft 42 secured on a positioning base 39. The push lever 40 is linked to the chassis 11 of the ASF 1 by a push lever spring 7.

A boss 40*c* is provided onto the push lever 40 as a rotation stopper and slide surfaces 39*a*, 39*b*, and 39*c* that collide with the hub 40*c* are provided onto the positioning base 39. Here the slide surface 39*c* is shown by a dotted line so the construction is easy to understand. With this construction, the rotation of the lever shaft 42 of the push lever 40 around a rotation center is restricted when the hub 40*c* of the push lever 40 collides with the guide surface 39*a.*

The hook (left) 16, along with the hook (right) 17, is secured to a hook shaft 18 mounted rotatably on the chassis 11. In this way the hook (left) 16 and the hook (right) 17 are linked. A connecting spring 9 is attached between the hook (left) 16 and the push lever 40. The lower portion 40*d* of the push lever 40 is usually held abutting the upper surface of the hook (left) 16 by this connecting spring 9.

A hook spring 3 is attached between the hook (left) 16 and the ASF base. The claw part of the hook (left) 16 is held protruding from the printer slider 45*b* of the ASF base 45 by this hook spring 3.

Figure 14:
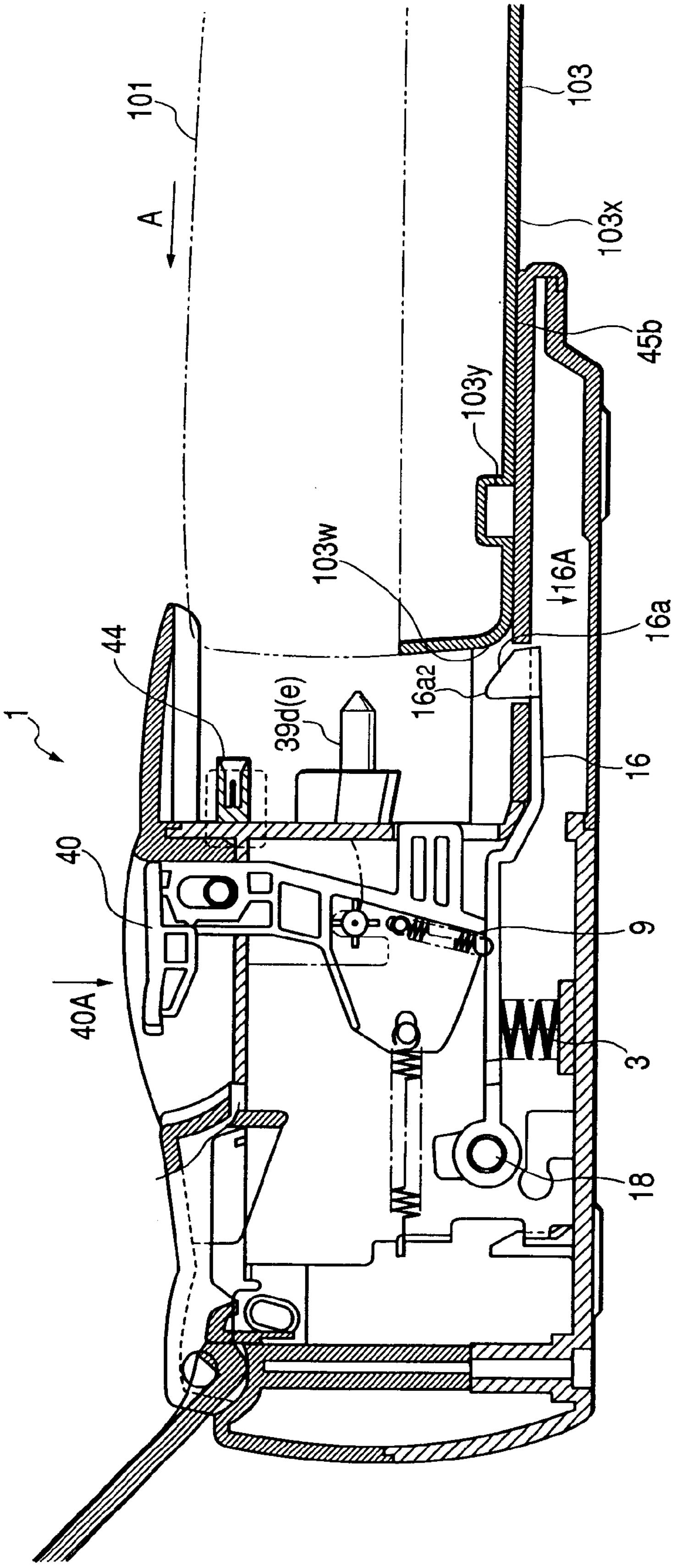
FIG. 14 is a left sectional view explaining the printer attachment/detachment mechanism for the ASF of the present invention.

FIG. 14 shows the printer set on top of the printer slider 45*b* in order to attach the printer 101 to the ASF 1. In FIG. 14, the printer 101 is shown by a chain double-dashed line in order to explain the mechanism in a way that is easy to understand. The base 103 of the printer is shown as a sectional view.

When the printer 101 is moved along the printer slider 45*b* of the ASF base 45 in the direction of arrow A and pushed into the ASF 1, first the claw portion 16*a* of the hook (left) 16 abuts the base front end 103*w* of the printer 101. When the printer is pushed further, the hook (left) 16 is pushed down in the direction of arrow 16A with a hook shaft 18 as the rotating axis and soon the upper end 16*a*2 of the claw portion 16*a* abuts the bottom surface 103*x* of the base 103. At the same time, the push lever 40 lowers in the direction of arrow 40A as it is linked to the hook (left) 16 by the connecting spring 9.

Figure 15:
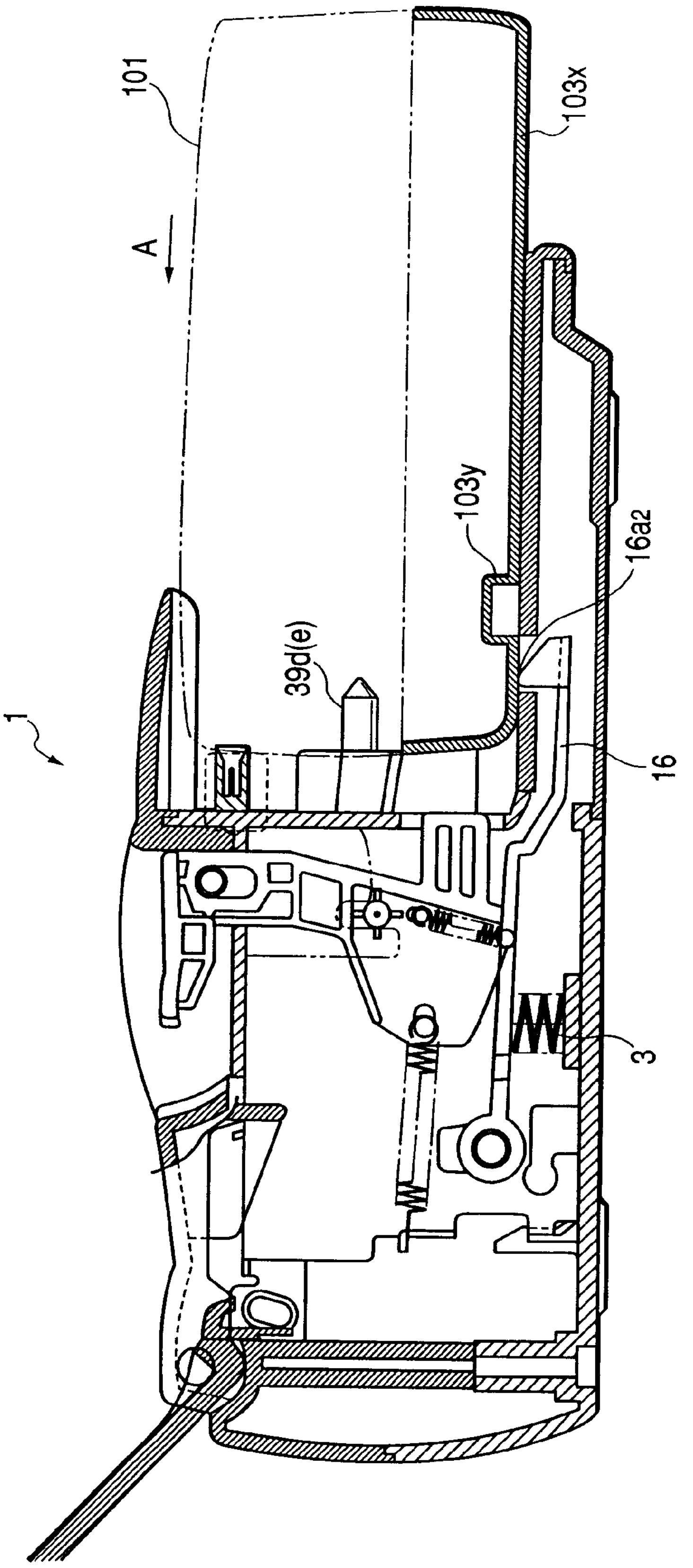
FIG. 15 is a left sectional view explaining the printer attachment/detachment mechanism for the ASF of the present invention.

In this pushed in position, the positioning bosses 39*d* and 39*e* are meshed into positioning hole 118*a* (see FIG. 12) and oblong positioning hole 118*b* (see FIG. 12) of the printer 101 as shown in FIG. 15 and the pre-connection connector positioning of the ASF connector 44 (see FIG. 13) and the printer connector 117 (see FIG. 12) is done.

Figure 16:
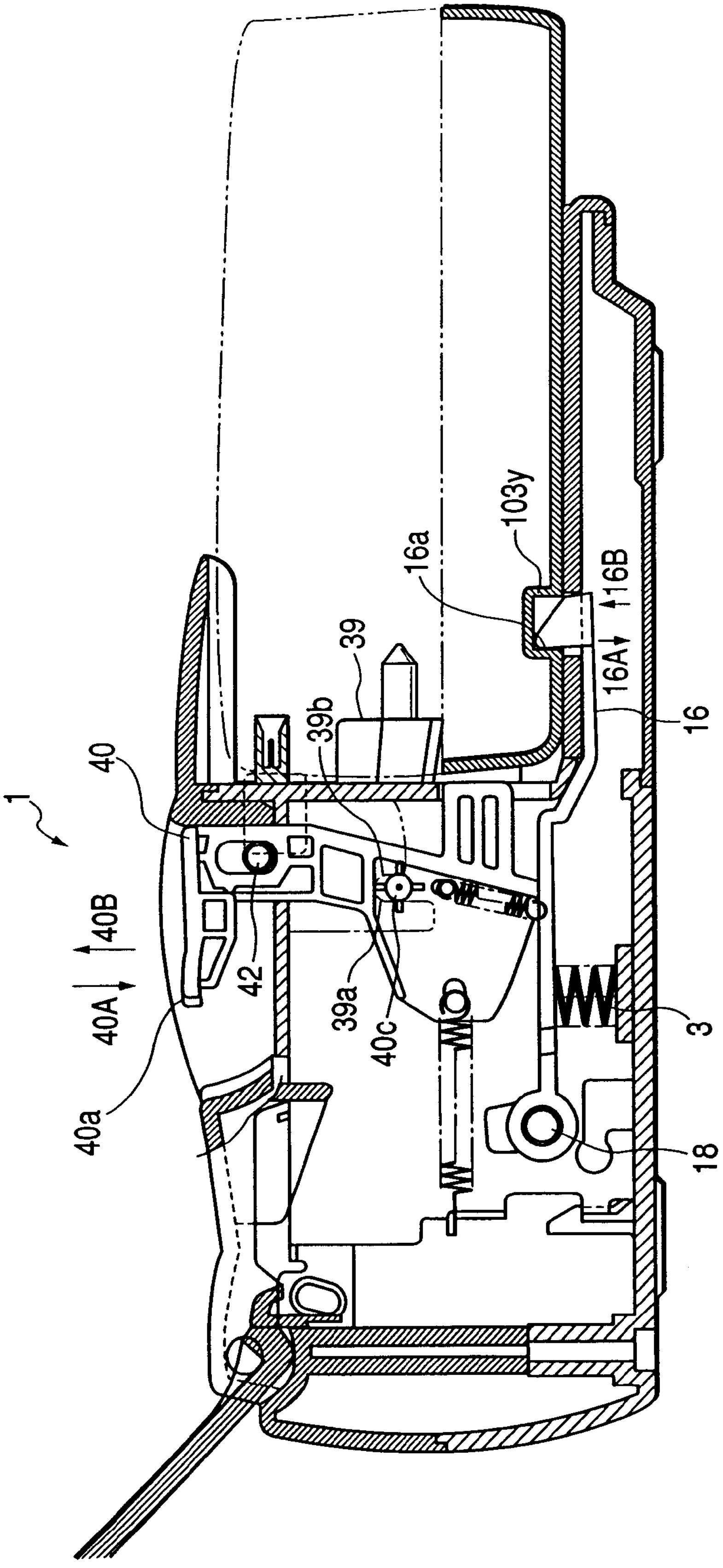
FIG. 16 is a left sectional view explaining the printer attachment/detachment mechanism for the ASF of the present invention.

Afterwards, when the printer is pushed further, the ASF connector 44 is connected to the connector 117. Then, when the claw portion 16*a* of the hook (left) 16 reaches the hook securing hole 103*y* of the printer 101, the hook (left) 16 rises in the direction of arrow 16B through the biasing force of the hook spring 3 as shown in FIG. 16 and abuts the wall of the hook securing hole 103*y* of the printer 101 and they mesh together.

At the same time, the push lever 40 is also linked and rises in the direction of 40B. Due to this action the user can confirm that the printer is attached (secured) to the ASF 1.

Because the hook (left) 16 and the hook (right) 17 are secured on the hook shaft 18, as long as both hooks 16 and 17 do not enter the hook securing holes 103*y* and 103*z* on the printer 101 (see FIG. 12) the push lever 40 will not rise in the direction of arrow 40B. For example, the user can prevent incomplete attachment such as when the printer 101 is attached to the ASF 1 askew and one hook is not fitted into the hook securing hole of the printer 101 by checking the height of the push lever 40.

However, in the present embodiment, the position of the hooks 16 and 17 when meshed with the printer 101 is set to the same position as the rotation center of the hooks 16 and 17 or to a position slightly higher than that rotation center. Thus, if the user tries to forcibly detach the printer 101 from the ASF 1, the hooks 16 and 17 will stop in a position proportionate to the force, or in other words in a position at the same height as the center of rotation of the hooks 16 and 17, and the printer can not be removed from the ASF 1.

Next, detachment of the printer 101 from the ASF 1 is explained.

The user performs the operation of pressing the push part 40*a* of the push lever 40 in the direction of arrow 40A by hand as shown in FIG. 16 to detach the printer 101 from the ASF 1. At this time, because the push lever 40 is sandwiched between the guide surfaces 39*a* and 39*b* provided onto the positioning base 39, it cannot rotate around the lever shaft 42 until the guide surface 39*a* is gone, and it moves downward in the direction of arrow 40A.

Figure 17:
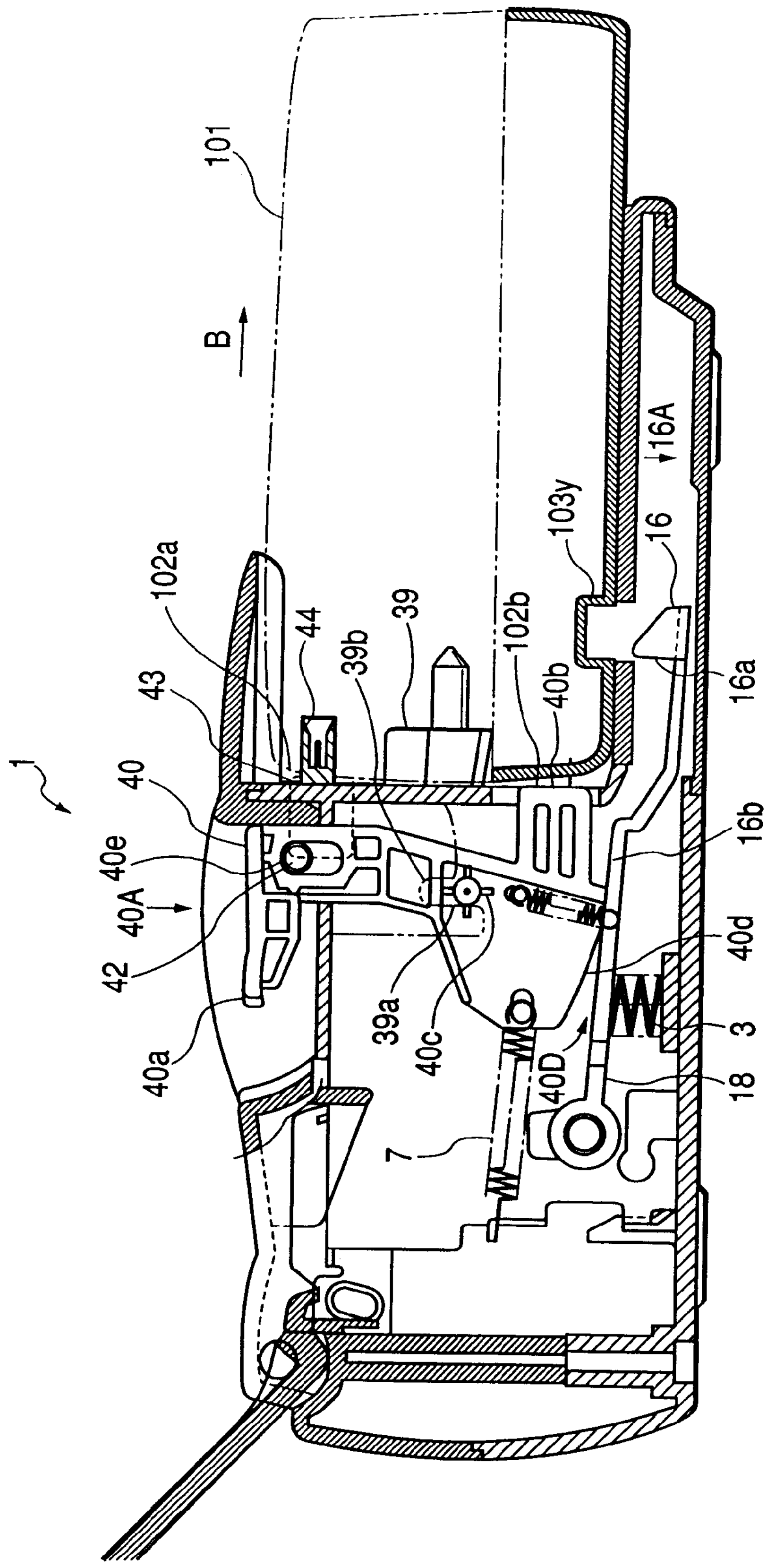
FIG. 17 is a left sectional view explaining the printer attachment/detachment mechanism for the ASF of the present invention.
Figure 18:
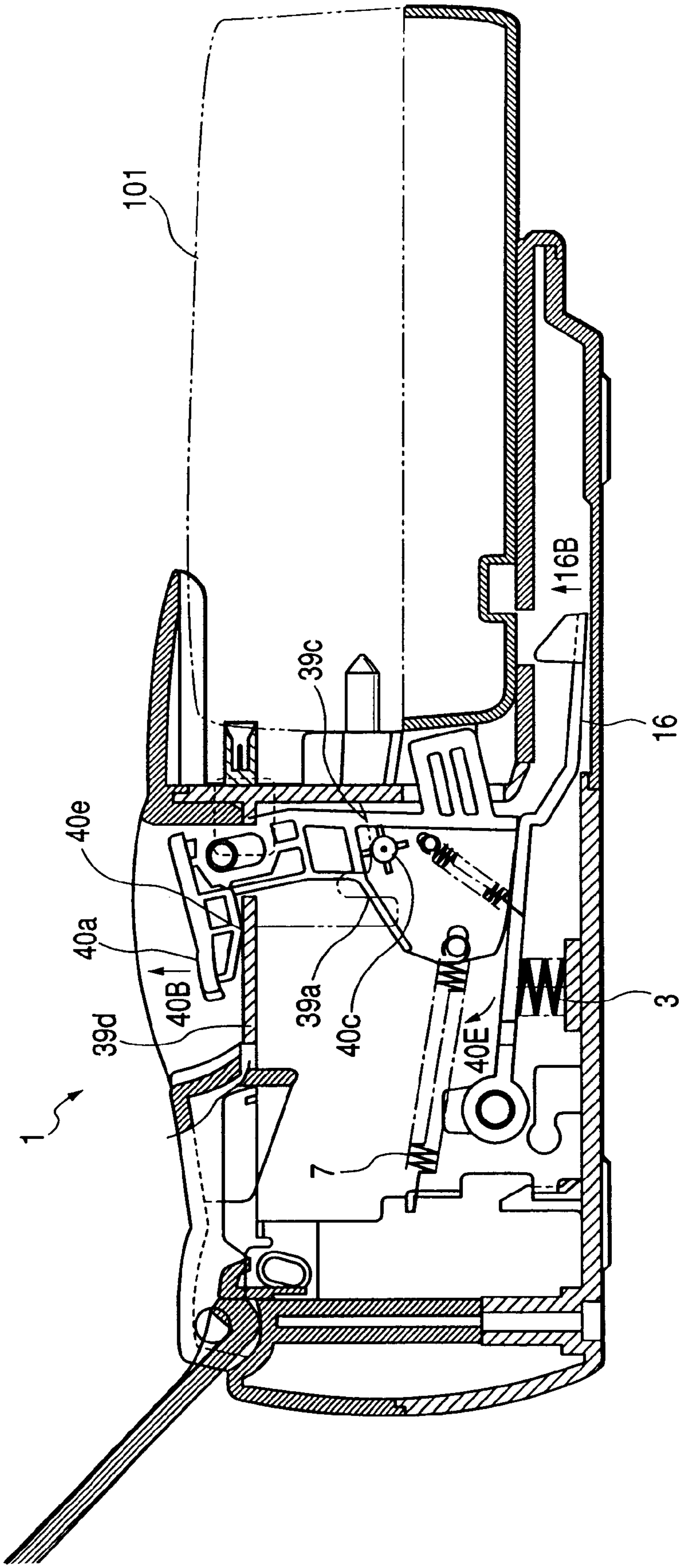
FIG. 18 is a left sectional view explaining the printer attachment/detachment mechanism for the ASF of the present invention.

At the same time as the push lever 40 moves downward, hook (left) 16 rotates around the hook shaft 18 in the direction of arrow 16A because the hook (left) 16 is linked to the push lever 40, and the claw portion 16*a* of the hook (left) 16 is thereby released from the hook securing hole 103*y* of the printer 101 as shown in FIG. 17. At the same time, the hook (right) 17 is released from the hook securing hole 103*z*, though it is not illustrated in the Figure.

When the claw portion 16*a* is released in this way, the upper portion of the sheet discharge side of the printer 101 shown in FIGS. 16 and 17 with a dotted line is pushed against by the pop-up 43 and pushed out in the direction of arrow B. At the same time the ASF connector 44 is released from the printer connector 117.

If the user presses the push lever 40 in the direction of 40A in this condition, the form shown in FIG. 15 is achieved. In other words, the connectors 44 and 117 are released, the hook 16 is released from printer 101, and the user can easily remove the printer 101 from the ASF 1.

However, as mentioned before, if the force pulling apart the connectors is greater than the force pushing the pop-ups, the printer 101 will not move even if the hook 16 is released from the printer 101, the form shown in FIG. 15 can not be achieved, and the user will not be able to remove the printer 101 from the ASF 1.

Thus, as mentioned before a user push-out function was added to the present embodiment.

FIG. 17 shows the condition when the printer 101 will not move even though hook 16 has been released from the printer 101. In this condition, the hook (left) 16 is in the released position from the hook securing hole 103*y* and the rotation restriction of the hub 40*c* of the push lever 40 by the guide surface 39*b* of the positioning base 39 has been released.

The lever shaft 42 is pressed toward the upper end surface of the sliding hole 40*e* of the push lever 40 thereby restricting the downward motion of the hook (left) 16. Further, the position of the hook (left) 16 will not change even if the push lever 40 rotates because the surface 40*e* that abuts the hook (left) 16 of the push lever 40 is in the shape of an ark that rotates around the lever shaft 42.

In this condition if the user continues to press the push part 40*a* of the push lever 40, the push lever 40 will rotate in the direction of 40D around the lever shaft 42. Then the hook (left) 16 will be released from the printer 101 due to the rotation of the push lever 40 in this way, the protrusion 40*b* of the push lever 40 will abut the lower portion of the sheet discharge side 102*b* of the printer 101, and the printer will be pushed out in the direction of the arrow B.

If the user continues to press the push lever 40 after this, the abutting surface 40*c* of the push lever 40 will abut against a stopper 39*d* of the positioning base 39, and the rotation of the push lever 40 will be regulated in this position. The amount the printer 101 was pushed by the push lever 40 is set to the amount that releases the hook (left) 16 from the printer 101.

After pushing the printer 101 in this way the user releases the pressure on the push part 40*a* of the push lever 40. Thus, the hook (left) 16 rises in the direction of arrow 16B due to the hook spring 3 when the pressure is released in this way. At the same time the push lever 40 also rises up due to the hook (left) 16, the boss 40*c* of the push lever 40 abuts the guide surface 39*c* of the positioning base 39, and the push lever 40 rotates in the direction of arrow 40E due to the pulling force of the spring 7 on push lever 40.

When the boss 40*c* of the push lever 40 hits the guide surface 39*a* of the positioning base 39, rotation of the push lever 40 is restricted and the push lever 40 rises in the direction of arrow 40B due to the spring force of the hook spring 3.

Because of this, the connection of the connectors is finally released as shown in FIG. 15, the hook (left) 16 is also released from the printer 101, and the user can easily remove the printer 101 from the ASF 1.

In the present embodiment as explained up to now, when the printer is detached from the ASF 1 a force acts on the ASF 1 in a perpendicular direction because the push lever 40 is pressed in an approximately perpendicular direction. As a result, when the printer is pushed out in an approximately horizontal direction, the ASF 1 will not slip. Further, because the printer 101 is pushed in an approximately horizontal direction, reattachment caused by the printer moving in the attachment direction due to its own weight will not occur.

Figure 19:
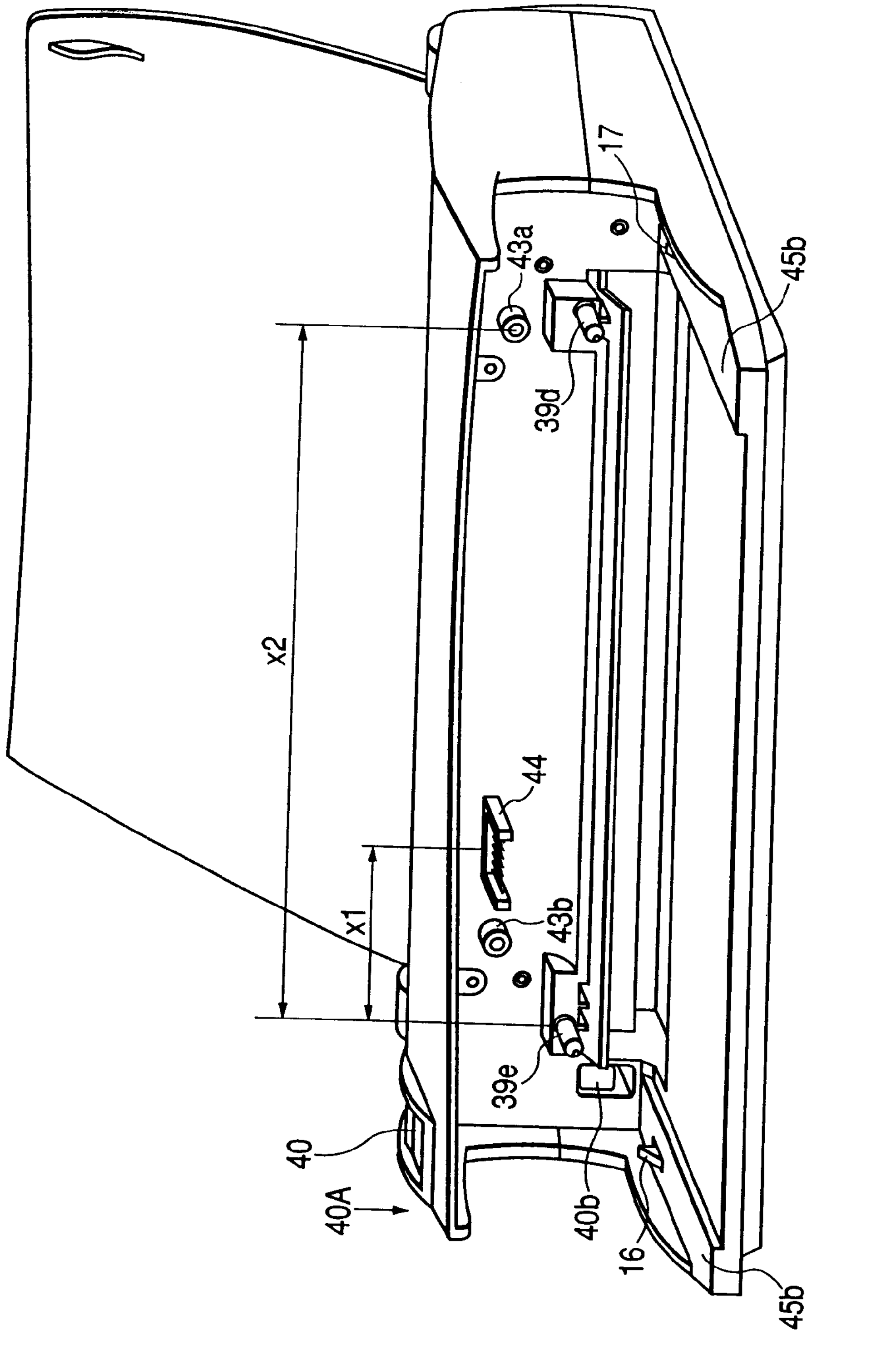
FIG. 19 is a perspective view showing the arrangement of parts relating to the printer attachment/detachment mechanism for the ASF and a symbolized power relationship of the present invention.
Figure 20:
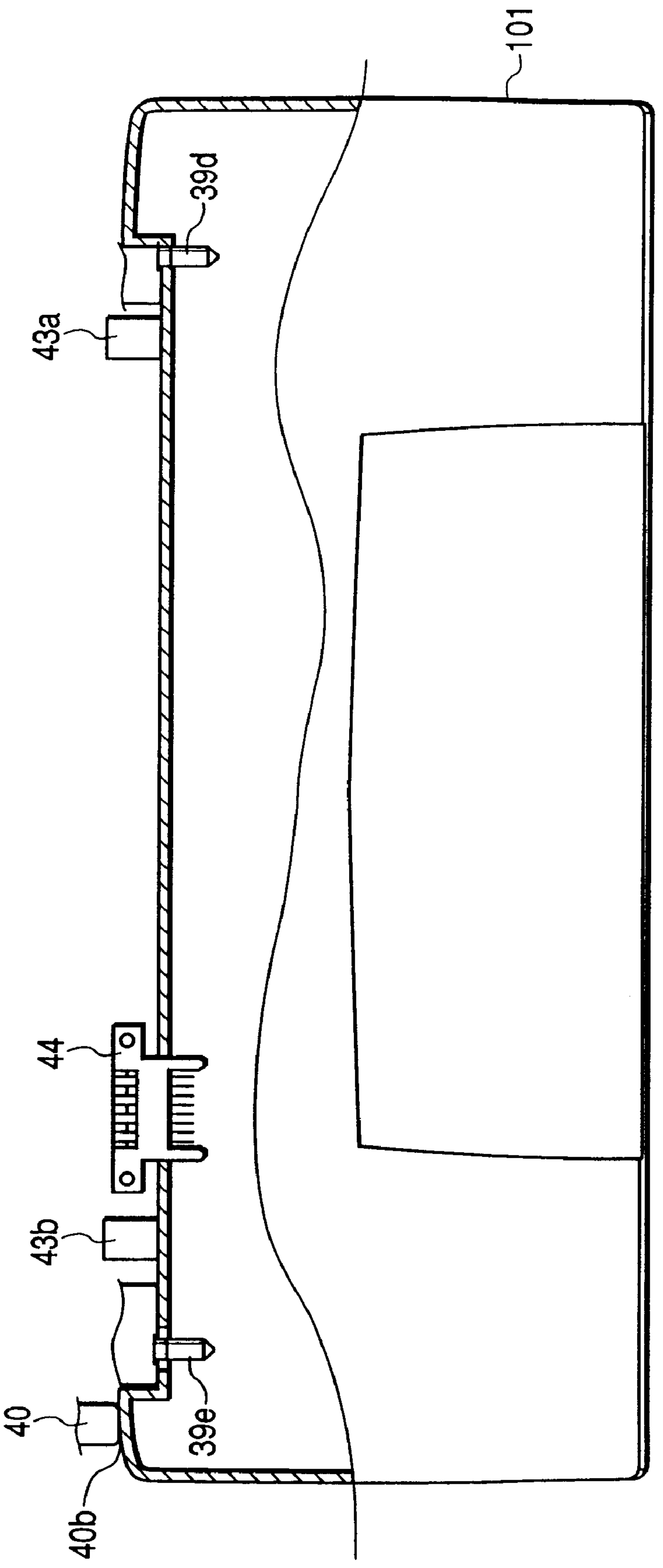
FIG. 20 is a top view explaining the printer attachment/detachment mechanism for the ASF of the present invention.

FIG. 19 is a drawing showing the power relationship between and placement of the push lever 40, the pop-ups 43*a* and 43*b*, the positioning bosses 39*d* and 39*e*, the hook (left) 16 and the hook (right) 17, and the ASF connector 44 in the present embodiment. FIG. 20 is a partial sectional view of the top of the ASF 1.

As shown in FIGS. 19 and 20, the positioning bosses 39*d* and 39*e* of the printer and the hooks 16 and 17 are provided in the vicinity of both ends across the width of the printer 101. The ASF connector 44 is between the two positioning bosses 39*e* and 39*d* close to the second positioning boss 39*e*. Also, the push lever 40 and the second pop-up 43*b* are placed in a position even from the first positioning hub than the ASF connector 44.

With such a configuration, when removing the printer 101 from the ASF 1, the push lever 40 is pushed in the direction of arrow 40A as mentioned earlier, and by pushing the protrusion 40*b* of the push lever 40 to the printer 101 at the same time with the hooks 16 and 17 released from the hook securing holes 103*y* and 103*z* (see FIG. 14) of the printer 101, one can release the connector connection and release the hooks 16 and 17 from the hook securing holes 103*y* and 103*z* of the printer 101.

The pop-ups 43*a* and 43*b* are a supplementary means of decreasing the force of the user pushing the push lever 40, and they are slidably biased to a designated position on the side of the printer when pushed out by an elastic material not shown in the drawings.

In the present embodiment, the printer is pushed out while sliding on the printer slider 45*b* with the positioning bosses 39*d* and 39*e* as centers of rotation.

Figure 21:
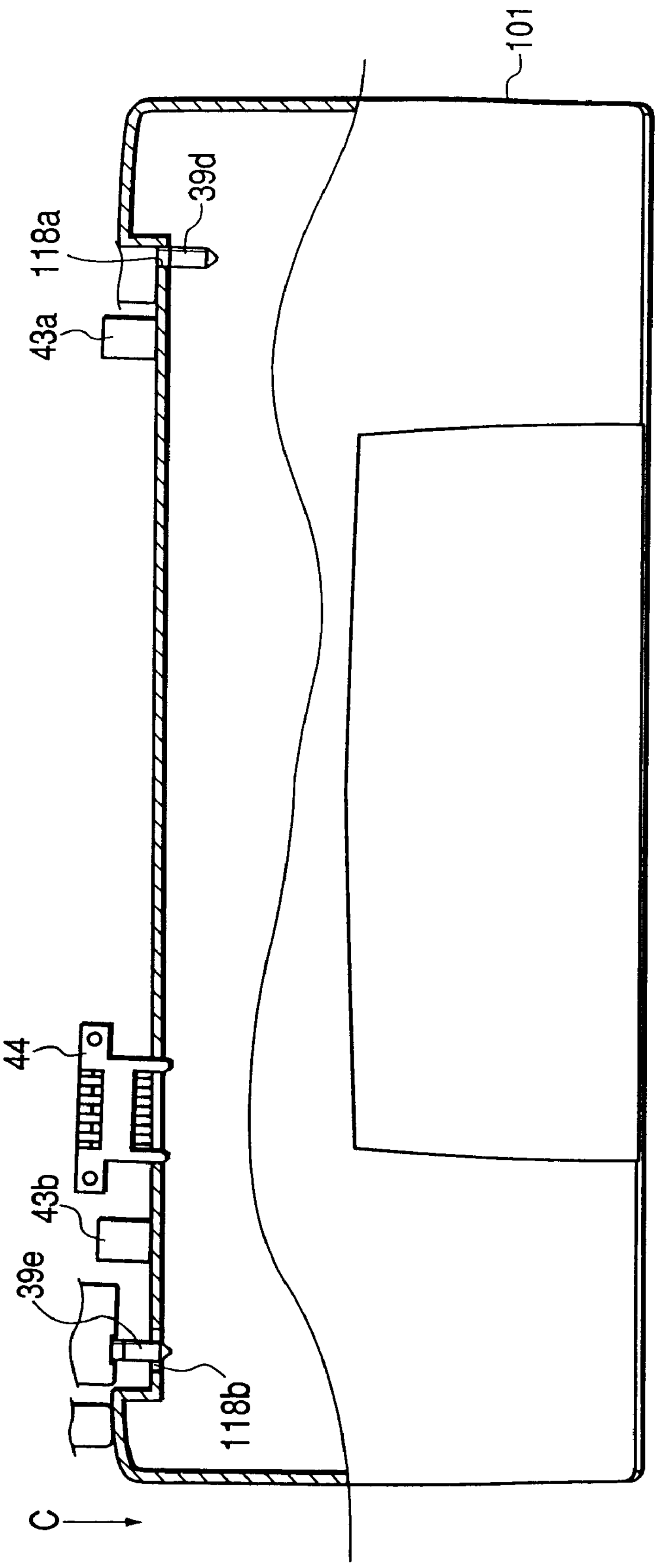
FIG. 21 is a top view explaining the printer attachment/detachment mechanism for the ASF of the present invention.

Here, because the printer positioning hole 118*a* on the first positioning hub side, which serves as rotation fulcrum, is a round hole and the positioning hole 118*b* on the second positioning hub side is an oblong hole (see FIG. 12), if the user tries to remove the printer 101 in the condition shown in FIG. 20 from the ASF 1 with the first positioning boss 39*d* as the rotation fulcrum, the position of the printer in relation to the ASF 1 will be as shown in FIG. 21.

However, in this condition, the printer 101 can not be moved by the pushing force of the first pop-up 43*a* alone because crimping has occurred between the first positioning boss 39*d* and the positioning hole 118*a*. If the user tries to remove the printer 101 from the ASF 1, the first positioning boss 39*d* will be deformed or damaged.

Therefore, the present embodiment is constructed to prevent the fit of the first positioning boss 39*d* which serves as the rotation fulcrum of the printer 101 with the positioning hole 118*a* from crimping due to slippage in the direction of connector release caused by the pushing force of the first pop-up 43*a* before the printer 101 is pushed out by the push lever 40 and the second pop-up 43*b*.

In other words, the force needed to push out the printer 101 using the pushing force of the first pop-up 43*a* with the first positioning boss 39*e* as the rotation fulcrum given the placement dimensions shown in FIG. 19, is the value below:

$$F1>(X1/X2)\times P1+P2$$

In the equation above, F1 is the printer pushing force of the first pop-up 43*a*, P1 is the extraction force of the connector 44, P2 is the friction between the printer 101 and the printer sliding surface 45*b* of the ASF 1, X1 is the distance from the second positioning boss 39*e* which serves as rotation fulcrum to the connector 44, and X2 is the distance from the second positioning boss 39*e* to the first pop-up 43*a*.

As is clear from the above equation, the greater the distance between the first pop-up 43*a* and the ASF connector 44, in other words the smaller the value of X1/X2, the smaller the value for the pushing force F1 of the first pop-up 43*a* that can be set. This printer pushing force F1 of the first pop-up 43*a* works as a reactive force when the printer 101 is attached to the ASF 1 as mentioned earlier, and considering that the extraction force of the connector is, in general, from 1 to 2 kgf, a value of not more than 0.5 for X1/X2 is appropriate.

In the present embodiment, the height of the claw of hook (right) 17 is formed to be lower than the height of the claw of hook (left) 16. Thus the hook (right) 17 is released before the hook (left) 16 when the hooks 16 and 17 are released from the hook securing holes 103*y* and 103*z* (see FIG. 12) on the printer 101.

Figure 22:
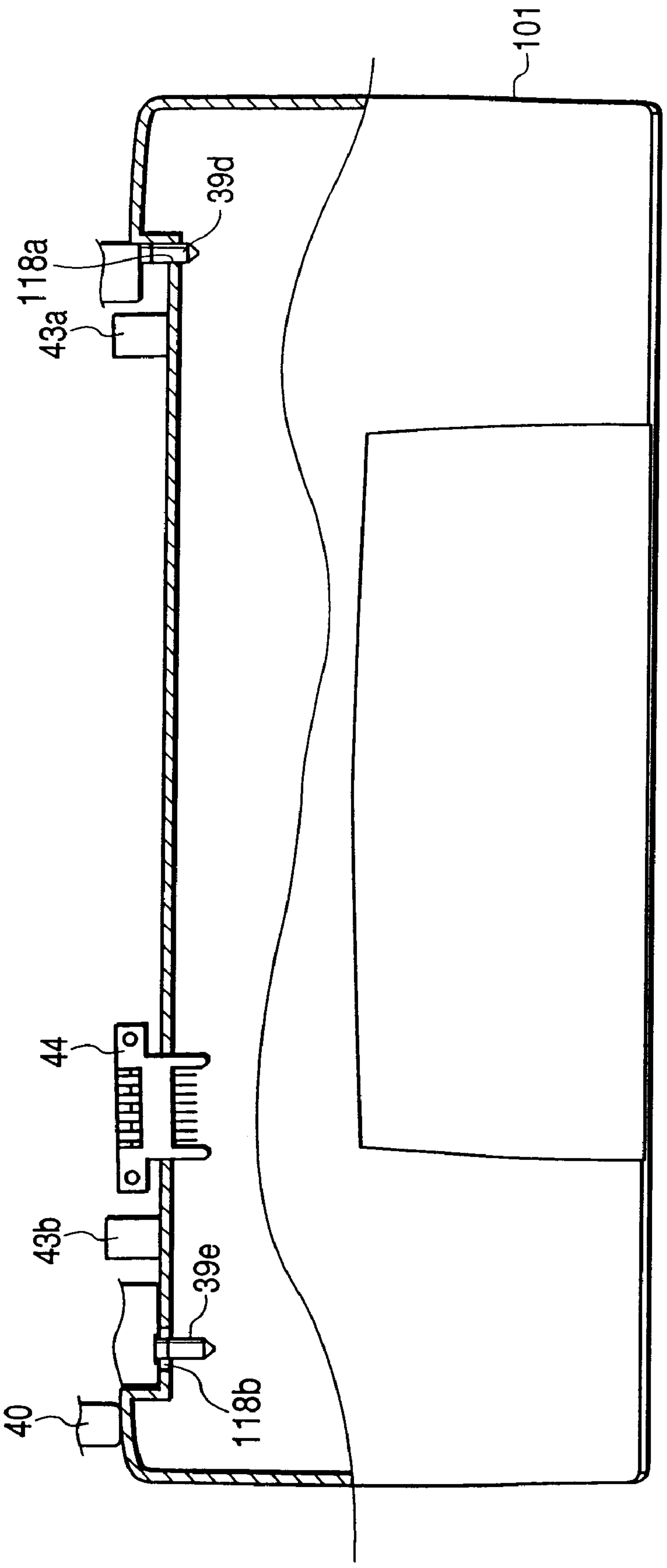
FIG. 22 is a top view explaining the printer attachment/detachment mechanism for the ASF of the present invention.

Due to this, in the instant that the hook (right) 17 is released first from its position fitted into the hook securing hole 103*z* of the printer 101, the printer 101 rotates due to the pushing force of the first pop-up 43*a* with the second positioning boss 39*e* as rotation fulcrum and accompanying this rotation the position of the fitted first positioning boss 39*d* and the positioning hole 118*a* moves toward the connector connection release side as shown in FIG. 22.

Figure 23:
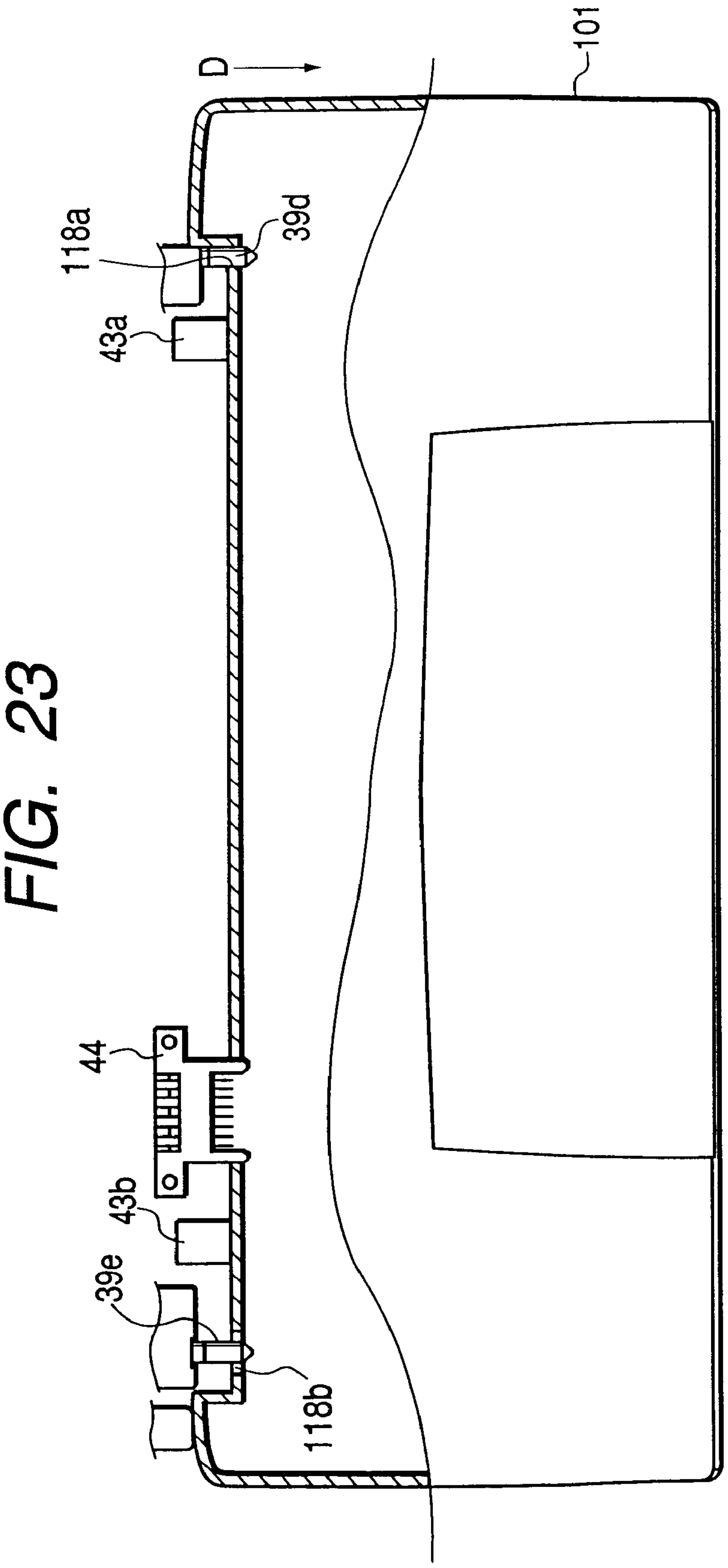
FIG. 23 is a top view explaining the printer attachment/detachment mechanism for the ASF of the present invention.

After that, if the hook (left) 16 is released from the hook securing hole 103*y* and the printer 101 is pushed out by the push lever 40 and the second pop-up 43*b*, the printer 101 can be removed from the ASF 1 as the first positioning boss 39*d* and the positioning hole 118*a* do not crimp together as shown in FIG. 23.

If the push lever 40 and the second pop-up 43*b* are placed between the first positioning boss 39*d* which serves as rotation fulcrum for the printer 101 and the ASF connector 44, when the connection force between the connectors is great, the connector 44 becomes the rotation fulcrum of the printer 101, the first positioning boss 39*d* and the positioning hole 118*a* of the printer 101 that form a round hole fit crimp together, and there is a danger of deforming of the boss 39*d* due to this crimping.

Figure 24:
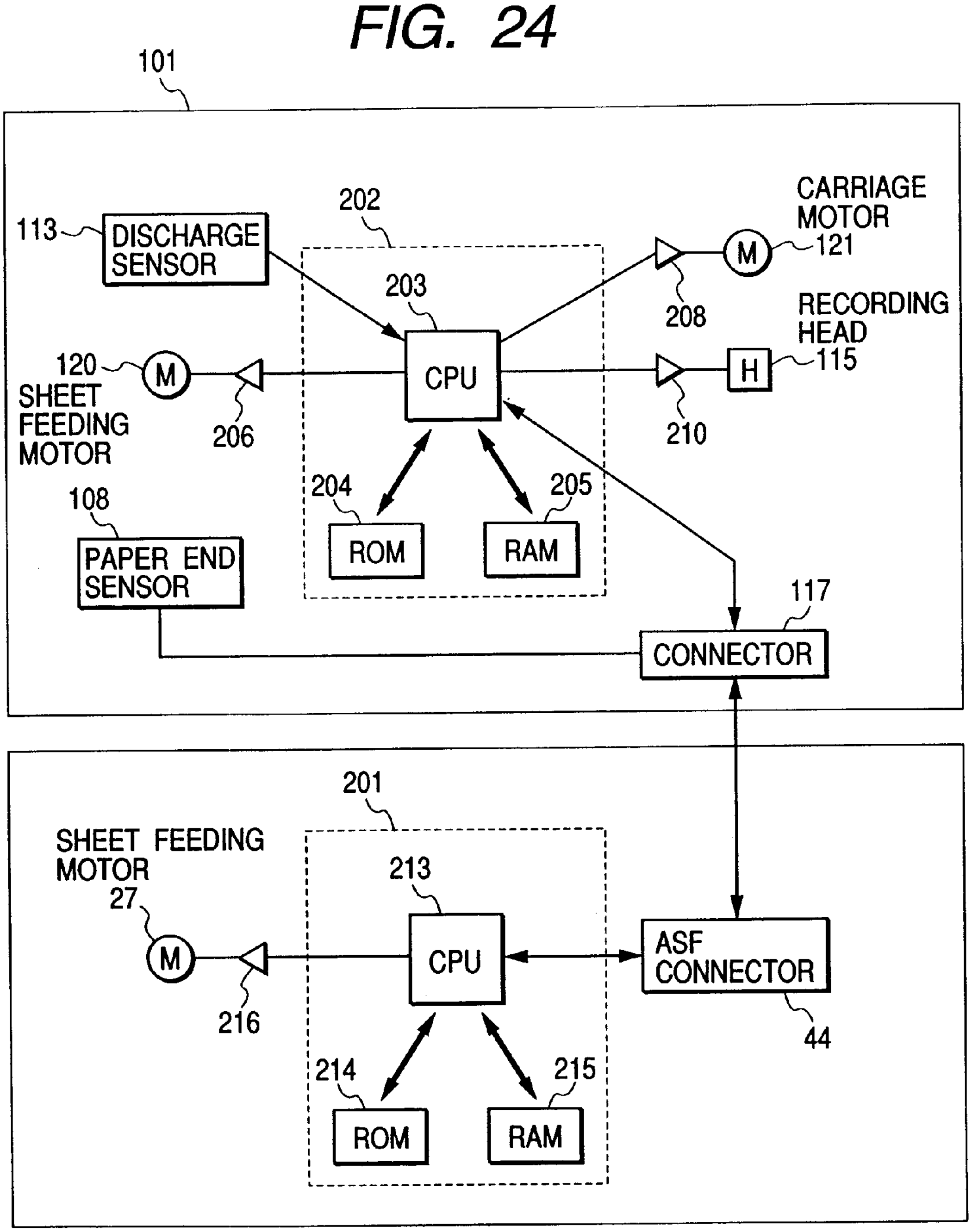
FIG. 24 is a block diagram of the printer and ASF connections of the present invention.

As a result, it is necessary to place the push lever 40 and the second pop-up 43*b* farther away from the first positioning boss 39*d* which is the rotation fulcrum of the printer 101 than the ASF connector 44. Controller FIG. 24 is a block diagram of the connections of the externally attached ASF controller and the controller of the main body of the printer in the present invention.

The main body controller 202 that controls the main body of the printer 101 is placed on the main body plate 123 shown in FIG. 4 and comprises a microcomputer connected by a bus to a CPU 203, a ROM 204 and a RAM 205.

When the main body of the printer 101 records, this main body controller 202 drives a carriage motor 121 through a motor driver 208 based on a main body control program stored in the ROM 204 and records one line by driving a recording head 115 attached to a carriage not shown in the drawing connected to the carriage motor 121 through a head driver 210.

After that, the main body controller 202 feeds a sheet by driving the sheet feeding motor 120 through the motor driver 206 and finishes recording onto the sheet by repeating the driving of the carriage motor 121 and the recording head 115 a second time. A connector 117 that functions as a communication port that can communicate in two directions to output to the outside a command signal from the CPU 203 of the main body controller and input to the CPU 203 a response signal from the outside and can also supply a power source to the outside as will be described later. A paper end sensor 108 is provided inside the main body of the printer and has either an optical switch or a mechanical switch. When a sheet 200 is inserted into the main body of the printer, the output voltage of the paper end sensor changes from LO (low) to HIGH. A discharge sensor 113 has the same function as the paper end sensor 108. If the sheet 200 remains inside the main body of the printer after recording, the output voltage of the discharge sensor changes to HIGH.

The output voltage of both the paper end sensor 108 and the discharge sensor 113 can both be monitored by the CPU 203 and the output voltage of the paper end sensor 108 is connected such that it can output directly to the outside through the connector 117.

Figure 26:
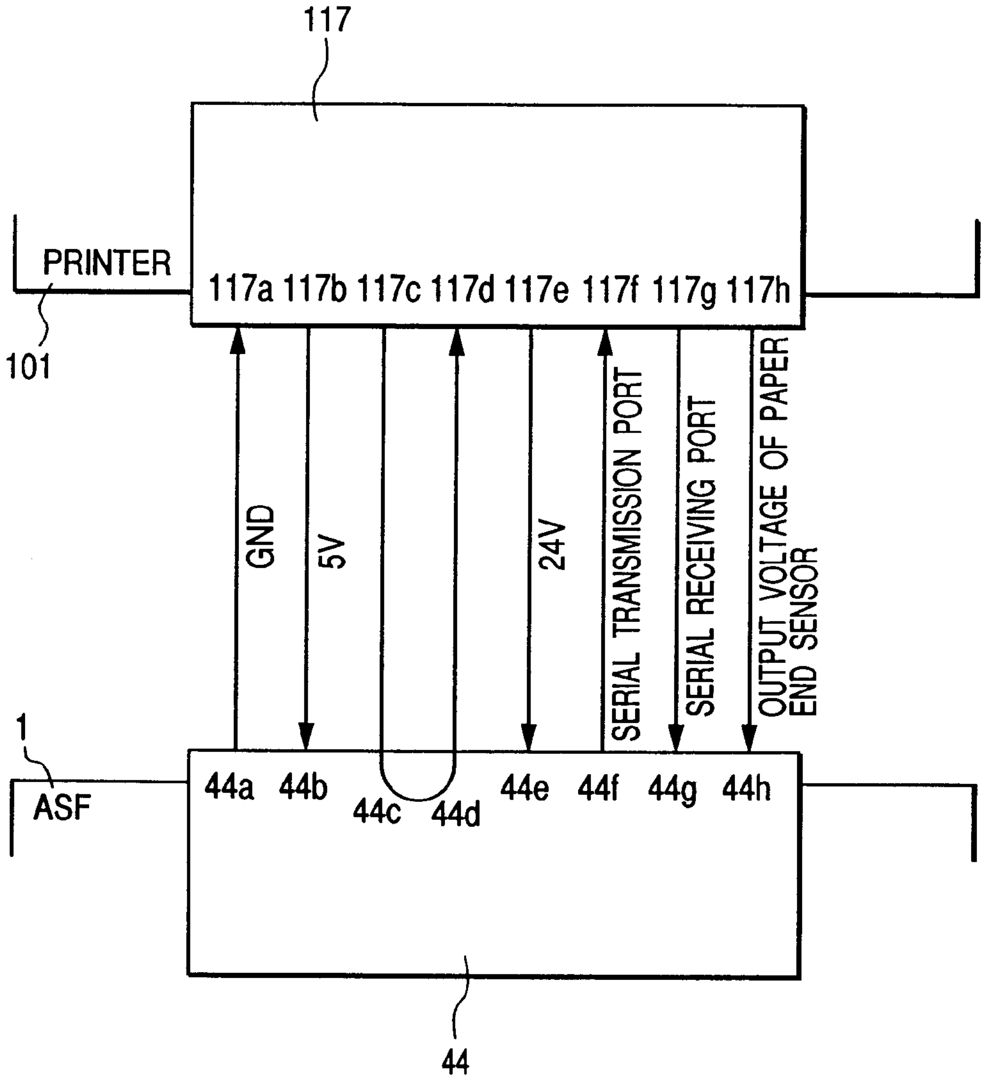
FIG. 26 is a schematic view showing the connections between connectors and ASF connectors.

The ASF controller 201 that controls the externally attached ASF 1 comprises a microcomputer connected through a bus to a CPU 213, a ROM 214, and a RAM 215 as is the printer main body controller 202. The CPU 213 drives a sheet feeding motor 27 through a motor driver 216 based on an ASF control program stored in the ROM 214. The ASF connector 44 functions as a communication report and can communicate in two directions to receive a signal from an external device such as the printer main body 101 and output a signal from the CPU 213 of the ASF controller. Communication Port FIG. 26 shows a model of the detailed construction of the connector 117 and the ASF connector 44. Connector 117 and the ASF connector 44 each has eight ports, 117*a* to 117*h* and 44*a* to 44*h* respectively. When the ASF 1 is attached to the printer 101, the ports with corresponding letters are electrically connected.

Figure 25:
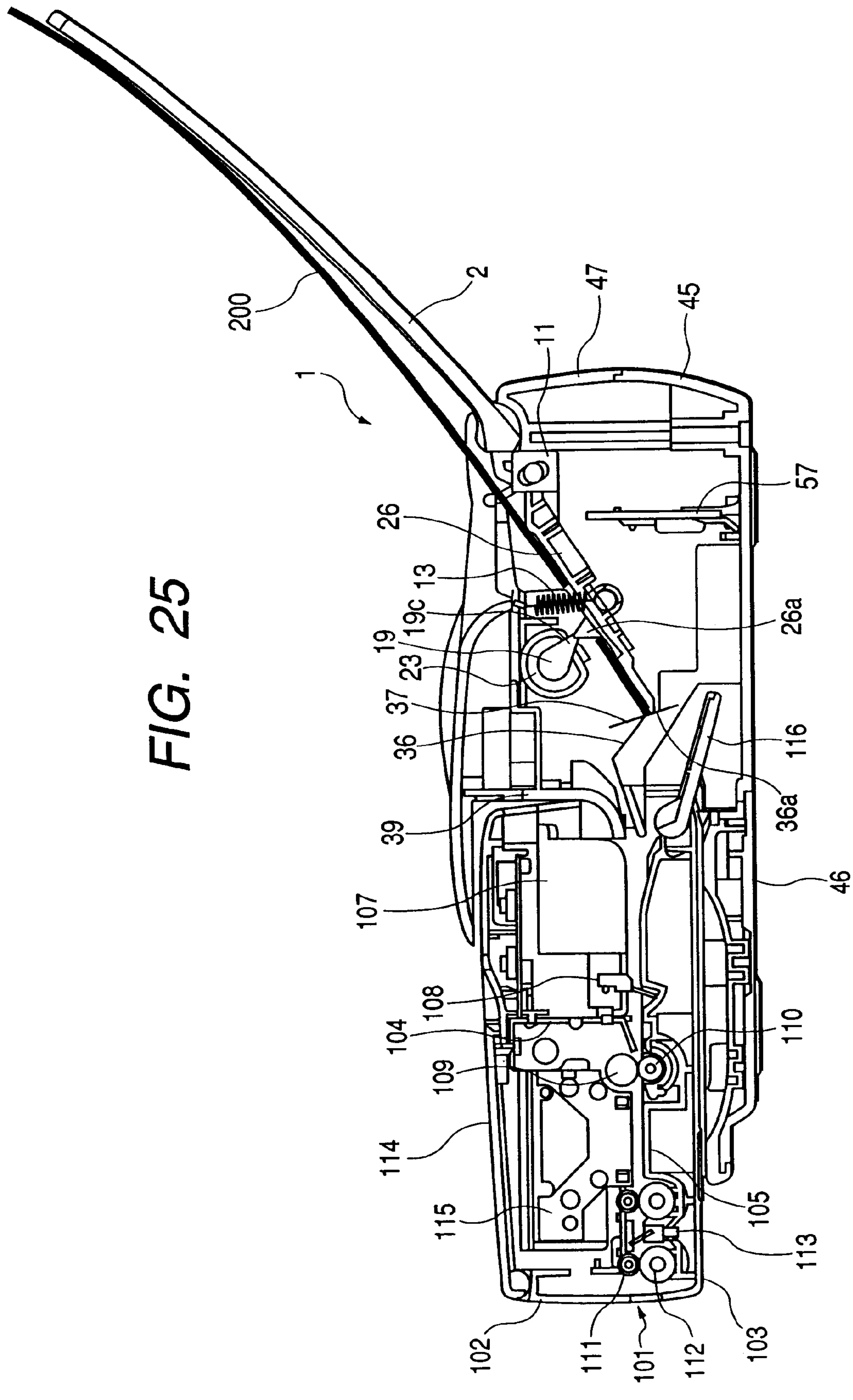
FIG. 25 is a schematic sectional view of the printer with ASF attached of the present invention.

Looking from the ASF 1, 44*a* designate a GND line, 44*b* designate a 5*v* power line for signals, 44*e* designate a 34*v* power line for driving the sheet feeding motor 27, 44*f* designate a transmission port that transmits signals to the printer side, 44*g* designate a receiving port that receives signals from the printer side, and 44*h* designate a line that receives the output voltage of the paper end sensor 108 inside the main body of the printer. As 44*c* and 44*d* are short-circuited, it can easily find out that equipment has been externally connected using the ports 117*c* and 117*d* on the printer side. ASF detachment and conveyance mechanism portion FIG. 25 is a sectional view showing the condition when the externally attached ASF is attached to the main body of the printer in the present invention.

A sheet feeding roller 19 feeds out sheet 200. A pick-up rubber 23 has been fitted around the sheet feeding roller 19 and when the sheet feeding roller 19 rotates the sheet 200 is conveyed by the friction of the pick-up rubber 23.

The reference numeral 26 designates a pressure plate on which the sheet 200 is loaded, with both ends of the upstream side with respect to the sheet conveying direction axially supported on the ASF chassis 11 such that it can rotate. The pressure plate 26 is activated in the direction of the pick-up rubber 23 by the pressure plate spring 13 but the pressure plate 26 is held apart from the pick-up rubber 23 because a cam 19*c* provided into both ends of the sheet feeding roller 19 and a cam 26*a* provided into both ends of the pressure plate 26 interlock during initialization, so that the sheet 200 can be set smoothly. Inclined surface 36 has an abutting surface 36*a* on the sheet conveying direction extension of the pressure plate 26 which is set such that the front end of the sheet 200 abuts this abutting surface 36*a* when the sheet is set. A separating sheet 37 is mounted on the abutting surface 36*a* as a sheet separating means. The separating sheet 37 is a sheet made of an elastic material such as plastic film and functions to separate one sheet at a time using the elasticity evoked when it is bent.

Printer Conveyance Mechanism, Printing Mechanism

Next the conveyance mechanism and printing mechanism of the main body of the printer in FIG. 25 is explained.

An LF roller 109 conveys the sheet 200. This LF roller 109 is formed from a metallic pipe with a paint film of a material with a high friction coefficient such as urethane resin on its surface that rotates driven by the sheet feeding motor 120 shown in FIG. 24 and conveys the sheet 200 by pinching it between itself and the pinch roller 110.

A recording head 115 records image information on the sheet 200 conveyed by the LF roller 109 loaded onto a carriage not shown in the drawing and it can move back and forth across the length of the LF roller 109. The recording head 115 is driven along with the carriage by the carriage motor 121 in FIG. 24 and can move back and forth across the width of the sheet 200 (perpendicular to the surface of the sheet).

The spur 111 and the discharge roller 112 are positioned on the downstream side of the LF roller 109 and the recording head 115 and form a pair of double rollers to convey the sheet 200 when printing is finished. The discharge roller 112 is connected to the LF roller by a drive transmission means not shown in the drawing and rotates such that it conveys the sheet 200 in the same direction as the LF roller 109 with the LF roller 109 as drive source.

A paper end sensor 108 is provided on the sheet pass further upstream than the LF roller 109 with respect to the sheet conveying direction and a discharge sensor 113 is set between the pair of double discharge rollers. The output voltage of each sensor changes from LO to HIGH when the sheet 200 passes by. ASF driving mechanism FIGS. 27 and 28 show the driving mechanism of the externally attached ASF in the present invention.

The sheet feeding motor 27 is a stepping motor that can drive in both forward and reverse. An idle gear 15 interlocks with the motor gear 27*a* of the sheet feeding motor 27. An ASF double gear 29 has a double gear with different diameters and interlocks with the idle gear 15. A forward planetary gear 31 interlocks with the gear with the smaller diameter of the ASF double gear and revolves around the perimeter of the ASF double gear. A reverse sun gear 33 has a double gear with different diameters and interlocks with the gear with the smaller diameter of the ASF double gear 29. A reverse planetary gear 35 interlocks with the gear with the smaller diameter of the reverse sun gear 33 and revolves around the perimeter of the reverse sun gear. A sheet feeding roller gear 19*a* is provided on the axial end of the sheet feeding roller 19. The sheet feeding roller 19 is provided on the revolving axis of the forward planetary gear 31 and the reverse planetary gear 35 and is placed in a position that interlocks with each gear.

Next the operation of each gear is explained. In FIG. 27, when the sheet feeding motor. 27 rotates in the direction of arrow b (reverse drive), each gear rotates in the direction of the respective arrows. In other words, the reverse planetary gear 35 revolves around the perimeter of the reverse sun gear 33 by way of the idle gear 15 and the ASF double gear 29 from the position shown by the broken line to the position shown by the solid line in the direction shown by the arrow in FIG. 27, and interlocks with the sheet feeding roller gear 19*a*. Due to this, the sheet feeding roller rotates in the direction shown by the arrow in the drawing (in the direction that the sheet 200 stacked on the pressure plate 26 is fed to the printer 101). When the sheet feeding roller gear 19 rotating interlocked with the reverse planetary gear 35 rotates to a position such that the untoothed portion 19*b* faces the reverse planetary gear 35 it slips from that gear and ceases to rotate even when the sheet feeding motor is driven in reverse.

Figure 27:
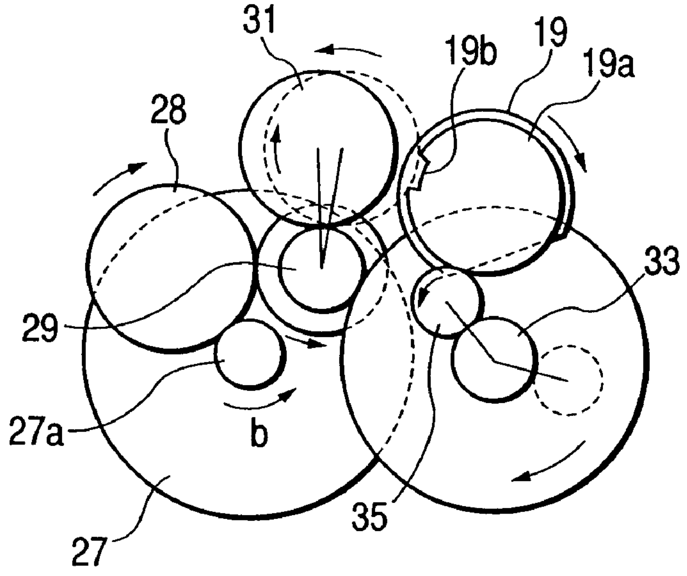
FIG. 27 is a schematic view showing the ASF driver mechanism connections and operation directions.
Figure 28:
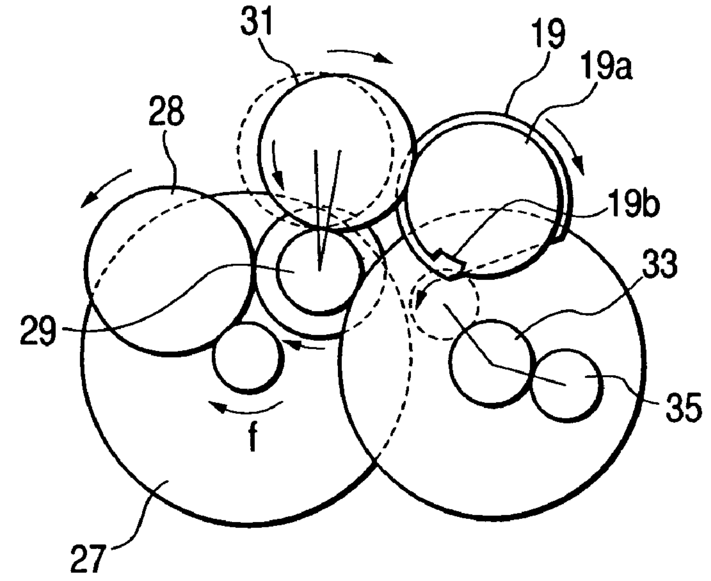
FIG. 28 is a schematic view showing the ASF driver mechanism connections and operation directions.

In this condition, the forward planetary gear 31 revolves from the position shown by the dotted line to the position shown by the unbroken line in the direction of the arrow shown in FIG. 27, but does not influence the rotation of the sheet feeding roller 19 because it hits a stopper not shown in the drawing and stops.

Next, when the sheet feeding motor 27 rotates in the direction of arrow f (positive drive), each gear rotates in the direction of the arrows shown in FIG. 28 respectively. In other words, the forward planetary gear 31 revolves by way of the idle gear 15 and the ASF double gear 29 around the periphery of the ASF double gear 29 from the position shown by the dotted line toward the position shown by the unbroken line in the direction of the arrow shown in the drawing and interlocks with the sheet feeding roller gear 19*a*. In this way, the sheet feeding roller 19 rotates in the direction of the arrow shown in FIG. 28 (in the direction that the sheet stacked on the pressure plate 26 is fed to the printer). When the sheet feeding roller 19*a* rotating interlocked with the forward planetary gear 31 rotates to a position such that the untoothed portion 19*b* faces the forward planetary gear 31 it slips from that gear and ceases to rotate even when the sheet feeding motor is driven forward.

In this condition, the reverse planetary gear 33 revolves from the position shown by the broken line to the position shown by the solid line in the direction of the arrow shown in FIG. 28, but does not influence the rotation of the sheet feeding roller 19 because it hits a stopper not shown in the drawing and stops.

Further, when the untoothed portion 19*b* of the sheet feeding roller gear 19*a* faces the forward planetary gear 31, the cam of the sheet feeding roller 19*c* interlocks perfectly with the cam 26*a* of the pressure plate 26 resulting in the same phase as at initialization, and the pressure plate 26 and pick-up rubber 23 are placed set apart from each other.

Accordingly, when the sheet feeding motor 27 is driven forward continuously, the sheet feeding roller cam 19*c* and the pressure plate cam 26*a* interlock and the sheet feeding roller 19 ceases rotation with the same phase as at initialization with the pressure plate 26 and the pick-up rubber 23 separated. Afterwards, because the forward planetary gear 33 and the reverse planetary gear 35 both idle in the positions shown by the solid lines in FIG. 28 no rotation is transmitted to the sheet feeding roller 19 and it is stabilized.

As explained above, regardless of whether the sheet feeding motor 27 runs forward or in reverse, the sheet feeding roller 19 will only rotate in the direction that the sheet 200 is fed to the printer 101 and will not rotate in the opposite direction. Sheet feeding operation and printing operation (printer side)

Next the chain of operations in which the printer and the ASF discharge a sheet after feeding, conveying and recording is explained.

When a recording command is received from an external information device such as a computer, the printer 101 first performs a sheet feeding operation and then performs a recording operation.

Figure 29:
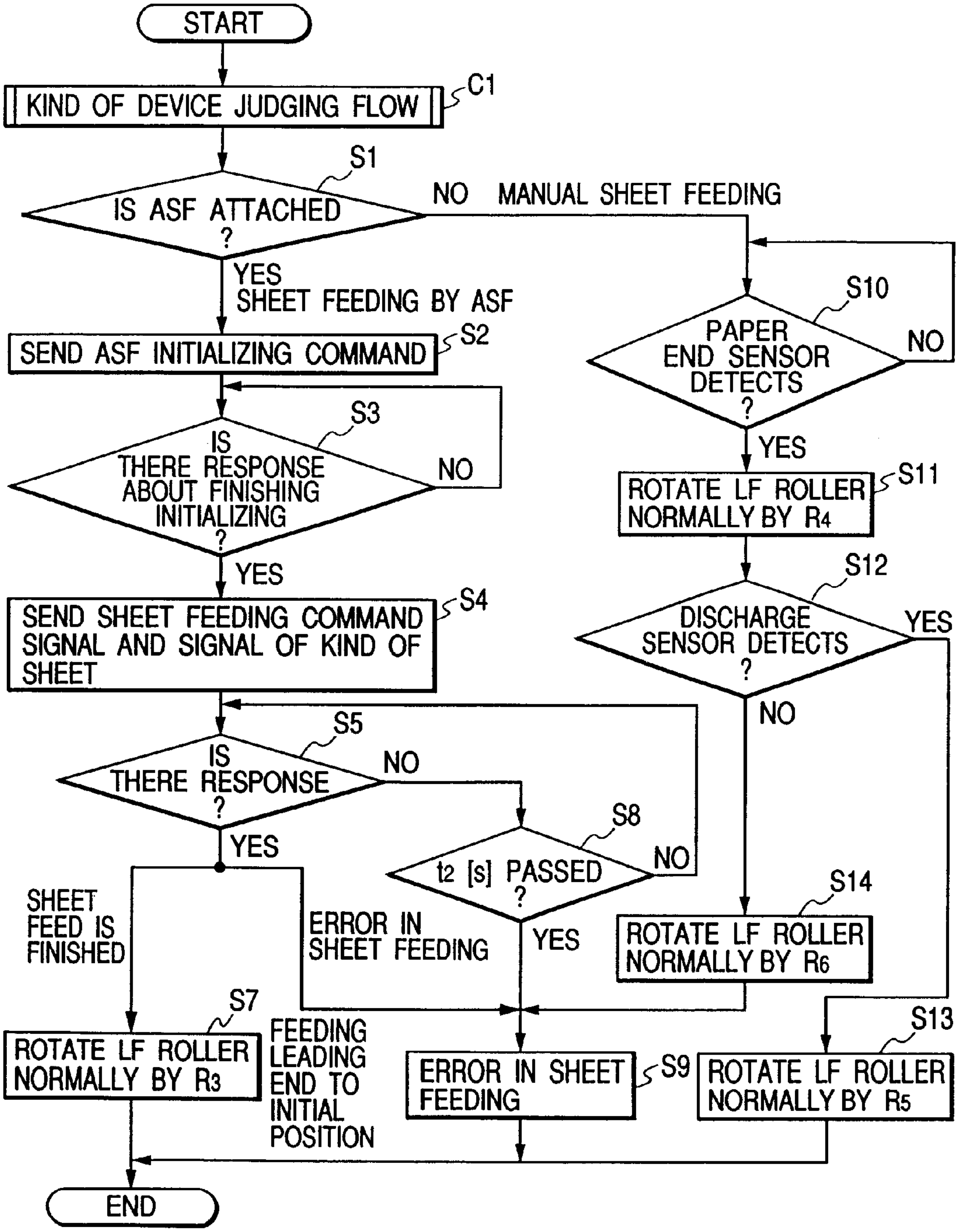
FIG. 29 is a control flow of the sheet feeding operation in the printer controller of an embodiment of the present invention.

FIG. 29 is a control flow if the printer is performing a sheet feeding operation. First, the main body controller 202 of the printer 101 carries out sub-flow C1. The details of the contents will be described later using FIG. 33, but the sub-flow C1 is for the purpose of judging the type of machine attached to the outside of the printer through ports 117*f* and 117*g* shown in FIG. 26.

Next the controller proceeds to S1. If the results of sub-flow C1 indicated that an ASF was attached to the printer 101, it proceeds to S2 for ASF sheet feeding. In S2, the main body controller 202 sends an initializing command to the ASF and proceeds to S3.

In S3, if there is no response signal indicating that initialization is finished from the ASF, the controller returns to S3 and proceeds to S4 when it receives a response. In S4, the main body controller 202 sends a sheet feeding command signal and a kind of sheet signal expressing the kind of sheet for sheet feeding (plain paper, coated paper, post card, glossy film, etc.) to the ASF and proceeds to S5.

In S5, if no response is received from the ASF it proceeds to S8 and if a pre-set time limit of t2 seconds has not elapsed the main body controller 202 returns to S5. In S8, if the time limit t2 seconds has elapsed since commencement of sheet feed, it proceeds to S9 and generates a sheet feeding error signal and ends the sheet feeding operation. In S5 there is a response signal from the ASF and if this is a signal indicating that sheet feeding is finished, the controller proceeds to S7. Step S7 performs an operation of feeding leading end to initial position on the sheet 200 and the main body controller 202 rotates the LF roller 109 by driving the sheet feeding motor 120 only by a designated amount R3 in the sheet conveying direction (forward) at time of recording and ends the sheet feeding operation. The designated amount R3 is set such that the front end of the sheet 200 comes directly under the recording head 115 but does not reach the area where sheet detection by the discharge sensor 113 is possible. Accordingly, when the printer 101 next begins recording on the sheet 200, there is no need to return the sheet 200 upstream of the conveying direction, and the sheet will not be bent or misfed because the rear end of the sheet 200 will not impact on the internal parts of the ASF.

Also in S5, if there is a response signal from the ASF and it indicates an error in sheet feeding, the main body controller 202 proceeds to S9, issues a sheet feeding error, and ends the operation of sheet feeding.

In S1, if the result from the sub-flow C1 indicated that the ASF was not attached to the printer 101 the controller proceeds to S10 for manual sheet feeding.

In S10, if the user has not inserted a sheet no sheet will be detected because the output voltage of the paper end sensor 108 remains at LO, and the controller returns to S10. When the user inserts a sheet 200 into the printer 101 and it contacts the LF roller 109, the output voltage of the paper end sensor 108 changes to HIGH and the sheet is detected, and so the controller proceeds to S11. In S11, the main body controller 202 drives the sheet feeding motor 120 by the sheet feeding motor driver 206 such that the LF roller 109 rotates forward (in the rotation direction that will convey the sheet in the conveying direction when recording) only by a designated amount R4. The designated amount R4 is set to the amount that will cause the front end of the sheet 200 to reach the area where the discharge sensor 113 can detect the sheet. Next the controller proceeds to S12, and if the discharge sensor 113 senses the sheet 200 it judges that sheet feeding was successful and proceeds to S13. In S13, the main body control means 202 drives the sheet feeding motor 120 with the sheet feeding motor driver 206 such that the LF roller 109 rotates in reverse (in the rotation direction that will convey the sheet in the opposite direction as the conveying direction when recording) only by a designated amount R5. The designated amount R5 is set at the amount that will return the sheet 200 that was conveyed to the range where detection by the discharge sensor 113 was possible to the position where recording will begin, and where the front end of the sheet 200 is not coming out from between the LF roller 109 and the pinch roller 110.

Also in S12, if the discharge sensor 113 does not detect the sheet 200, for example if the sheet 200 contacted the LF roller 109 weakly and was not correctly sucked between the LF roller 109 and the pinch roller 110 or if the front end of the sheet 200 did not reach the range where it could be detected by the discharge sensor 113 though it was conveyed by the designated amount R4 because it struck the LF roller 108 askew, the main body controller 202 judges this a manual sheet feeding failure and proceeds to S14. In S14, the main body control means 202 drives the sheet feeding motor 120 with the sheet feeding motor driver 206 such that the LF roller 109 rotates in reverse only by a designated amount R6.

The designated amount R6 is set at an amount large enough so that the front end of the sheet 200 that was conveyed up to the range where it can be detected by the discharge sensor 113 to stick out from the LF roller 109 and the pinch roller 110.

In this way, during manual feeding one can confirm definitely that the sheet feeding went well by confirming whether or not the discharge sensor detected the sheet 200. It has the further advantage that when the sheet feeding fails, the sheet 200 can be easily removed and manual sheet feeding can be repeated because the sheet 200 is returned to a position where it is not pinched by the LF roller.

As there are no parts that collide in a different way during manual feeding from auto feeding with the ASF attached, even if the sheet 200 is conveyed in the opposite direction this will not cause it to bend or misfeed.

The printer 101 that has finished the operation of sheet feeding through the sheet feeding control flow described above next performs a recording operation. The main body controller 202 drives the carriage motor 121 with the motor driver 208, drives the recording head 115 attached to a carriage not shown in the drawing connected to the carriage motor 121 with the head driver 210 and records one line. After that, the main body controller 202 conveys the sheet 200 by one line only by driving the sheet feeding motor 120 with the motor driver 206 and finishes recording onto the sheet by repeating the recording head 115 drive and the carriage motor 121 drive. When recording is finished, the main body controller 202 drives the sheet feeding motor 120 and rotates the LF roller 109 forward. Due to this the discharge roller 112 rotates, and the sheet 200 is discharged from the printer 101.

Sheet Feeding Operation (ASF Side)

Figure 30:
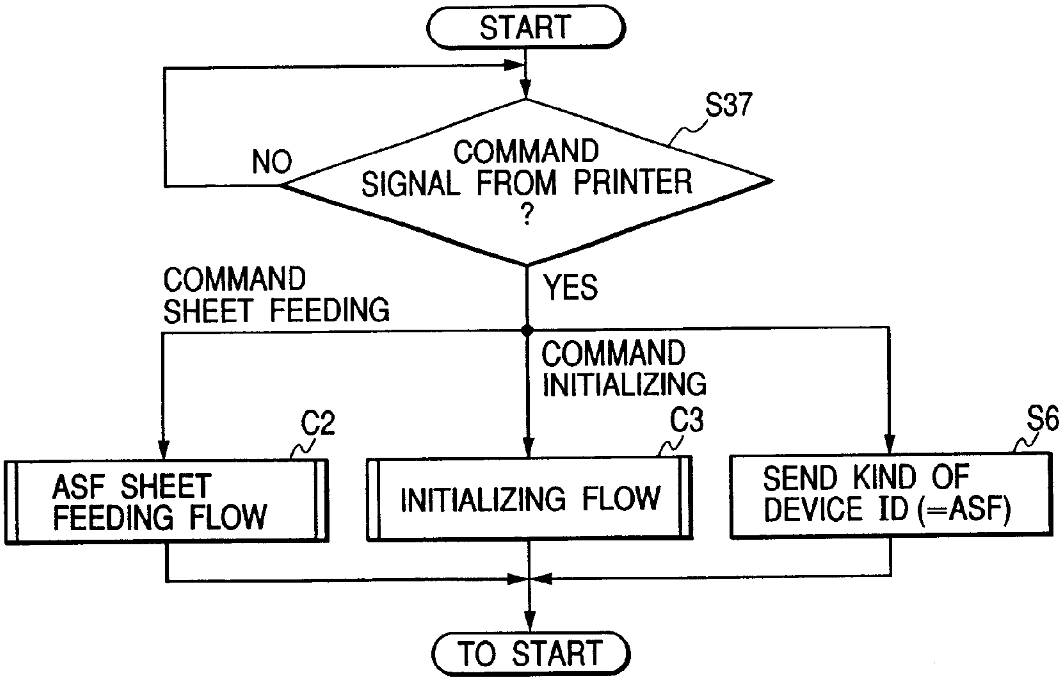
FIG. 30 is the main control flow in the ASF controller.

FIG. 30 shows a main control flow of the ASF, which can be externally attached to the printer in the present invention. The controller 201 of the ASF 1 in the present invention is usually on standby when the ASF is attached to the printer 101, and if no command signal is received from the printer 101 as shown in S37 it repeats performing S37 until a command signal is received. When a command signal from the printer 101 is received with the serial receiving port 44*g* in FIG. 26, it proceeds to the following sub-flow or step in response to the contents of the command signal. In other words, if the command signal from the printer 101 indicates "sheet feeding command", it proceeds to sub-flow C2 that controls the ASF sheet feeding operation, and if the signal indicates "initializing command", it proceeds to sub-flow C3 that controls the initializing operation. When each sub-flow is finished it proceeds again to S37 and goes into standby. If the command signal from the printer 101 indicates "kind of device judging command", it proceeds to step S6 and when it has sent the code ID that expresses the type of device of the ASF itself via the serial transmission port 44*f* to the printer 101, it proceeds to S37 and goes into standby.

Of the two sub-flows mentioned above, sub-flow C2 that controls the ASF sheet feeding operation is described first and the details of sub-flow C3 that controls the initialization operation will follow.

Figure 31:
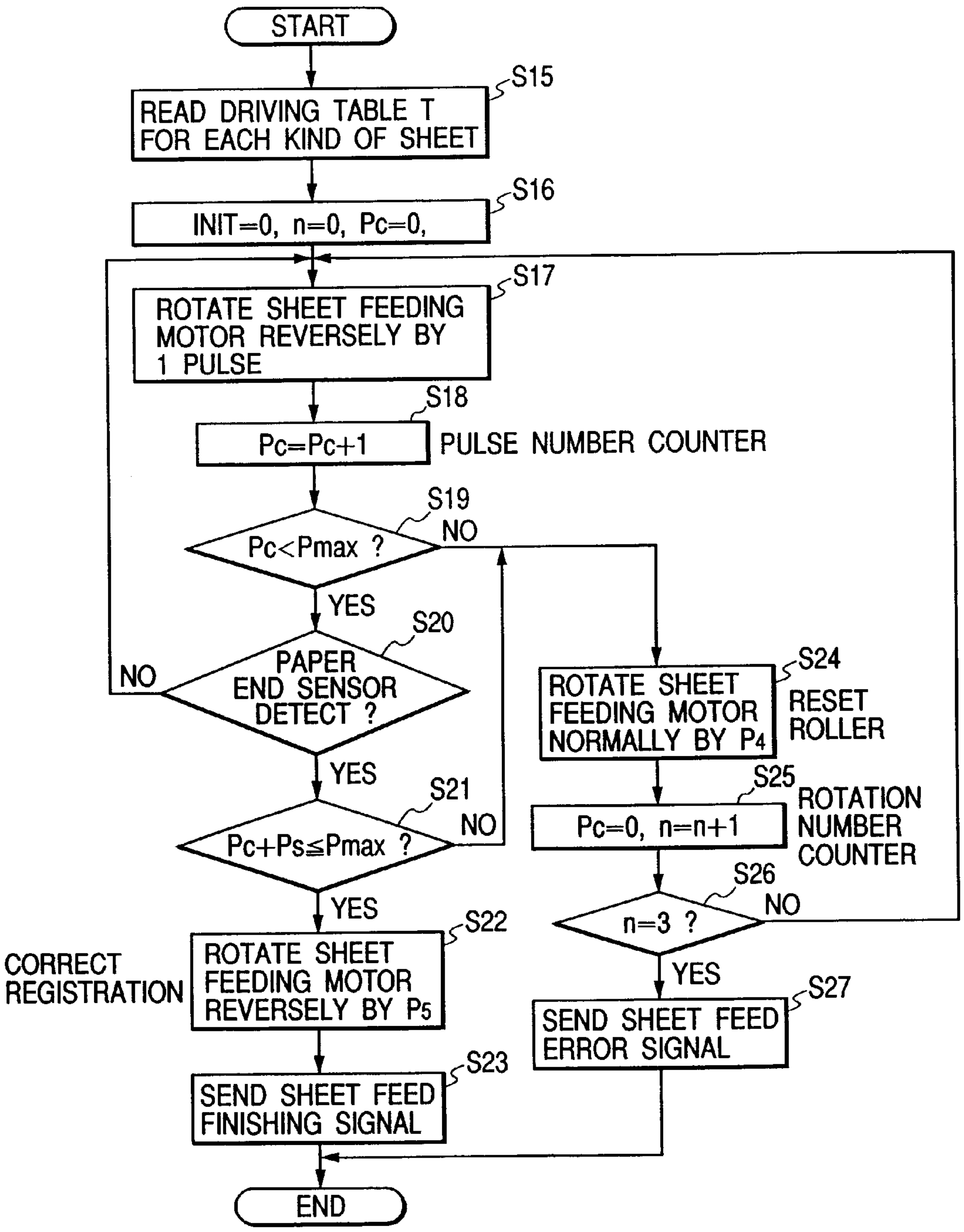
FIG. 31 is a sub-flow of the sheet feeding operation control in the ASF controller of an embodiment of the present invention.

FIG. 31 is sub-flow C2 that controls the sheet feeding operation in the ASF 1.

The ASF controller 201 first advances to S15 where it reads driving table T of the appropriate sheet feeding motor 27 for the type of sheet to be fed from the ROM 214 to the CPU 213 based on the type of sheet information received from the printer 101 and the sheet feeding command signal. The driving table T includes such information as the driving speed of the sheet feeding motor 27, which is a pulse motor, and the number of pulses P5 in correction registration in order to rotate the sheet feeding roller 19 only by the amount appropriate to the type of sheet when correcting registration in step S22 to be described later. Multiple values are prepared corresponding to hypothesized sheet characteristics.

After reading the driving table T the ASF controller 201 advances to step S16 and sets each variable, designated as INIT, n, and Pc to the initialization value of 0. Each variable is stored in the RAM 215, with INIT as a flag showing whether or not the phase of the rotation direction of the sheet feeding roller 19 is in the initialization position, n as a rotation number counter, indicating how many times the sheet feeding roller 19 has rotated since the beginning of the sheet feeding flow C2, and Pc as a number of pulses counter that indicates how many pulses the sheet feeding motor 27 was driven reversely.

Proceeding to S17, the ASF controller drives the sheet feeding roller 19 one pulse reversely via the sheet feeding motor driver 216. Advancing to S18, the value of number of pulses counter Pc is increased by one, and it proceeds to S19. In S19, the ASF controller 201 compares the value of number of pulses counter Pc to the size of the allowed number of pulses Pmax.

The allowed number of pulses Pmax is the total number of pulses such that the sheet feeding roller rotates up to a position where the untoothed portion 19*b* of the sheet feeding roller gear faces the reverse planetary gear 35 as explained in FIG. 27 after the sheet feeding motor 27 begins reversely, and does not rotate any further. Immediately after the start of sheet feeding, the relationship of Pc <Pmax is satisfied, so the controller advances to step S20. In S20, the ASF control means 201 checks the output voltage of the paper end sensor 108 within the printer 101 through the port 44*h* shown in FIG. 26. The output voltage of the paper end sensor 108 is LO because immediately after the start of sheet feeding operations the sheet 200 still has not reached the inside of the printer 101, thus the controller returns to S17. In this way steps S17 to S20 are repeated and the reverse planetary gear 35 revolves from the position shown by the broken line to the position shown by the solid line in FIG. 27 and interlocks with the sheet feeding roller gear 19*a*, whereupon the sheet feeding roller 19 begins to rotate. When the sheet feeding roller 19 begins to rotate from the initialization phase, the sheet feeding roller cam 19*c* slips from the pressure plate cam 26*a*, the pressure plate 26 is raised upward by the pressure plate spring 13, and the sheet 200 loaded on the pressure plate 26 is compressed by the pick-up rubber 23. At this time the front end of the sheet 200 abutted by the abutting surface 36*a* of the inclined surface 36 is also raised upward and contacts the approximate middle of the separating sheet 37.

When the sheet feeding roller 19 is rotated by repeating S17 to S20 further and continuing to drive the sheet feeding motor 27 reversely, conveyance of the sheet 200 by the force of the friction of the pick-up rubber 23 begins, the front end of the sheet 200 is separated from the sheet below by a reactive force caused by pressing the elastic separating sheet 37, and one sheet only is fed forward.

However, if reverse drive of the sheet feeding motor 27 is continued until the number of pulses counter Pc reaches a certain size, the relationship of Pc<Pmax is not satisfied, and the controller branches off from S19 and advances to S24. In S24, the ASF controller 201 drives the sheet feeding motor 27 forward only by a designated number of pulses P4. The designated number of pulses P4 is the number of pulses sufficient to rotate the sheet feeding roller to the initialization position by driving with the forward planetary gear 31. In other words, by performing S24, the sheet feeding roller 19 rotates to a phase exactly one rotation after the initialization position, the exact position at which the portion of the sheet feeding roller gear without teeth 19*b* faces the reverse planetary gear 31 and they are released from each other, and stops. The controller then proceeds to S25, returns the number of pulses counter Pc to 0, increases the number of rotations counter n by one, and proceeds to step S26. In step S26 at this time n still equals one, and so it returns to step S17 and begins to drive the sheet feeding motor 27 reversely again.

As mentioned above, the ASF controller 201 repeats steps S17 to S20, begins the second rotation of the sheet feeding roller 19, and further conveys the sheet 200. When the front end of the sheet 200 reaches the paper end sensor 108 within the printer 101, the output voltage of the paper end sensor changes to HIGH, and the controller proceeds from S20 to S21. In S21, the ASF controller 201 compares the value of the number of pulses counter Pc added to the value of the registration correcting pulse number P5 within the driving table T with the size of the allowed number of pulses Pmax. If the relationship of Pc+P5=Pmax is satisfied, it advances to S22 because the transmission of the reverse driving will not be released in the middle even if the sheet feeding motor 27 is driven reversely by P5 pulses only.

If the relationship of Pc+P5>Pmax is satisfied, the controller advances to S24 because if the sheet feeding motor 27 is further driven reversely by P5 pulses only, the portion of the sheet feeding roller gear without teeth 19 will arrive at a position facing the reverse planetary gear 35 halfway through and the driving transmission to the sheet feeding roller will be cut off. In S24, the controller drives the sheet feeding motor forward again by P4 pulses only and returns the sheet feeding roller 19 to initialization position, sets Pc to 0 and n to n+1 in S25, and advances to S26. Usually at this time n=2 because at the second rotation of the sheet feeding roller 19 the paper end sensor 108 detects the sheet 200, so the controller returns to S17. At that time, as the output voltage of the paper end sensor 108 is already at HIGH and the number of pulses counter Pc has just been reset, the controller advances from S17 through S18, S19, S20, to S21, and then advances to S22 because this time the relationship Pc+P5=Pmax is fulfilled.

S22 is where so-called registration correction is performed. The ASF controller 201 drives the sheet feeding motor reversely only by the number of pulses P5 from the driving table T and rotates the sheet feeding roller 19. At this time, the front end of the sheet 200 is sent from a position where it is detected by the paper end sensor 108 further into the printer 101 and stopped when it hits a nip formed by the stopped LF roller 109 and the pinch roller 110, but the rear of the sheet 200 is pushed further by the sheet feeding roller 19. As a result, the front end of the sheet 200 is aligned parallel to the nip portion formed by the LF roller 109 and the pinch roller 110.

Proceeding next to step S23, the ASF controller 201 sends a signal indicating that sheet feeding is finished to the printer 101 via the serial transmission port 44*f* shown in FIG. 26 and ends operation.

If a sheet is not stacked on the pressure plate 26, no matter how many times the sheet feeding roller 19 rotates, the output voltage of the paper end sensor will not turn to HIGH.

As a result, after the ASF controller 201 has twice repeated the operation in which is repeated a certain number of times the loop of S17 to S18 to S19 to S20 to S17 and then returned to S17 via the loop of S19 to S24 to S25 to S26, when it reaches S26 for the third time it proceeds to S27 because the sheet feeding roller 191 number of rotations counter n equals 3, sends a sheet feeding error signal to the printer 101 and ends operations.

Other Operations (Printer Side, ASF Side)

Figure 32:
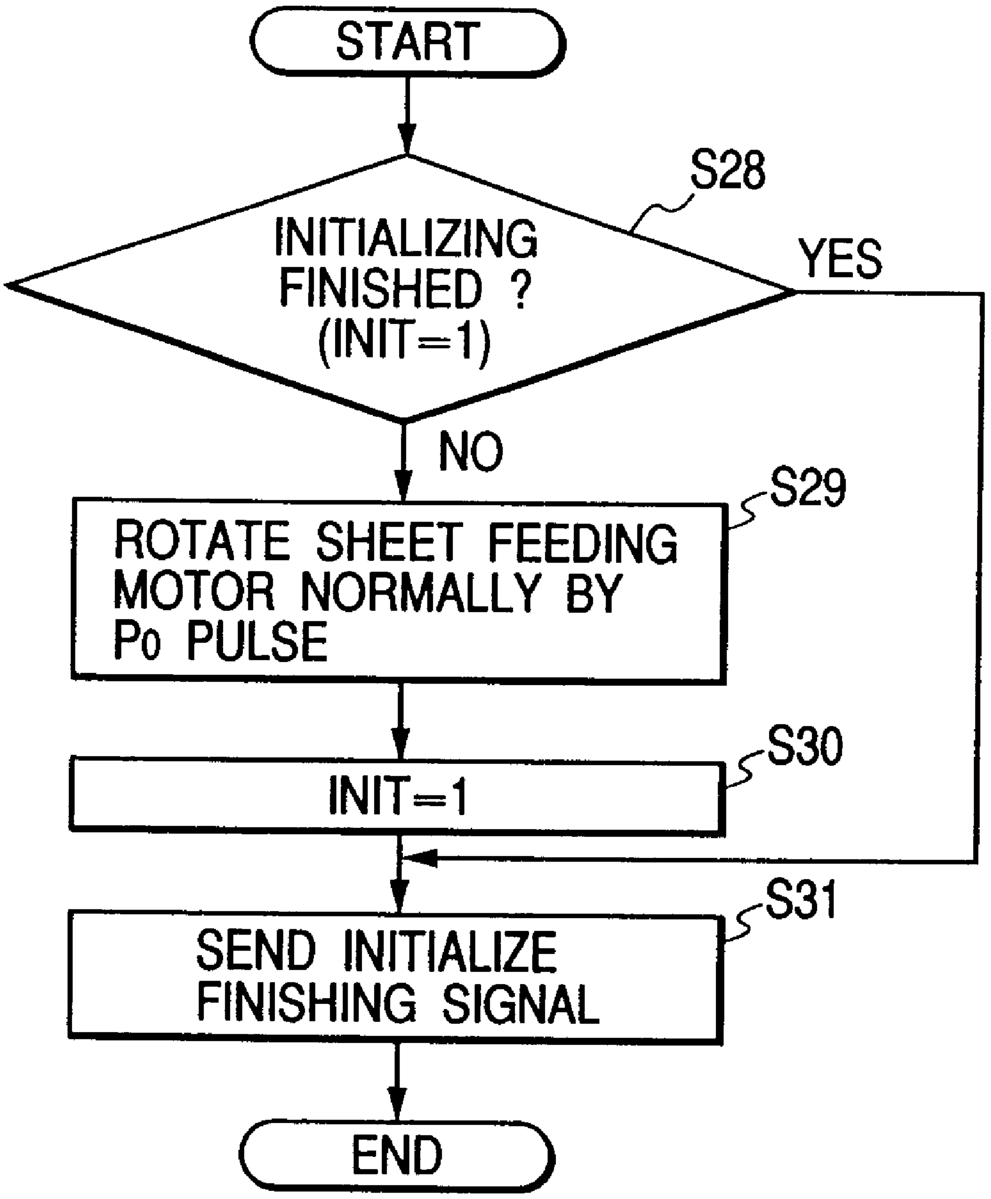
FIG. 32 is a sub-flow of the initialization operation control of the ASF controller.

FIG. 32 is the sub-flow C3 for controlling the initialization operations of the ASF 1. When the ASF 1 receives an initialization command signal from the printer main body 101, the ASF controller 201 proceeds to S28 and checks the value of the INIT flag that indicates whether or not the phase of the rotation direction of the sheet feeding roller 19 is in the initialization position. If INIT=1, the sheet feeding roller 19 is already in the initialization position and it advances to step S31 and finishes the operation by sending an initializing finished signal to the printer 101. If INIT=0, it advances to S29 and drives the sheet feeding roller motor 27 forward only by a designated number of pulses P0. The designated number of pulses P0 is set as the value sufficient to rotate the sheet feeding roller 19 to the initialization position such that the portion of the sheet feeding roller gear untoothed portion 19b faces the forward planetary gear 31 no matter where the phase of the rotation direction of the sheet feeding roller 19 is. By performing S29, the sheet feeding roller 19 rotates ad returns to the initialization position, the pressure plate 26 and the pick-up rubber 23 separate, and the sheet 200 can be set smoothly.

The controller next advances to step S30 to change the INIT flag to 1 to indicate that the sheet feeding roller is in the initialization position, and advancing to S31 sends an initializing finished signal to the printer 101 and ends operation.

Figure 33:
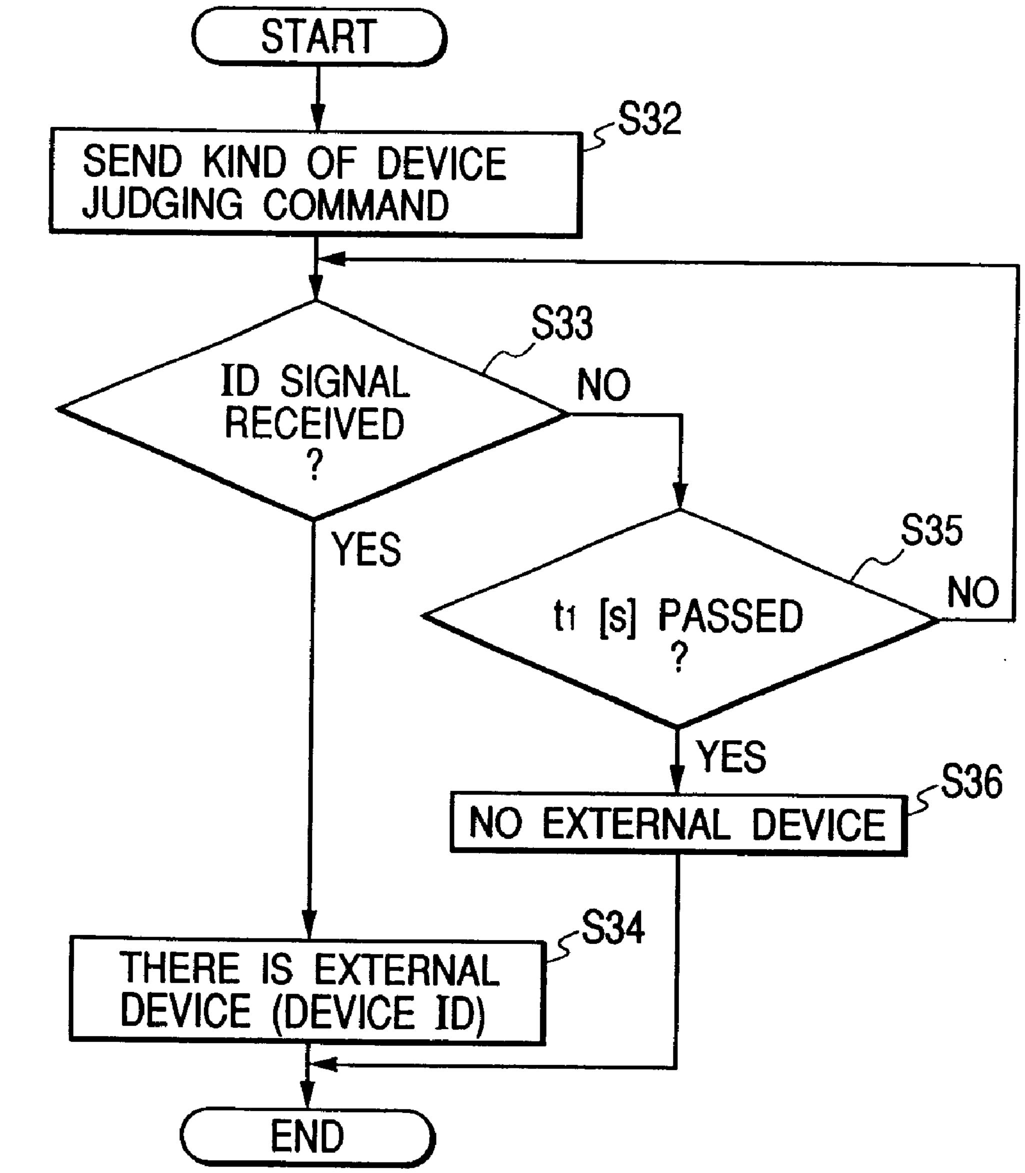
FIG. 33 is a sub-flow of the operation control by machine type in the printer controller..

FIG. 33 is the sub-flow C1 for performing judging of the kind of device attached to the outside of the printer via the ports 117*f* and 117*g* shown in FIG. 26. The main body controller 202 first proceeds to step S32 and sends kind of device judging command to the external device via the port 117*g*. Next it proceeds to S33, and if no response signal is received from the external device via the port 117*f*, it proceeds to S35 and then returns to S33 if a designated time limit of t1 has not elapsed. In S35, if the time limit t1 has elapsed, the controller advances to S36 and judges that no external device is attached and ends operation.

In S33, if a response signal is received from the external device, the controller proceeds to S34. In S34, the main body controller 202 reads partial code ID that indicates kind of device attached from the response signal received and ends operation.

Figure 34:
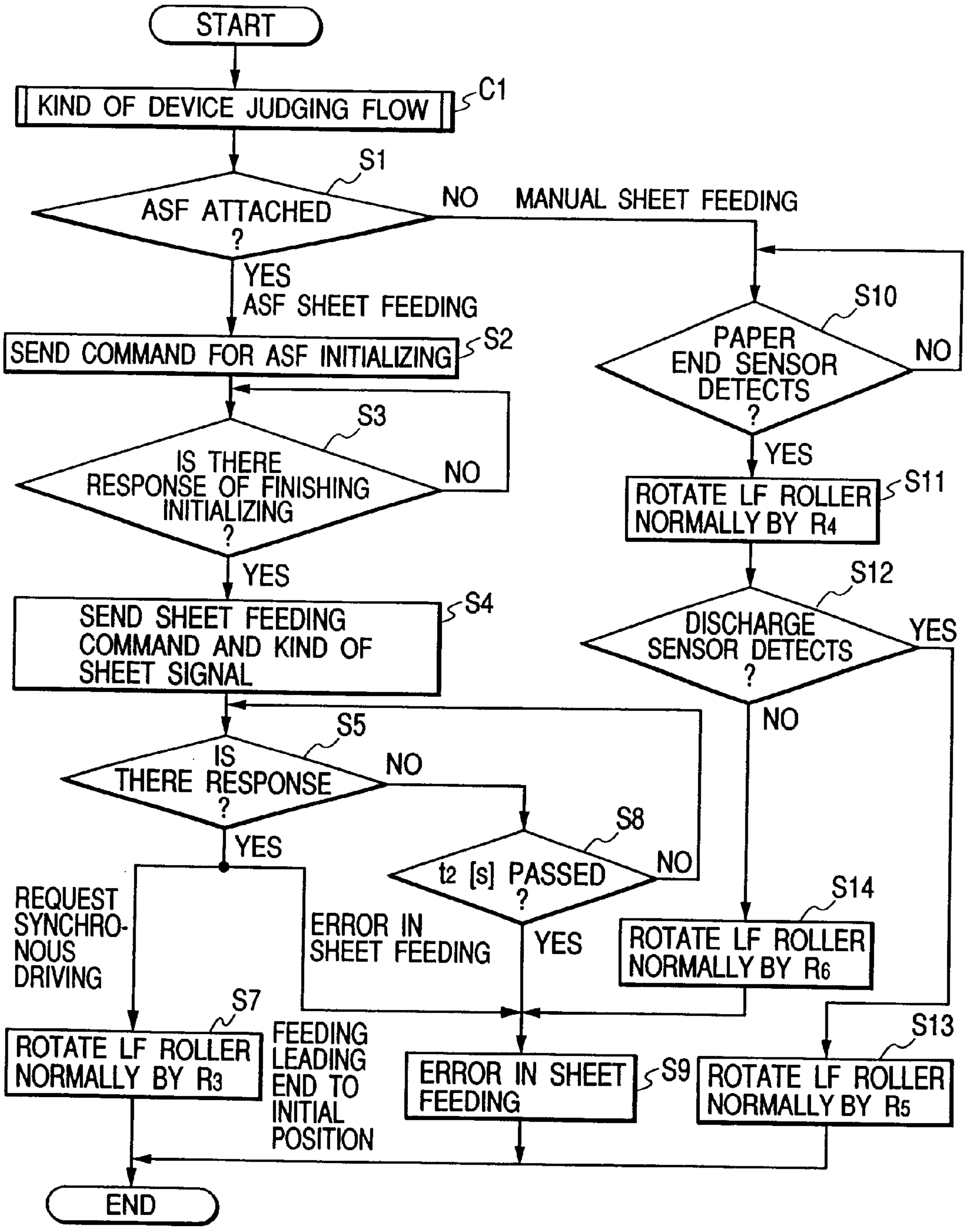
FIG. 34 is the flow of the sheet feeding operation control in the printer controller of the second embodiment.
Figure 35:
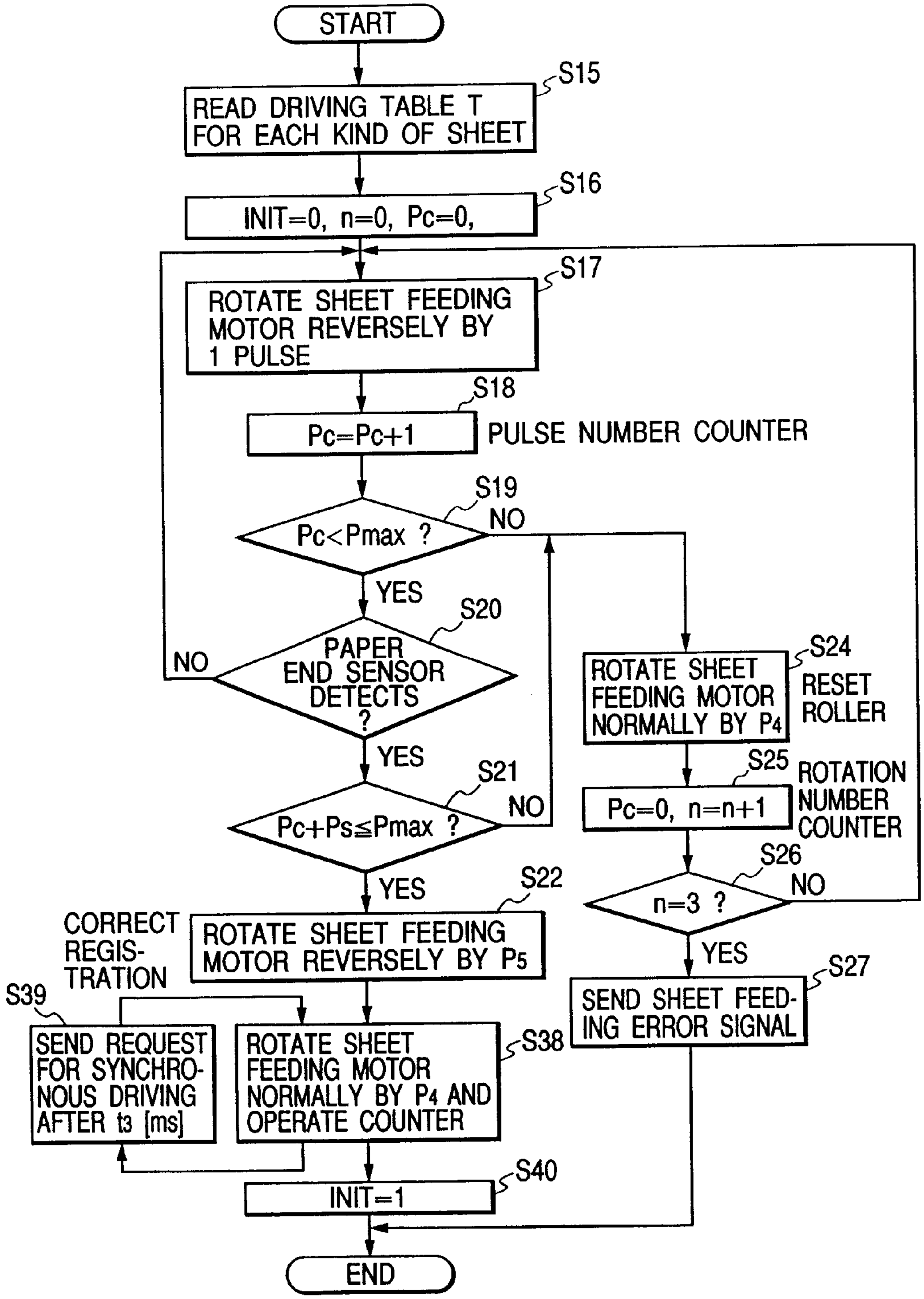
FIG. 35 is a sub-flow of the sheet feeding operation control in the ASF controller of the second embodiment.

FIGS. 34 and 35 show the second embodiment of the control flows of the printer and of the externally attached ASF attachable to the printer of the present invention. The same symbols are used for parts having the same functions and forms as in the first embodiment and for operation that are the same and the detailed explanation has been summarized.

Figure 36:
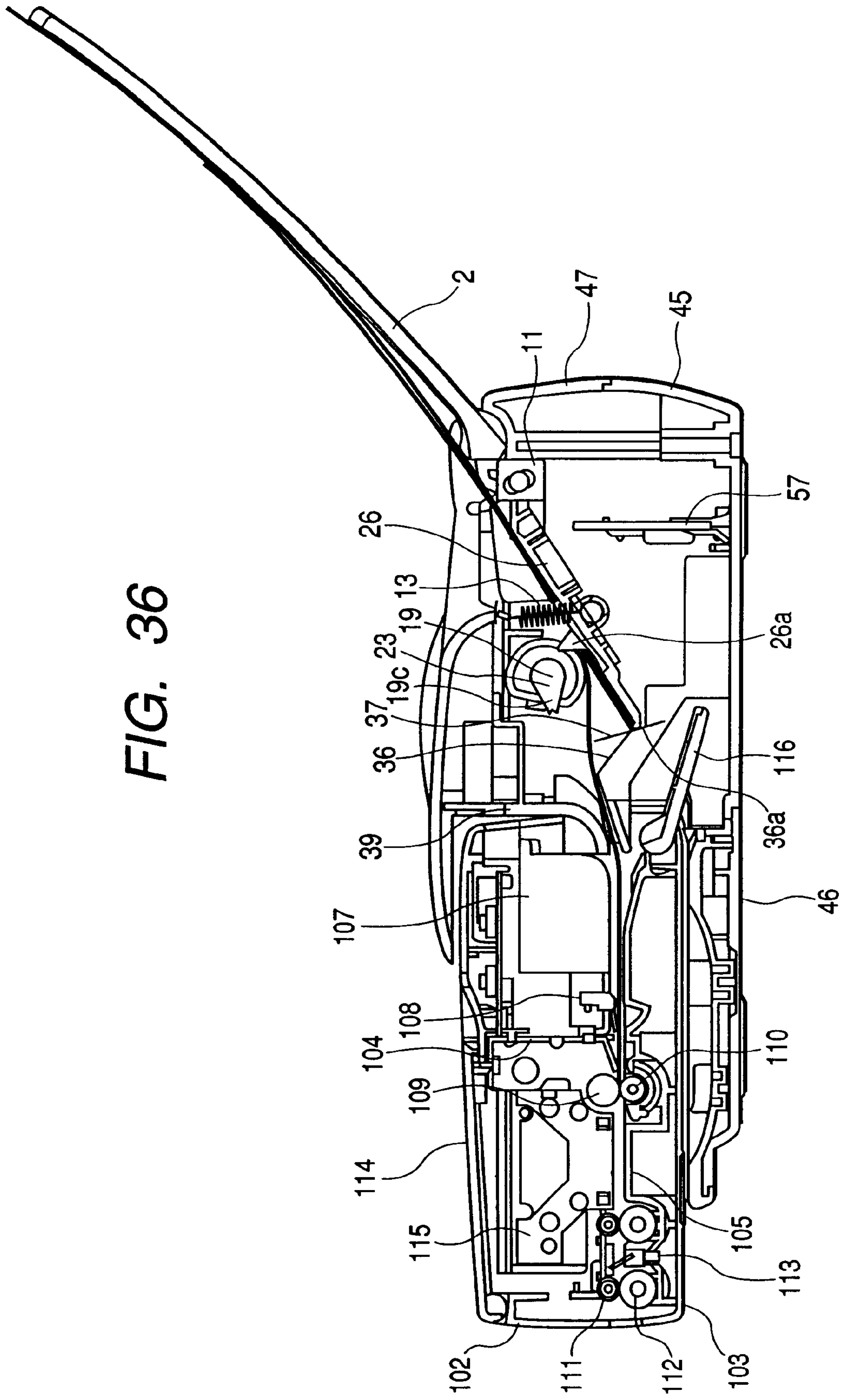
FIG. 36 is a schematic sectional view showing the condition when step 22 is completed during sheet feeding operation.

In the first embodiment the ASF controller 201 advances to S23 after reversely driving the sheet feeding motor by P5 pulses only in S22 as shown in FIG. 31 and sends a sheet feeding finished signal to the printer 101. However in this case because the sheet feeding roller 19 has not returned to the initialization position, the sheet feeding roller 19 remains compressed on the sheet 200 as shown in FIG. 36. In this condition, if head scanning or recording operations on the printer main body side are performed only by the LF roller alone, back tension from the sheet feeding roller 19 will occur and there is the danger that the precision of the conveyance of the sheet 200 will decline.

The second embodiment is an improvement regarding this problem.

After the ASF controller 201 performs the correction registration operation in S22 as shown in FIG. 35, it advances to S38 and drives the sheet feeding motor 27 forward by a designated number of pulses P6 only. The designated number of pulses P6 is the number of pulses sufficient to rotate the sheet feeding roller to the initialization position by driving with the forward planetary gear 31. At the same time as it starts the forward driving of the sheet feeding motor 27 it operates the counter for measuring the elapsed time since start of driving and advances to S39 when a designated amount of time t3 has elapsed and sends a request for synchronous driving to the printer main body 101 side. The designated amount of time t3 is slightly larger than the amount of time from the start of driving the sheet feeding motor 27 in S38 until the forward planetary gear 31 revolves so that the sheet feeding roller 19 interlocks with the sheet feeding roller gear 19*a* and begins to rotate.

In S38, the speed that the sheet feeding motor 27 is driven is set such that the peripheral speed of the pick-up rubber 23 attached to the sheet feeding roller 19 is slightly larger than the peripheral speed when the LF roller 109 of the printer main body rotates in S7.

When the step S38 is finished, the sheet feeding roller 19 rotates to the same phase as the initialization position and the controller advances to S40. In S41, the ASF controller 201 changes the INIT flag to "1" to indicate that the rotation direction phase of the sheet feeding roller is in initialization condition and ends operations.

In S39, the printer main body controller 202, which receives the request for synchronous driving sent by the ASF controller 201, advances from S5 to S7 shown in FIG. 34 and begins to rotate the LF roller 109 forward.

Figure 37:
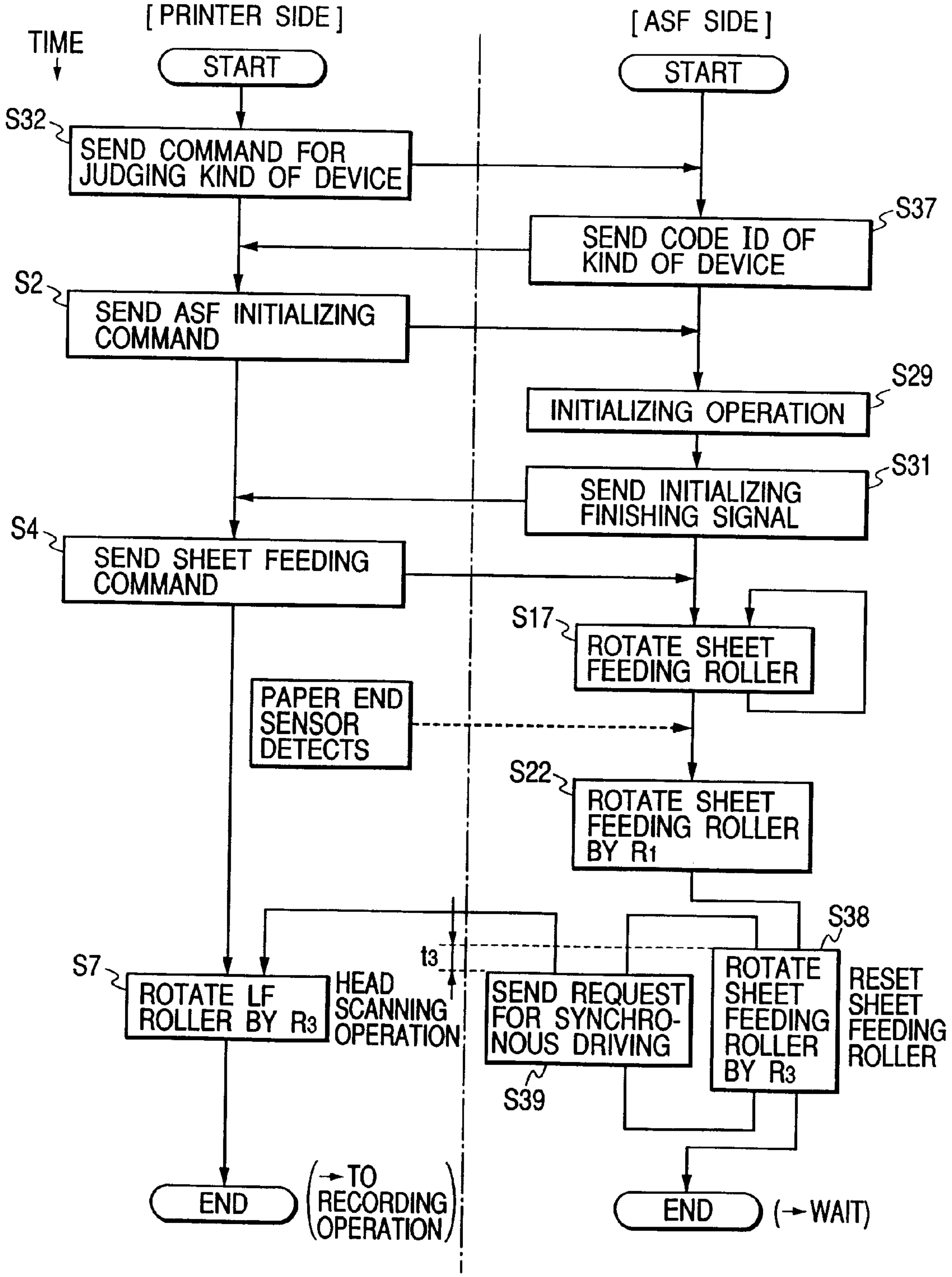
FIG. 37 is a time chart showing an outline of the printer and ASF operation flows in the second embodiment.

A time chart outlining which operations the printer main body 101 and the ASF 1 perform according to elapsed time in the present embodiment is shown in FIG. 37.

When the printer begins sheet feeding operations, it first sends a command for judging the kind of device to the ASF side (S32). The ASF sends to the printer side a signal ID indicating the code of the kind of device it is (S37). Next, the printer sends to the ASF side an ASF initializing command (S2), and the ASF performs an initializing operation by rotating the sheet feeding roller if it is not initialized (S29) and sends to the printer an initializing finished signal (S31). Then the printer sends a sheet feeding command to the ASF (S4). The ASF drives the sheet feeding motor based on the sheet feeding operation control flow C2 and rotates the sheet feeding roller (S18) after it has read the driving table T that is appropriate based on the sheet feeding command and the kind of sheet information sent (S15, omitted from FIG. 37). When the output voltage of the paper end sensor 108 provided on the printer changes to HIGH and the sheet is detected, the ASF rotates the sheet feeding roller further by the amount Rl only, based on the before-mentioned pulse number P5, the so-called correcting registration operation (S22). After the correcting registration operation is finished, the ASF rotates the sheet feeding roller further by an amount R3 only to the same position as initialization (S38) and sends a request for synchronous driving to the printer when the amount of time t3 only has elapsed since the beginning of sheet feeding motor driving (S39).

The printer, having received the request for synchronous driving from the ASF, rotates the LF roller by the amount R3 only, the so-called operation of feeding leading end to initial position (S7).

As is clear from the above explanation, in the present embodiment, in FIG. 36 showing the condition when step S22 is finished, the sheet feeding roller 19 begins to rotate and the LF roller 109 begins to rotate shortly thereafter. At this time the peripheral speed of the pick-up rubber 23 is slightly faster than the peripheral speed of the LF roller 109. Therefore when the LF roller begins to rotate because of the operation of feeding leading end to initial position in S7, no back tension occurs because the pick-up rubber 23 compressed by sheet 200 begins to rotate slightly before it. Furthermore, no back tension occurs as a result of the difference in peripheral speeds because the peripheral speed of the pick-up rubber 23 is slightly faster than the peripheral speed of the LF roller, and the conveyance precision during head scanning of the sheet 200 is stable.

However if t3 is too small, there is a danger than the LF roller 109 will start to rotate before the driving force of the sheet feeding motor 27 is transmitted to the sheet feeding roller 19. If t3 is too large, there is the danger that the sheet feeding roller 19 will rotate a lot before the LF roller 109 begins to rotate, and the sheet 200 will be deformed halfway through or the front end will not align parallel to the nip formed by the LF roller 109 and the pinch roller 110. As a result of experiments, in the present embodiment, 10 ms to 100 ms was the most appropriate value for t3. In the case the peripheral speed of the pick-up rubber 23 attached to the sheet feeding roller 19 is not very fast compared to the peripheral speed of the LF roller 109, there is a danger that back tension will occur when the pick-up rubber 23 slips due to the kind of sheet 200 or the peripheral environment. If the peripheral speed of the pick-up rubber 23 is too fast, there is a danger than the sheet 200 will be deformed. As a result of experiments, in S38 of the present embodiment, the most appropriate condition for the peripheral speed of the pick-up rubber 23 is 5% to 50% faster than the peripheral speed of the LF roller 109 in S7.

The signal name "request for synchronous driving" in the present embodiment was corresponds to the signal name "finishing sheet feeding" in the first embodiment because of a difference in the meaning of the operation, but no problems result if the same signal as "finishing sheet feeding" is used as. the actual signal. Accordingly, the sheet feeding operation control flow of the printer main body in the first and second embodiments (FIGS. 29 and 34) are in essence identical. In other words, the printer indicated in the first embodiment can be used by attaching to the ASF shown in either the first or the second embodiment.

Next the contents of the multiple driving tables T in the second embodiment are explained using FIG. 38.

For example if the kind of sheet information received from the ASF 1 indicated plain paper, the ASF controller 201 selects driving table 1. For plain paper the driving speed is set at medium speed because the resistance during correcting registration in step S22 is low. Also, since the sheet is rarely conveyed askew during sheet feeding there is no need to make the amount the sheet is pushed by the LF roller 109 large and a small value can be set for the number P5 of pulses in correcting registration.

If the kind of sheet information received from the ASF 1 indicated an envelope, the ASF controller 201 selects driving table T3. Here the driving speed is set at a low speed relative to plain paper and a large torque is ensured such that the sheet feeding motor 27 does not malfunction, because the resistance during correcting registration is particularly large in step S22. As an envelope more easily falls aslant during sheet feeding compared to other kinds of sheets (skew feeding easily occurs), a medium value, larger than table T1 for plain paper, is set for the number P5 of pulses in correcting registration in step S22. By doing so the front end of the envelope can be aligned with more precision because the amount the front end of the envelope is pushed by the LF roller 109 increases.

If the kind of sheet information indicated glossy paper, the ASF controller 201 selects driving table T4. Resistance during correcting registration is large for glossy paper, but skew feeding does not occur easily. As a result a low speed is set for the driving speed in correcting registration and a small value, equivalent to that for plain paper, is set for number P5 of pulses in correcting registration in T4.

If the kind of sheet information indicated a postcard, the ASF controller 201 selects driving table T2. A postcard does not have a large resistance in correcting registration, so a medium speed, equal to that for plain paper, is set for the driving speed in correcting registration.

However, when the LF roller 109 on the printer side in FIG. 37 and the ASF sheet feeding roller 19 are rotating at the same time, a very rigid sheet such as a postcard is not easily deformed and ends up being pushed in when the sheet feeding roller 19 with a high peripheral speed resists the fricative force of the LF roller 109. Because the front end of the postcard ends up being conveyed than the rotation amount R3 of the LF roller, correct printing results may not be achieved. In order to avoid this, the largest possible value for number P5 of pulses in correcting registration in step S22 is set in table T2. Concretely, a variable, expressed by P5=Pmax—Pc, determined by the number of reverse driving pulses of the sheet feeding motor needed for the paper end sensor 108 to detect the sheet 200 is set. By doing so, no matter when the paper end sensor 108 detects the sheet 200, the total number of pulses the sheet feeding motor 27 is driven reversely when step S22 is finished in FIG. 35 will be Pmax. In other words, the untoothed portion 19*b* of the sheet feeding roller gear 19*a* definitely rotates until the position where it faces the reverse planetary gear 35 and slips from contact. As a result, the rotation direction phase of the sheet feeding roller 19 after completion of step S22 moves from initialization position to a position greatly advanced, and then the phase of the sheet feeding roller 19 returns quickly to initialization position even if the sheet feeding roller 19 rotates in step S40. Accordingly, because the postcard loaded on the pressure plate 26 and the pick-up rubber 23 are quickly separated immediately after synchronous driving of the LF roller 109 and the sheet feeding roller 19 begins, the postcard is no longer pushed in by resistance of the sheet feeding roller 19 to the friction of the LF roller 109.

If the kind of sheet information received by the ASF 1 from the printer 101 is a kind of sheet that does not fit with the ASF 1 or if a kind of sheet is not indicated, the ASF controller 201 selects driving table T5. In the present embodiment the same values are stored in driving table T5 as in driving table T2 for postcards, but depending on the hypothesized situation, the same values as another kind of sheet table, or values that are completely different from any other kind of sheet table can be stored in T5.

What is claimed is:

1. A recording apparatus including a recording apparatus main body which has a sheet feeding aperture and which can record an image on a sheet manually fed from the sheet feeding aperture, and an auto sheet feeder which is detachably attached to the recording apparatus main body and which can automatically feed a sheet to the recording apparatus main body via the sheet feeding aperture, said recording apparatus comprising:

positioning means for manual sheet feeding for aligning the sheet feeding position by restricting sides of a sheet manually fed from the sheet feeding aperture, wherein said positioning means for manual sheet feeding is retractable such that the sheet fed from the auto sheet feeder does not abut said positioning means for manual sheet feeding when the auto sheet feeder is attached to the recording apparatus main body.

2. A recording apparatus according to claim 1, wherein said positioning means for manual sheet feeding retracts below a pass through which the sheet fed from the auto sheet feeder passes.

3. A recording apparatus according to claim 2, wherein said positioning means for manual sheet feeding is provided on a sheet feeding tray for supporting the sheets manually fed from the sheet feeding aperture, and a tray receiving portion is provided on the auto sheet feeder for receiving the sheet feeding tray such that the sheet feeding tray can be retracted below the pass when the auto sheet feeder is attached to the recording apparatus main body.

4. The recording apparatus according to claim 3, wherein said positioning means for manual sheet feeding has a moving positioning member movable in accordance with the sheet size, and the tray receiving portion can receive the sheet feeding tray regardless of the position of the moving positioning member.

5. The recording apparatus according to claim 3, wherein the auto sheet feeder has a sheet supporting means for supporting a sheet stack, a sheet feeding means for feeding sheets from the sheet supporting means, and a sheet separation means for separating sheets fed from the sheet feeding means one by one, and a positioning means for auto sheet feeding provided on the sheet supporting means.

6. The recording apparatus according to claim 5, wherein a main body positioning means is provided on the recording apparatus main body for restricting the position of the sides of the sheet manually fed, the manual sheet feeding standard is set by the main body positioning means and said positioning means for manual sheet feeding, and the manual sheet conveying standard is positioned the outer side in the width direction of the sheet than a sheet feeding standard for sheets fed automatically set by said positioning means for auto sheet feeding.

7. A recording apparatus according to claim 3, wherein the sheet feeding tray is mounted rotatably on the recording apparatus main body between a position for closing the sheet feeding aperture and a position for supporting the sheet, and the sheet feeding tray is received portion by the tray receiver by rotating from the position for supporting the sheet when the auto sheet feeder is attached to the recording apparatus main body.

8. The recording apparatus according to claim 7, wherein a guide is provided on the tray receiving portion for guiding the sheet feeding tray to the tray receiving portion by rotating further from the position for supporting sheets when the auto sheet feeder is attached to the recording apparatus main body.

9. A recording apparatus according to claim 1, wherein said positioning means for manual sheet feeding retracts to the side of the pass through which the sheet fed from the auto sheet feeder passes.

10. The recording apparatus according to claim 1, wherein the auto sheet feeder has a sheet supporting means for supporting a sheet stack, a sheet feeding means for feeding sheets from the sheet supporting means, and a sheet separation means for separating sheets fed from the sheet feeding means one by one, the sheet separation means has a plate member that can change form elastically and an inclined surface placed on the downstream side of the plate member, and the tray receiving portion is placed on the inside of the inclined surface.

11. The recording apparatus according to claim 10, wherein the plate member separates sheets of slight rigidity and the inclined surface separates sheets of great rigidity.

12. The recording apparatus according to claim 1, wherein the recording apparatus main body is portable and a recording means of the recording apparatus main body is ink jet system.

* * * * *

UNITED STATES PATENT AND TRADEMARK OFFICE

CERTIFICATE OF CORRECTION

PATENT NO. : 6,654,133 B2
DATED : November 25, 2003
INVENTOR(S) : Hiroyuki Inoue It is certified that error appears in the above-identified patent and that said Letters Patent is hereby corrected as shown below:

Title page,
Insert Item -- [*] Notice: This patent issued on a continued prosecution application filed under 35 CFR 1.53(d), and is subject to the twenty year patent term provisions of 35 U.S.C. 154(a)(2). --.

Column 2,
Line 24, "supplied" should read -- are supplied --.

Column 4,
Line 31, "from" should be deleted.
Line 51, "1." should read -- 1. Namely, --.

Column 5,
Line 35, "portion)." should read -- portions). --.
Line 50, "object" should read -- objects --.

Column 6,
Line 12, "fit." should read -- fit. The --.
Line 17, "same" should read -- is the same --.
Line 40, "110B" should read -- 101B --.
Line 64, "at least" should read -- by at least --.

Column 7,
Line 21, "lifting" should read -- lifting of --.
Line 57, "detached" should read -- detachment --.

Column 8,
Line 34, "attaching." should read -- attach. --.

Column 9,
Line 11, "consist" should read -- consisting --.
Line 45, "the both" should read -- both the ASF 1 and the printer 101 --.

Column 10,
Line 18, "held" should read -- is held --.

UNITED STATES PATENT AND TRADEMARK OFFICE

CERTIFICATE OF CORRECTION

PATENT NO. : 6,654,133 B2
DATED : November 25, 2003
INVENTOR(S) : Hiroyuki Inoue It is certified that error appears in the above-identified patent and that said Letters Patent is hereby corrected as shown below:

Column 12,
Line 20, "feeding" should read -- is feeding --.
Line 46, "guides" should read -- guides 16a --.

Column 15,
Line 20, "an biasing" should read -- a biasing --.

Column 18,
Line 33, "not" should read -- (not --.
Line 34, "drawings." should read --drawings).--.

Column 19,
Line 60, "not" should read -- (not --.
Line 61, "drawing" should read -- drawing) --.

Column 20,
Line 46, "detachment and conveyance mechanism" should read -- Detachment and Conveyance Mechanism --.
Line 47, "portion" should read -- Portion --.

Column 21,
Lines 18 and 29, "not" should read -- (not --.
Lines 18 and 29, "drawing" should read -- drawing) --.
Line 37, "driving mechanism" should read -- Driving Mechanism --.

Column 22,
Lines 12 and 36, "not" should read -- (not --.
Lines 13 and 37, "drawing" should read -- drawing) --.

Column 27,
Line 43, "ad" should read -- and --.

Column 29,
Line 50, "than" should read -- that --.
Line 56, "was" should be deleted.

UNITED STATES PATENT AND TRADEMARK OFFICE

CERTIFICATE OF CORRECTION

PATENT NO. : 6,654,133 B2
DATED : November 25, 2003
INVENTOR(S) : Hiroyuki Inoue It is certified that error appears in the above-identified patent and that said Letters Patent is hereby corrected as shown below:

Column 32,
Line 8, "positioned" should read -- positioned at --.
Line 9, "than" should read -- from --.
Line 44, "ink" should read -- an ink --.

Signed and Sealed this

Thirty-first Day of May, 2005

JON W. DUDAS
*Director of the United States Patent and Trademark Office*